US010056077B2

(12) United States Patent
Cerra et al.

(10) Patent No.: US 10,056,077 B2
(45) Date of Patent: Aug. 21, 2018

(54) USING SPEECH RECOGNITION RESULTS BASED ON AN UNSTRUCTURED LANGUAGE MODEL WITH A MUSIC SYSTEM

(75) Inventors: Joseph P. Cerra, Pawling, NY (US); John N. Nguyen, Arlington, MA (US); Michael S. Phillips, Belmont, MA (US); Han Shu, Brookline, MA (US)

(73) Assignee: Nuance Communications, Inc., Burlington, MA (US)

( * ) Notice: Subject to any disclaimer, the term of this patent is extended or adjusted under 35 U.S.C. 154(b) by 978 days.

(21) Appl. No.: 12/184,490

(22) Filed: Aug. 1, 2008

(65) Prior Publication Data

US 2009/0030698 A1    Jan. 29, 2009

Related U.S. Application Data

(63) Continuation-in-part of application No. 11/865,692, filed on Oct. 1, 2007, and a continuation-in-part of application No. 11/865,694, filed on Oct. 1, 2007, and a continuation-in-part of application No. 11/865,697, filed on Oct. 1, 2007, and a continuation-in-part of application No. 11/866,675, filed on Oct. 3, 2007, and a continuation-in-part of application No. 11/866,704,
(Continued)

(51) Int. Cl.
| | |
|---|---|
| *G10L 21/00* | (2013.01) |
| *G10L 15/183* | (2013.01) |
| *G10L 15/30* | (2013.01) |

(52) U.S. Cl.
CPC ............ *G10L 15/183* (2013.01); *G10L 15/30* (2013.01)

(58) Field of Classification Search
CPC .............................. G10L 15/30; G06F 17/2715
USPC .......................... 704/257, 9, 270.1; 715/830
See application file for complete search history.

(56) References Cited

U.S. PATENT DOCUMENTS

| | | |
|---|---|---|
| 5,613,036 A | 3/1997 | Strong |
| 5,632,002 A | 5/1997 | Hashimoto et al. |
| (Continued) | | |

FOREIGN PATENT DOCUMENTS

| | | |
|---|---|---|
| EP | 1104155 A2 | 5/2001 |
| WO | WO-2003/054859 A1 | 7/2003 |
| WO | WO-2008109835 A2 | 9/2008 |

OTHER PUBLICATIONS

Bronsted, Mobile Information Access with Spoken Query Answering, 2005, Esbjerg Aalborg University, Denmark, All pages.*
(Continued)

*Primary Examiner* — Michael Colucci
(74) *Attorney, Agent, or Firm* — Brian J. Colandreo; Michael T. Abramson; Holland & Knight LLP

(57) ABSTRACT

Speech recorded by an audio capture facility of a music facility is processed by a speech recognition facility to generate results that are provided to the music facility. When information related to a music application running on the music facility are provided to the speech recognition facility, the results generated are based at least in part on the application related information. The speech recognition facility uses an unstructured language model for generating results. The user of the music facility may optionally be allowed to edit the results being provided to the music facility. The speech recognition facility may also adapt speech recognition based on usage of the results.

25 Claims, 32 Drawing Sheets

Related U.S. Application Data filed on Oct. 3, 2007, and a continuation-in-part of application No. 11/866,725, filed on Oct. 3, 2007, and a continuation-in-part of application No. 11/866,755, filed on Oct. 3, 2007, and a continuation-in-part of application No. 11/866,777, filed on Oct. 3, 2007, and a continuation-in-part of application No. 11/866,804, filed on Oct. 3, 2007, and a continuation-in-part of application No. 11/866,818, filed on Oct. 3, 2007, and a continuation-in-part of application No. 12/044,573, filed on Mar. 7, 2008, application No. 12/184,490, filed on Aug. 1, 2008, which is a continuation of application No. 12/123,952, filed on May 20, 2008.

(60) Provisional application No. 60/976,050, filed on Sep. 28, 2007, provisional application No. 60/977,143, filed on Oct. 3, 2007, provisional application No. 61/034,794, filed on Mar. 7, 2008, provisional application No. 60/893,600, filed on Mar. 7, 2007.

(56) References Cited

U.S. PATENT DOCUMENTS

| | | | |
|---|---|---|---|
| 5,717,828 A * | 2/1998 | Rothenberg | G09B 5/065 434/185 |
| 5,748,191 A | 5/1998 | Rozak et al. | |
| 5,749,072 A | 5/1998 | Mazurkiewicz | |
| 5,806,034 A | 9/1998 | Naylor et al. | |
| 5,890,122 A | 3/1999 | Van et al. | |
| 5,949,886 A | 8/1999 | Nevins et al. | |
| 6,081,779 A | 6/2000 | Besling et al. | |
| 6,101,467 A | 8/2000 | Bartosik | |
| 6,154,722 A | 11/2000 | Bellegarda | |
| 6,192,339 B1 | 2/2001 | Cox | |
| 6,374,226 B1 | 4/2002 | Hunt et al. | |
| 6,418,410 B1 | 7/2002 | Nassiff et al. | |
| 6,453,281 B1 | 9/2002 | Walters et al. | |
| 6,487,534 B1 | 11/2002 | Thelen et al. | |
| 6,513,010 B1 * | 1/2003 | Lewin | G10L 15/26 704/10 |
| 6,532,446 B1 | 3/2003 | King | |
| 6,704,707 B2 | 3/2004 | Anderson et al. | |
| 6,718,308 B1 | 4/2004 | Nolting | |
| 6,757,655 B1 | 6/2004 | Besling et al. | |
| 6,757,718 B1 | 6/2004 | Halverson et al. | |
| 6,766,294 B2 | 7/2004 | Macginite et al. | |
| 6,766,295 B1 | 7/2004 | Murveit et al. | |
| 6,785,647 B2 | 8/2004 | Hutchison | |
| 6,785,654 B2 | 8/2004 | Cyr et al. | |
| 6,792,291 B1 | 9/2004 | Topol et al. | |
| 6,807,574 B1 | 10/2004 | Partovi et al. | |
| 6,823,307 B1 | 11/2004 | Steinbiss et al. | |
| 6,832,196 B2 | 12/2004 | Reich | |
| 6,839,667 B2 | 1/2005 | Reich | |
| 6,839,670 B1 | 1/2005 | Stammler et al. | |
| 6,856,957 B1 | 2/2005 | Dumoulin | |
| 6,868,385 B1 | 3/2005 | Gerson | |
| 6,910,003 B1 | 6/2005 | Arnold et al. | |
| 6,934,684 B2 | 8/2005 | Alpdemir et al. | |
| 6,941,264 B2 | 9/2005 | Konopka et al. | |
| 6,999,930 B1 * | 2/2006 | Roberts | G10L 15/193 379/88.01 |
| 7,003,463 B1 | 2/2006 | Maes et al. | |
| 7,003,464 B2 | 2/2006 | Ferrans et al. | |
| 7,013,265 B2 | 3/2006 | Huang et al. | |
| 7,013,275 B2 | 3/2006 | Arnold et al. | |
| 7,016,827 B1 * | 3/2006 | Ramaswamy | G10L 15/1822 704/1 |
| 7,027,975 B1 | 4/2006 | Pazandak et al. | |
| 7,035,804 B2 | 4/2006 | Saindon et al. | |
| 7,062,444 B2 | 6/2006 | He et al. | |
| 7,085,723 B2 | 8/2006 | Ross et al. | |
| 7,120,582 B1 | 10/2006 | Young et al. | |
| 7,139,715 B2 | 11/2006 | Dragosh et al. | |
| 7,174,297 B2 | 2/2007 | Guerra et al. | |
| 7,203,651 B2 | 4/2007 | Baruch et al. | |
| 7,203,721 B1 | 4/2007 | Ben-Efraim et al. | |
| 7,209,880 B1 | 4/2007 | Gajic et al. | |
| 7,225,130 B2 | 5/2007 | Roth et al. | |
| 7,228,275 B1 | 6/2007 | Endo et al. | |
| 7,236,931 B2 | 6/2007 | He et al. | |
| 7,277,853 B1 | 10/2007 | Bou-Ghazale et al. | |
| 7,283,850 B2 | 10/2007 | Granovetter et al. | |
| 7,302,383 B2 * | 11/2007 | Valles | G06F 17/271 704/231 |
| 7,302,390 B2 | 11/2007 | Yang et al. | |
| 7,302,394 B1 | 11/2007 | Baray et al. | |
| 7,308,404 B2 | 12/2007 | Venkataraman et al. | |
| 7,313,526 B2 | 12/2007 | Roth et al. | |
| 7,328,155 B2 | 2/2008 | Endo et al. | |
| 7,340,395 B2 | 3/2008 | Gurram et al. | |
| 7,376,586 B1 | 5/2008 | Partovi et al. | |
| 7,409,349 B2 | 8/2008 | Wang et al. | |
| 7,437,291 B1 | 10/2008 | Stewart et al. | |
| 7,451,085 B2 | 11/2008 | Rose et al. | |
| 7,478,038 B2 | 1/2009 | Chelba et al. | |
| 7,487,440 B2 | 2/2009 | Gergic et al. | |
| 7,509,588 B2 * | 3/2009 | Van Os | G06F 3/04817 345/156 |
| 7,555,431 B2 | 6/2009 | Bennett | |
| 7,558,731 B1 | 7/2009 | Hodjat et al. | |
| 7,574,672 B2 * | 8/2009 | Jobs | G06F 3/0236 345/156 |
| 7,584,102 B2 | 9/2009 | Hwang et al. | |
| 7,603,276 B2 | 10/2009 | Yoshizawa | |
| 7,624,018 B2 | 11/2009 | Chambers et al. | |
| 7,647,225 B2 | 1/2010 | Bennett et al. | |
| 7,657,828 B2 | 2/2010 | Lucas et al. | |
| 7,672,543 B2 | 3/2010 | Hull et al. | |
| 7,676,367 B2 | 3/2010 | Roth et al. | |
| 7,678,984 B1 * | 3/2010 | Lamere | G10H 1/0033 84/601 |
| 7,689,416 B1 | 3/2010 | Poirier | |
| 7,689,420 B2 | 3/2010 | Pack et al. | |
| 7,716,051 B2 | 5/2010 | Dow et al. | |
| 7,725,307 B2 | 5/2010 | Bennett | |
| 7,725,320 B2 | 5/2010 | Bennett | |
| 7,729,904 B2 | 6/2010 | Bennett | |
| 7,752,043 B2 | 7/2010 | Watson | |
| 7,752,152 B2 | 7/2010 | Paek et al. | |
| 7,756,708 B2 | 7/2010 | Cohen et al. | |
| 7,774,202 B2 | 8/2010 | Spengler et al. | |
| 7,831,429 B2 | 11/2010 | O'Hagan | |
| 7,839,532 B2 | 11/2010 | Brawn et al. | |
| 7,921,011 B2 | 4/2011 | Hernandez Abrego et al. | |
| 7,956,846 B2 | 6/2011 | Ording et al. | |
| 7,979,277 B2 | 7/2011 | Larri et al. | |
| 7,983,912 B2 | 7/2011 | Hirakawa et al. | |
| 8,032,373 B2 | 10/2011 | Dunsmuir | |
| 8,056,070 B2 | 11/2011 | Goller et al. | |
| 8,086,604 B2 | 12/2011 | Arrouye et al. | |
| 8,175,867 B2 | 5/2012 | Bou-Ghazale et al. | |
| 8,311,835 B2 | 11/2012 | Lecoeuche | |
| 8,332,218 B2 | 12/2012 | Cross, Jr. et al. | |
| 8,838,457 B2 | 9/2014 | Cerra et al. | |
| 8,880,405 B2 | 11/2014 | Cerra et al. | |
| 8,886,540 B2 | 11/2014 | Cerra et al. | |
| 8,886,545 B2 | 11/2014 | Meisel et al. | |
| 8,949,130 B2 | 2/2015 | Phillips | |
| 8,949,266 B2 | 2/2015 | Phillips et al. | |
| 2001/0047258 A1 | 11/2001 | Rodrigo | |
| 2002/0010582 A1 | 1/2002 | Firman | |
| 2002/0055844 A1 | 5/2002 | L'Esperance et al. | |
| 2002/0072896 A1 | 6/2002 | Roberge et al. | |
| 2002/0087315 A1 | 7/2002 | Lee et al. | |
| 2002/0091515 A1 | 7/2002 | Garudadri | |
| 2002/0091527 A1 | 7/2002 | Shiau | |
| 2002/0097692 A1 | 7/2002 | Ruotoistenmaki | |
| 2002/0099542 A1 | 7/2002 | Mitchell et al. | |
| 2002/0161579 A1 | 10/2002 | Saindon et al. | |
| 2002/0193986 A1 | 12/2002 | Schirris | |
| 2002/0194000 A1 | 12/2002 | Bennett et al. | |

(56) References Cited

U.S. PATENT DOCUMENTS

| | | |
|---|---|---|
| 2003/0023440 A1 | 1/2003 | Chu |
| 2003/0033288 A1 | 2/2003 | Shanahan et al. |
| 2003/0036903 A1 | 2/2003 | Konopka et al. |
| 2003/0050783 A1 | 3/2003 | Yoshizawa |
| 2003/0061200 A1 | 3/2003 | Hubert et al. |
| 2003/0074183 A1 | 4/2003 | Eisele et al. |
| 2003/0101054 A1 | 5/2003 | Davis et al. |
| 2003/0115289 A1 | 6/2003 | Chinn et al. |
| 2003/0125955 A1 | 7/2003 | Arnold et al. |
| 2003/0167167 A1 | 9/2003 | Gong |
| 2003/0182131 A1 | 9/2003 | Arnold et al. |
| 2003/0236672 A1 | 12/2003 | Aaron et al. |
| 2004/0025669 A1* | 2/2004 | Hughes ............. G10H 1/0058 84/609 |
| 2004/0054539 A1 | 3/2004 | Simpson |
| 2004/0078191 A1 | 4/2004 | Tian et al. |
| 2004/0078202 A1 | 4/2004 | Kamiya |
| 2004/0083092 A1 | 4/2004 | Valles |
| 2004/0083109 A1* | 4/2004 | Halonen ............. G10L 15/19 704/277 |
| 2004/0117188 A1 | 6/2004 | Kiecza et al. |
| 2004/0117189 A1 | 6/2004 | Bennett |
| 2004/0128137 A1 | 7/2004 | Bush et al. |
| 2004/0138890 A1 | 7/2004 | Ferrans et al. |
| 2004/0148170 A1 | 7/2004 | Acero et al. |
| 2004/0176958 A1* | 9/2004 | Salmenkaita ....... H04M 1/72561 704/275 |
| 2004/0192384 A1 | 9/2004 | Anastasakos et al. |
| 2004/0215449 A1 | 10/2004 | Roy |
| 2004/0230637 A1 | 11/2004 | Lecoueche et al. |
| 2004/0236580 A1 | 11/2004 | Bennett |
| 2004/0243307 A1* | 12/2004 | Geelen ............. G01C 21/3635 701/469 |
| 2004/0260438 A1 | 12/2004 | Chernetsky et al. |
| 2004/0260543 A1 | 12/2004 | Horowitz et al. |
| 2004/0267518 A1 | 12/2004 | Kashima et al. |
| 2005/0004798 A1 | 1/2005 | Kaminuma et al. |
| 2005/0043947 A1 | 2/2005 | Roth et al. |
| 2005/0043949 A1 | 2/2005 | Roth et al. |
| 2005/0055210 A1* | 3/2005 | Venkataraman ....... G10L 15/065 704/255 |
| 2005/0065779 A1 | 3/2005 | Odinak |
| 2005/0091037 A1 | 4/2005 | Haluptzok et al. |
| 2005/0114122 A1 | 5/2005 | Uhrbach et al. |
| 2005/0137878 A1 | 6/2005 | Roth et al. |
| 2005/0149327 A1 | 7/2005 | Roth et al. |
| 2005/0154692 A1* | 7/2005 | Jacobsen ............. G06F 17/2264 706/47 |
| 2005/0159949 A1 | 7/2005 | Yu et al. |
| 2005/0159950 A1 | 7/2005 | Roth et al. |
| 2005/0201540 A1 | 9/2005 | Rampey et al. |
| 2005/0203740 A1 | 9/2005 | Chambers et al. |
| 2005/0203751 A1 | 9/2005 | Stevens et al. |
| 2005/0234723 A1* | 10/2005 | Arnold ............. G10L 15/065 704/257 |
| 2005/0283364 A1 | 12/2005 | Longe |
| 2005/0288005 A1 | 12/2005 | Roth et al. |
| 2006/0009965 A1 | 1/2006 | Gao et al. |
| 2006/0009974 A1 | 1/2006 | Junqua et al. |
| 2006/0009980 A1 | 1/2006 | Burke et al. |
| 2006/0026140 A1 | 2/2006 | King et al. |
| 2006/0058996 A1 | 3/2006 | Barker |
| 2006/0080103 A1 | 4/2006 | Van Breemen |
| 2006/0080105 A1 | 4/2006 | Lee et al. |
| 2006/0085186 A1 | 4/2006 | Ma et al. |
| 2006/0089798 A1 | 4/2006 | Kaufman et al. |
| 2006/0095266 A1 | 5/2006 | McA'Nulty et al. |
| 2006/0136221 A1 | 6/2006 | James et al. |
| 2006/0149551 A1 | 7/2006 | Ganong, III et al. |
| 2006/0167686 A1 | 7/2006 | Kahn |
| 2006/0173683 A1 | 8/2006 | Roth et al. |
| 2006/0173684 A1 | 8/2006 | Fischer et al. |
| 2006/0182346 A1 | 8/2006 | Yoda et al. |
| 2006/0195323 A1 | 8/2006 | Monne et al. |
| 2006/0200449 A1* | 9/2006 | Pauws ............. G06F 17/30743 |
| 2006/0212451 A1 | 9/2006 | Serdy, Jr. et al. |
| 2006/0235684 A1 | 10/2006 | Chang |
| 2006/0247915 A1 | 11/2006 | Bradford et al. |
| 2006/0271364 A1 | 11/2006 | Mirkovic et al. |
| 2006/0293889 A1 | 12/2006 | Kiss et al. |
| 2006/0293893 A1 | 12/2006 | Horvitz |
| 2007/0005363 A1 | 1/2007 | Cucerzan et al. |
| 2007/0033037 A1 | 2/2007 | Mowatt et al. |
| 2007/0033055 A1 | 2/2007 | Tanaka |
| 2007/0038436 A1 | 2/2007 | Cristo et al. |
| 2007/0038461 A1 | 2/2007 | Abbott et al. |
| 2007/0046982 A1 | 3/2007 | Hull et al. |
| 2007/0047818 A1* | 3/2007 | Hull ............. G06K 9/00442 382/190 |
| 2007/0049682 A1 | 3/2007 | Walsh |
| 2007/0050360 A1 | 3/2007 | Hull et al. |
| 2007/0053360 A1 | 3/2007 | Hino et al. |
| 2007/0053380 A1 | 3/2007 | Graham |
| 2007/0059195 A1 | 3/2007 | Patterson |
| 2007/0061147 A1 | 3/2007 | Monne et al. |
| 2007/0061148 A1 | 3/2007 | Cross, Jr. et al. |
| 2007/0078822 A1* | 4/2007 | Cucerzan .......... G06F 17/30864 |
| 2007/0088556 A1 | 4/2007 | Andrew |
| 2007/0100624 A1* | 5/2007 | Weng ............. G06F 17/2715 704/257 |
| 2007/0100635 A1 | 5/2007 | Mahajan et al. |
| 2007/0150278 A1 | 6/2007 | Bates et al. |
| 2007/0162282 A1 | 7/2007 | Odinak |
| 2007/0174058 A1 | 7/2007 | Burns et al. |
| 2007/0198273 A1* | 8/2007 | Hennecke ............. G10L 15/26 704/277 |
| 2007/0208567 A1 | 9/2007 | Amento et al. |
| 2007/0219974 A1 | 9/2007 | Chickering et al. |
| 2007/0222734 A1 | 9/2007 | Tran |
| 2007/0233488 A1 | 10/2007 | Carus et al. |
| 2007/0237334 A1 | 10/2007 | Willins et al. |
| 2007/0239637 A1 | 10/2007 | Paek et al. |
| 2007/0276651 A1 | 11/2007 | Bliss et al. |
| 2007/0277196 A1* | 11/2007 | Steengaard ....... G06F 17/30035 725/37 |
| 2008/0005284 A1 | 1/2008 | Ungar et al. |
| 2008/0037727 A1 | 2/2008 | Sivertsen et al. |
| 2008/0040099 A1 | 2/2008 | Wu et al. |
| 2008/0046244 A1* | 2/2008 | Ohno ............. G10L 15/30 704/255 |
| 2008/0077386 A1 | 3/2008 | Gao et al. |
| 2008/0082329 A1 | 4/2008 | Watson |
| 2008/0091406 A1 | 4/2008 | Baldwin et al. |
| 2008/0091435 A1 | 4/2008 | Strope et al. |
| 2008/0091443 A1 | 4/2008 | Strope et al. |
| 2008/0091721 A1* | 4/2008 | Harboe ............. G06F 3/0482 |
| 2008/0114604 A1 | 5/2008 | Wei et al. |
| 2008/0120112 A1 | 5/2008 | Jordan et al. |
| 2008/0120665 A1 | 5/2008 | Relyea et al. |
| 2008/0126075 A1 | 5/2008 | Thorn |
| 2008/0130699 A1 | 6/2008 | Ma et al. |
| 2008/0133228 A1 | 6/2008 | Rao |
| 2008/0154600 A1 | 6/2008 | Tian et al. |
| 2008/0154611 A1 | 6/2008 | Evermann et al. |
| 2008/0159948 A1 | 7/2008 | Sesing et al. |
| 2008/0162136 A1 | 7/2008 | Agapi et al. |
| 2008/0183462 A1 | 7/2008 | Ma et al. |
| 2008/0221879 A1 | 9/2008 | Cerra et al. |
| 2008/0221880 A1 | 9/2008 | Cerra et al. |
| 2008/0221884 A1 | 9/2008 | Cerra et al. |
| 2008/0221889 A1 | 9/2008 | Cerra et al. |
| 2008/0221897 A1 | 9/2008 | Cerra et al. |
| 2008/0221898 A1 | 9/2008 | Cerra et al. |
| 2008/0221899 A1 | 9/2008 | Cerra et al. |
| 2008/0221900 A1 | 9/2008 | Cerra et al. |
| 2008/0221901 A1 | 9/2008 | Cerra et al. |
| 2008/0221902 A1 | 9/2008 | Cerra et al. |
| 2008/0262848 A1 | 10/2008 | Shienbrood et al. |
| 2008/0276168 A1* | 11/2008 | Mansfield ............. G06F 3/0236 715/702 |
| 2008/0288252 A1 | 11/2008 | Cerra et al. |
| 2008/0312934 A1 | 12/2008 | Cerra et al. |
| 2009/0006100 A1 | 1/2009 | Badger et al. |

(56) References Cited

U.S. PATENT DOCUMENTS

| | | |
|---|---|---|
| 2009/0030684 A1 | 1/2009 | Cerra et al. |
| 2009/0030685 A1 | 1/2009 | Cerra |
| 2009/0030687 A1 | 1/2009 | Cerra et al. |
| 2009/0030688 A1 | 1/2009 | Cerra et al. |
| 2009/0030691 A1 | 1/2009 | Cerra et al. |
| 2009/0030696 A1 | 1/2009 | Cerra et al. |
| 2009/0030697 A1 | 1/2009 | Cerra |
| 2009/0030698 A1 | 1/2009 | Cerra et al. |
| 2009/0319267 A1* | 12/2009 | Kurki-Suonio ......... G10L 15/30 704/235 |
| 2010/0106497 A1 | 4/2010 | Phillips |
| 2010/0139002 A1 | 6/2010 | Walker et al. |
| 2010/0185448 A1 | 7/2010 | Meisel |
| 2010/0250243 A1 | 9/2010 | Schalk et al. |
| 2011/0054894 A1 | 3/2011 | Phillips et al. |
| 2011/0054895 A1 | 3/2011 | Phillips et al. |
| 2011/0054896 A1 | 3/2011 | Phillips et al. |
| 2011/0054897 A1 | 3/2011 | Phillips et al. |
| 2011/0054898 A1 | 3/2011 | Phillips et al. |
| 2011/0054899 A1 | 3/2011 | Phillips et al. |
| 2011/0054900 A1 | 3/2011 | Phillips et al. |
| 2011/0055256 A1 | 3/2011 | Phillips et al. |
| 2011/0060587 A1 | 3/2011 | Phillips et al. |
| 2011/0066634 A1 | 3/2011 | Phillips et al. |

OTHER PUBLICATIONS

U.S. Appl. No. 12/184,342, Non-Final Office Action dated Jul. 29, 2010 , 42 pgs.

"U.S. Appl. No. 12/184,359, Non-Final Office Action dated Jul. 22, 2010", , 1/49.

"U.S. Appl. No. 12/184,286, Non-Final Office Action dated Jul. 20, 2010", , 37.

"U.S. Appl. No. 12/184,282, Non-Final Office Action dated Jul. 2, 2010", , 44.

Brendsted, et al., ""Distributed Speech Recognition forOOInformation Retrieval on Mobile Devices"", Sep. 2006.

Brendsted, et al., ""Mobile Information Access with Spoken Query Answering"", 2005.

ISA, , "International Search Report", For US Patent Application No. PCT/US2008/056242, dated Mar. 7, 2008 Mar. 7, 2008.

Mirkovic, et al., ""Practical Plug-and-Play Dialogue Management"", 2005.

Paek, et al., "Improving command and control speech recognitionD-Don mobile devices: using predictive user models for language modeling", Jan. 18, 2007.

Rayner, et al., ""Plug and Play Speech Understanding"", 2001.

Xu, et al., ""A Configurable Distributed Speech Recognition System"", Sep. 2005.

"U.S. Appl. No. 11/866,818, Non-Final Office Action dated Jun. 9, 2011", , 22.

"U.S. Appl. No. 12/044,573, Non-Final Office Action dated Jul. 7, 2011", , 38.

"U.S. Appl. No. 12/184,375, Final Office Action dated Jul. 5, 2011", , 22.

"U.S. Appl. No. 12/184,465, Notice of Allowance dated Jun. 27, 2011", , 26.

"U.S. Appl. No. 11/865,692, Non-Final Office Action dated Dec. 23, 2010", , 19.

"U.S. Appl. No. 11/865,694, Non-Final Office Action dated Feb. 2, 2011", , 14.

"U.S. Appl. No. 11/866,704, Non-Final Office Action dated Feb. 11, 2011", , 24.

"U.S. Appl. No. 11/866,725, Non-Final Office Action dated Feb. 14, 2011".

"U.S. Appl. No. 11/866,755, Non-Final Office Action dated Mar. 8, 2011", , 25.

"U.S. Appl. No. 11/866,777, Non-Final Office Action dated Mar. 8, 2011", , 25.

"U.S. Appl. No. 11/866,804, Non-Final Office Action dated Mar. 7, 2011", , 25.

"U.S. Appl. No. 12/184,375, Non-Final Office Action dated Jan. 26, 2011", , 28.

"U.S. Appl. No. 12/184,465", Non-Final Office Action dated Jan. 26, 2011, 32.

"U.S. Appl. No. 12/184,512, Non-Final Office Action dated Jan. 26, 2011", , 16.

"U.S. Appl. No. 12/603,446, Non-Final Office Action dated Feb. 23, 2011", , 25.

"U.S. Appl. No. 12/184,282, Final Office Action dated Dec. 15, 2010", , 152.

"U.S. Appl. No. 12/184,286, Final Office Action dated Mar. 9, 2011", , 44.

"U.S. Appl. No. 12/184,359, Final Office Action dated Mar. 4, 2011", , 51.

"ETSI ES 202 212 V1.1.2 (Nov. 2005)", Nov. 2005 , all.

Brondsted, et al., "Mobile Information Access with Spoken Query Answering", 2005 , pp. 4.

Brondsted, "Mobile Information Access with Spoken Query Answering", 2005 , 1-4.

"U.S. Appl. No. 11/865,697, Non-Final Office Action dated Mar. 17, 2011", , 14.

"U.S. Appl. No. 11/866,675, Non-Final Office Action dated May 10, 2011", , 19.

"U.S. Appl. No. 12/184,342, Final Office Action dated Apr. 5, 2011", , 49.

Sorin, et al., "The ETSI Extended Distributed Speech Recognition (DSR) Standards: Client Side Processing and Tonal Language Recognition Evaluation", 2004 , 129-132.

Ramabadran, et al., "The ETSI Extended Distributed Speech Recognition (DSR) Standards: Server-Side Speech Reconstruction", 2004 , 53-56.

"Application Serial No. 111866,675, Final Office Action dated Oct. 4, 2011", , 23.

"Application Serial No. 111866,725, Final Office Action dated Oct. 4, 2011", , 26.

"Application Serial No. 111866,755, Final Office Action dated Oct. 4, 2011", , 25.

"U.S. Appl. No. 12/123,952, Non-Final Office Action dated Sep. 8, 2011", , 20.

"U.S. Appl. No. 12/184,282, Non Final Office Action dated Aug. 24, 2011", , 81.

"U.S. Appl. No. 12/184,465, Non-Final Office Action dated Oct. 21, 2011", , 27.

"U.S. Appl. No. 12/603,446, Non-Final Office Action dated Oct. 19, 2011", , 23.

"U.S. Appl. No. 11/865,692, Final Office Action dated Sep. 30, 2011", , 20.

"U.S. Appl. No. 11/865,694, Final Office Action dated Sep. 30, 2011", , 18.

"U.S. Appl. No. 11/865,697, Final Office Action dated Oct. 4, 2011", , 16.

"U.S. Appl. No. 11/866,777, Final Office Action dated Sep. 30, 2011", , 25.

"U.S. Appl. No. 11/866,804, Final Office Action dated Sep. 30, 2011", , 25.

"U.S. Appl. No. 11/866,704, Final Office Action dated Oct. 4, 2011", , 26.

"U.S. Appl. No. 12/184,512, Non-Final Office Action dated Aug. 26, 2011", , 24.

"European Search Report, Appl No. 08731692.3", dated Jun. 20, 2011 , all.

"U.S. Appl. No. 12/184,375, Non-Final Office Action dated Dec. 2, 2011", , 15.

"U.S. Appl. No. 11/866,818, Final Office Action dated Feb. 17, 2012", , 24.

"U.S. Appl. No. 12/603,446, Final Office Action dated Jul. 13, 2012", 26 pgs.

"U.S. Appl. No. 12/184,375, Final Office Action dated Jun. 27, 2012", 22 pages.

"U.S. Appl. No. 11/866,777, Non-Final Office Action dated Jun. 14, 2012", 27 pages.

(56) References Cited

OTHER PUBLICATIONS

"U.S. Appl. No. 12/184,465, Final Office Action dated Jun. 27, 2012", 33 pages.
"U.S. Appl. No. 12/184,512, Final Office Action dated May 2, 2012", 25 pages.
"U.S. Appl. No. 12/870,257, Non-Final Office Action dated May 1, 2012", 24 pgs.
"U.S. Appl. No. 12/184,282, Final Office Action dated Apr. 25, 2012", 23 pages.
"U.S. Appl. No. 12/044,573, Final Office Action dated Apr. 19, 2012", 28 pages.
"U.S. Appl. No. 12/870,221, Non-Final Office Action dated Mar. 12, 2012", 24 pages.
"U.S. Appl. No. 12/123,952, Final Office Action dated May 14, 2012", 23 Pgs.
Notice of Allowance received in U.S. Appl. No. 12/603,446 dated Jul. 30, 2014.
Office Action received in European application 08731692.3 dated May 21, 2014.
Final Office Action received in U.S. Appl. No. 11/866,777 dated Feb. 1, 2013.
Final Office Action received in U.S. Appl. No. 12/184,286 dated Oct. 21, 2013.
Final Office Action received in U.S. Appl. No. 12/184,342 dated Oct. 23, 2013.
Final Office Action received in U.S. Appl. No. 12/184,490 dated May 2, 2012.
Final Office Action received in U.S. Appl. No. 12/603,446 dated Apr. 24, 2013.
Final Office Action received in U.S. Appl. No. 12/691,504 dated Apr. 30, 2013.
Final Office Action received in U.S. Appl. No. 12/870,221 dated Oct. 25, 2012.
Final Office Action received in U.S. Appl. No. 12/870,221 dated Apr. 30, 2014.
Final Office Action received in U.S. Appl. No. 12/870,257 dated Jan. 16, 2013.
Final Office Action received in U.S. Appl. No. 12/870,368 dated Nov. 21, 2013.
Galindo et al., "Control Architecture for Human-Robot Integration: Application to a Robotic Wheelchair," IEEE Transactions on Systems, Man, and Cybernetics—Part B: Cybernetics, vol. 36, No. 5 (Oct. 2006).
Harper et al., "Integrating Language Models with Speech Recognition," Purdue University, http://www.umiacs.umd.edu/~mharper/papers/aaai94.pdf, 9 pages, (retrieved on Mar. 26, 2014).
Li, Jin-Yu, et al., "A Complexity Reduction of ETSI Advanced Front-End for DSR," ICASSP 2004, IEEE, pp. I-61-4 vol. 1 (May 17-21, 2004).
Non-Final Office Action received in U.S. Appl. No. 11/865,692 dated Oct. 3, 2013.
Non-Final Office Action received in U.S. Appl. No. 11/865,694 dated Oct. 8, 2013.
Non-Final Office Action received in U.S. Appl. No. 11/865,694 dated Jun. 5, 2014.
Non-Final Office Action received in U.S. Appl. No. 11/865,697 dated Oct. 3, 2013.
Non-Final Office Action received in U.S. Appl. No. 11/866,675 dated Feb. 26, 2014.
Non-Final Office Action received in U.S. Appl. No. 11/866,704 dated Aug. 30, 2013.
Non-Final Office Action received in U.S. Appl. No. 11/866,725 dated Sep. 10, 2013.
Non-Final Office Action received in U.S. Appl. No. 11/866,755 dated Oct. 10, 2013.
Non-Final Office Action received in U.S. Appl. No. 11/866,804 dated Nov. 8, 2013.
Non-Final Office Action received in U.S. Appl. No. 12/044,573 dated Dec. 5, 2013.
Non-Final Office Action received in U.S. Appl. No. 12/184,375 dated Oct. 28, 2013.
Non-Final Office Action received in U.S. Appl. No. 12/184,490 dated Jan. 27, 2011.
Non-Final Office Action received in U.S. Appl. No. 12/184,490 dated Aug. 25, 2011.
Non-Final Office Action received in U.S. Appl. No. 12/603,446 dated Oct. 16, 2013.
Non-Final Office Action received in U.S. Appl. No. 12/603,446 dated Dec. 6, 2012.
Non-Final Office Action received in U.S. Appl. No. 12/691,504 dated Oct. 3, 2012.
Non-Final Office Action received in U.S. Appl. No. 12/870,008 dated Jan. 31, 2013.
Non-Final Office Action received in U.S. Appl. No. 12/870,025 dated Jan. 23, 2013.
Non-Final Office Action received in U.S. Appl. No. 12/870,071 dated Jan. 18, 2013.
Non-Final Office Action received in U.S. Appl. No. 12/870,112 dated Feb. 13, 2013.
Non-Final Office Action received in U.S. Appl. No. 12/870,138 dated Nov. 19, 2013.
Non-Final Office Action received in U.S. Appl. No. 12/870,138 dated Mar. 13, 2013.
Non-Final Office Action received in U.S. Appl. No. 12/870,368 dated Feb. 12, 2013.
Non-Final Office Action received in U.S. Appl. No. 12/870,411 dated Dec. 6, 2012.
Non-Final Office Action received in U.S. Appl. No. 12/870,453 dated Dec. 7, 2012.
Notice of Allowance received in U.S. Appl. No. 11/865,692 dated Jun. 18, 2014.
Notice of Allowance received in U.S. Appl. No. 12/184,342 dated May 7, 2014.
Notice of Allowance received in U.S. Appl. No. 12/184,375 dated Apr. 30, 2014.
Notice of Allowance received in U.S. Appl. No. 12/603,446 dated May 2, 2014.
Notice of Allowance received in U.S. Appl. No. 12/691,504 dated Jul. 24, 2014.
Notice of Allowance received in U.S. Appl. No. 12/870,257 dated Sep. 13, 2013.
Notice of Allowance received in U.S. Appl. No. 11/865,692 dated Aug. 15, 2014.
Notice of Allowance received in U.S. Appl. No. 11/865,694 dated Nov. 21, 2014.
Notice of Allowance received in U.S. Appl. No. 12/870,221 dated Oct. 1, 2014.
Notice of Allowance received in U.S. Appl. No. 12/184,375 dated Aug. 4, 2014.
Notice of Allowance in related U.S. Appl. No. 14/537,418, dated Jun. 7, 2016 (51 pages).
Ex Parte Quayle Action in related U.S. Appl. No. 14/570,404, dated Jul. 8, 2016 (47 pages).
Non-Final Office Action in related U.S. Appl. No. 14/570,404, dated Dec. 2, 2015 (10 pages).
Non-Final Office Action in related U.S. Appl. No. 14/537,418, dated Nov. 27, 2015 (8 pages).
Toru Imai et al., An Automatic Caption-Superimposing System With A New Continuous Speech Recognizer, Sep. 1994, IEEE, vol. 40, No. 3, 184-189.

* cited by examiner

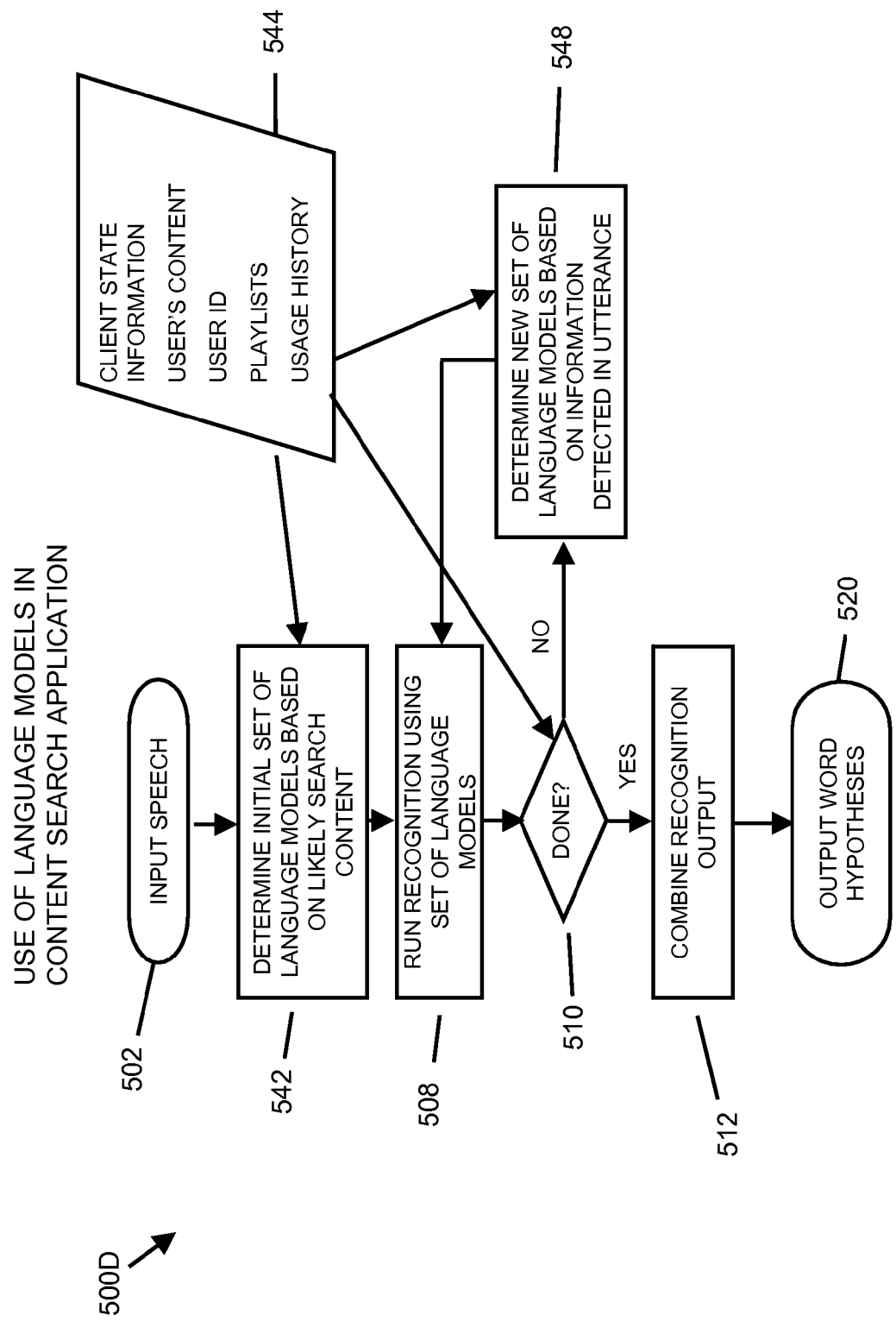

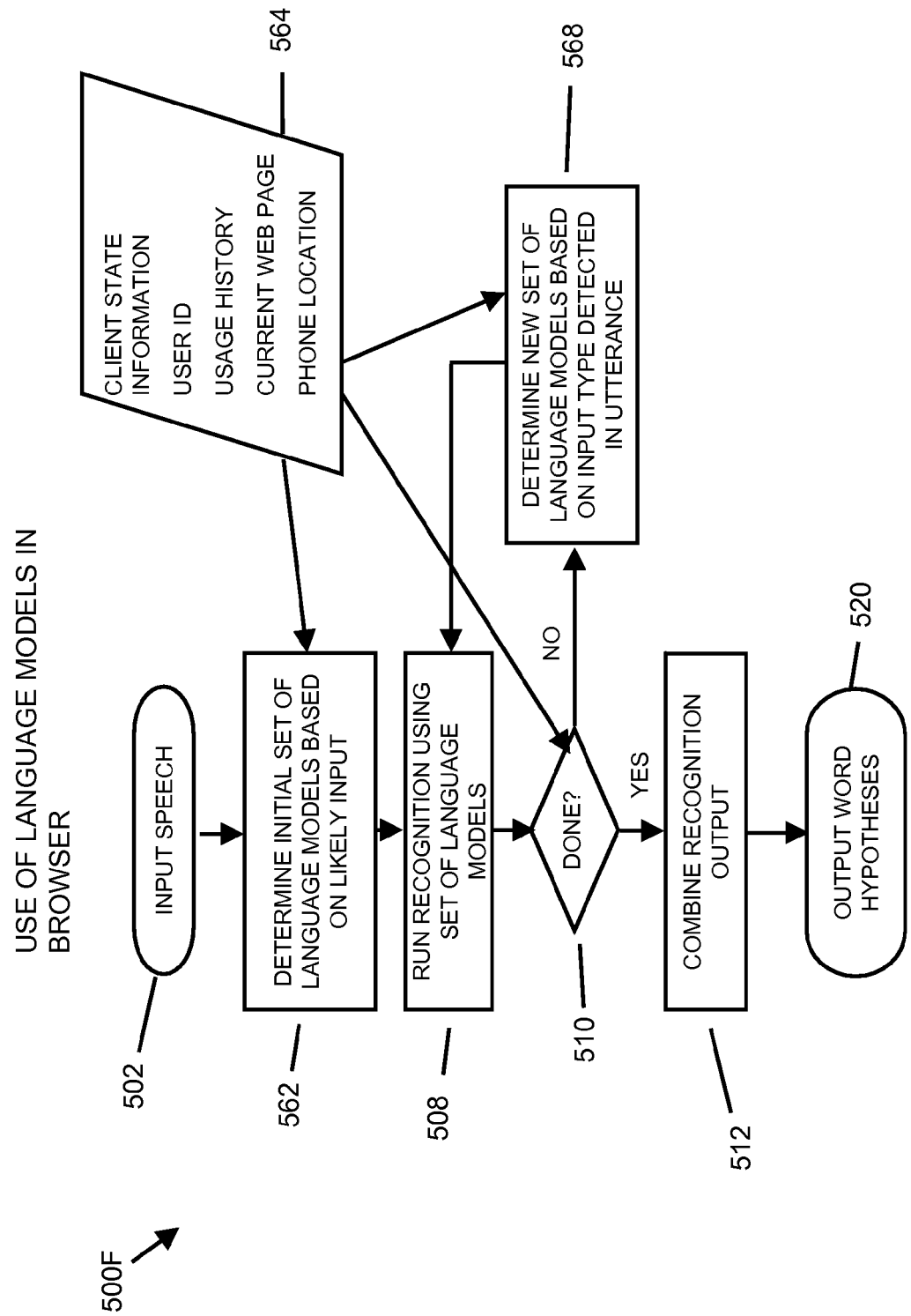

```
<RouterStatus maxServers="max number servers" activeThreadCount="number active
threads" timestamp="month/day/year hour:min:second.millisecond am/pm">
    <RegisteredModels count="number of registered models">
        <Model AM="server am" LM="server lm"/>
        ⋮
    </RegisteredModels>
    <RegisteredServers count="number of registered servers">
        <Server ID="server id"/>
        ⋮
    </RegisteredServers>
    <ActiveServers count="number of active servers">
        <Server ID="server id" IP="ip address" port="port number"
name="server name" AM="server am" LM="server lm" protocol="server protocol (float)"
load="load (double)" utteranceLoad="load (int) sessionLoad="load (int)"
available="availability (true/false)"/>
        ⋮
    </ActiveServers>
</RouterStatus>/0
```

USING SPEECH RECOGNITION RESULTS BASED ON AN UNSTRUCTURED LANGUAGE MODEL WITH A MUSIC SYSTEM

CROSS-REFERENCE TO RELATED APPLICATIONS

This application claims the benefit of the following provisional applications, each of which is hereby incorporated by reference in its entirety: U.S. Provisional App. Ser. No. 60976050 filed Sep. 28, 2007; U.S. Provisional App. Ser. No. 60977143 filed Oct. 3, 2007; and U.S. Provisional App. Ser. No. 61034794 filed Mar. 7, 2008.

This application is a continuation-in-part of the following U.S. patent applications, each of which is incorporated by reference in its entirety: U.S. patent application Ser. No. 11/865,692 filed Oct. 1, 2007; U.S. patent application Ser. No. 11/865,694 filed Oct. 1, 2007; U.S. patent application Ser. No. 11/865,697 filed Oct. 1, 2007; U.S. patent application Ser. No. 11/866,675 filed Oct. 3, 2007; U.S. patent application Ser. No. 11/866,704 filed Oct. 3, 2007; U.S. patent application Ser. No. 11/866,725 filed Oct. 3, 2007; U.S. patent application Ser. No. 11/866,755 filed Oct. 3, 2007; U.S. patent application Ser. No. 11/866,777 filed Oct. 3, 2007; U.S. patent application Ser. No. 11/866,804 filed Oct. 3, 2007; U.S. patent application Ser. No. 11/866,818 filed Oct. 3, 2007; and U.S. patent application Ser. No. 12/044,573 filed Mar. 7, 2008 which claims the benefit of U.S. Provisional App. Ser. No. 60893600 filed Mar. 7, 2007.

This application is a continuation of U.S. patent application Ser. No. 12/123,952 filed May 20, 2008.

This application claims priority to international patent application Ser. No. PCTUS2008056242 filed Mar. 7, 2008.

BACKGROUND

Field:

The present invention is related to speech recognition, and specifically to speech recognition in association with a mobile communications facility or a device which provides a service to a user such as a music playing device or a navigation system.

Description of the Related Art:

Speech recognition, also known as automatic speech recognition, is the process of converting a speech signal to a sequence of words by means of an algorithm implemented as a computer program. Speech recognition applications that have emerged in recent years include voice dialing (e.g., call home), call routing (e.g., I would like to make a collect call), simple data entry (e.g., entering a credit card number), and preparation of structured documents (e.g., a radiology report). Current systems are either not for mobile communication devices or utilize constraints, such as requiring a specified grammar, to provide real-time speech recognition.

SUMMARY

The current invention provides a facility for unconstrained, mobile or device-based, real-time speech recognition. The current invention allows an individual with a mobile communications facility to use speech recognition to enter text, such as into a communications application, such as an SMS message, instant messenger, e-mail, or any other application, such as applications for getting directions, entering a query word string into a search engine, commands into a navigation or map program, and a wide range of other text entry applications. In addition, the current invention allows users to interact with a wide range of devices, such music players or navigation systems, to perform a variety of tasks (e.g. choosing a song, entering a destination, and the like). These devices may be specialized devices for performing such a function, or may be general purpose computing, entertainment, or information devices that interact with the user to perform some function for the user.

In embodiments the present invention may provide for the entering of text into a software application resident on a mobile communication facility, where recorded speech may be presented by the user using the mobile communications facility's resident capture facility. Transmission of the recording may be provided through a wireless communication facility to a speech recognition facility, and may be accompanied by information related to the software application. Results may be generated utilizing the speech recognition facility that may be independent of structured grammar, and may be based at least in part on the information relating to the software application and the recording. The results may then be transmitted to the mobile communications facility, where they may be loaded into the software application. In embodiments, the user may be allowed to alter the results that are received from the speech recognition facility. In addition, the speech recognition facility may be adapted based on usage.

In embodiments, the information relating to the software application may include at least one of an identity of the application, an identity of a text box within the application, contextual information within the application, an identity of the mobile communication facility, an identity of the user, and the like.

In embodiments, the step of generating the results may be based at least in part on the information relating to the software application involved in selecting at least one of a plurality of recognition models based on the information relating to the software application and the recording, where the recognition models may include at least one of an acoustic model, a pronunciation, a vocabulary, a language model, and the like, and at least one of a plurality of language models, wherein the at least one of the plurality of language models may be selected based on the information relating to the software application and the recording. In embodiments, the plurality of language models may be run at the same time or in multiple passes in the speech recognition facility. The selection of language models for subsequent passes may be based on the results obtained in previous passes. The output of multiple passes may be combined into a single result by choosing the highest scoring result, the results of multiple passes, and the like, where the merging of results may be at the word, phrase, or the like level.

In embodiments, adapting the speech recognition facility may be based on usage that includes at least one of adapting an acoustic model, adapting a pronunciation, adapting a vocabulary, adapting a language model, and the like. Adapting the speech recognition facility may include adapting recognition models based on usage data, where the process may be an automated process, the models may make use of the recording, the models may make use of words that are recognized, the models may make use of the information relating to the software application about action taken by the user, the models may be specific to the user or groups of users, the models may be specific to text fields within the software application or groups of text fields within the software applications, and the like.

In embodiments, the step of allowing the user to alter the results may include the user editing a text result using at least one of a keypad or a screen-based text correction mechanism, selecting from among a plurality of alternate choices of words contained in the results, selecting from among a plurality of alternate actions related to the results, selecting among a plurality of alternate choices of phrases contained in the results, selecting words or phrases to alter by speaking or typing, positioning a cursor and inserting text at the cursor position by speaking or typing, and the like. In addition, the speech recognition facility may include a plurality of recognition models that may be adapted based on usage, including utilizing results altered by the user, adapting language models based on usage from results altered by the user, and the like.

In embodiments, the present invention may provide this functionality across application on a mobile communication facility. So, it may be present in more than one software application running on the mobile communication facility. In addition, the speech recognition functionality may be used to not only provide text to applications but may be used to decide on an appropriate action for a user's query and take that action either by performing the action directly, or by invoking an application on the mobile communication facility and providing that application with information related to what the user spoke so that the invoked application may perform the action taking into account the spoken information provided by the user.

In embodiments, the speech recognition facility may also tag the output according to type or meaning of words or word strings and pass this tagging information to the application. Additionally, the speech recognition facility may make use of human transcription input to provide real-term input to the overall system for improved performance. This augmentation by humans may be done in a way which is largely transparent to the end-user.

In embodiments, the present invention may provide all of this functionality to a wide range of devices including special purpose devices such as music players, personal navigation systems, set-top boxes, digital video recorders, in-car devices, and the like. It may also be used in more general purpose computing, entertainment, information, and communication devices.

The system components including the speech recognition facility, user database, content database, and the like may be distributed across a network or in some implementations may be resident on the device itself, or may be a combination of resident and distributed components. Based on the configuration, the system components may be loosely coupled through well-defined communication protocols and APIs or may be tightly tied to the applications or services on the device.

A method and system of entering text into a music system is provided. The method and system may include recording speech presented by a user using a resident capture facility, providing the recording to a speech recognition facility, generating results utilizing the speech recognition facility using an unstructured language model based at least in part on the information relating to the recording, and using the results in the music system.

In embodiments, using user feedback may adapt the unstructured language model.

In embodiments, the speech recognition facility may be remotely located from the music system. The music system may provide information relating to the music application to the speech recognition facility and the generating results is based at least in part on this information.

The information relating to the music application may include at least one of an identity of the application, an identity of a text box within the application, contextual information within the application, an identity of the music system, and an identity of the user. The contextual information may include at least one of the usage history of the music application, information from a user's favorites list or playlists, information about music currently stored on the music system, and information currently displayed in the music application.

In embodiments, the step of generating the results based at least in part on the information relating to the music application involves selecting at least one of a plurality of recognition models based on the information relating to the music application and the recording. The speech recognition facility may select at least one language model based at least in part on the information relating to music system. The at least one selected language model may be at least one of a general language model for artists, a general language models for song titles, and a general language model for music types. The at least one selected language model may be based on an estimate of the type of music the user is interested in.

A method and system of entering text into music system is provided. The method and system may include recording speech presented by a user using a resident capture facility, providing the recording to a speech recognition facility, generating results utilizing the speech recognition facility using an unstructured language model based at least in part on the information relating to the recording, using the results in the music system and adapting the speech recognition facility based on usage.

In embodiments, the speech recognition facility may be remotely located from the music system. In embodiments, adapting the speech recognition facility may be based on usage includes at least one of adapting an acoustic model, adapting a set of pronunciations, adapting a vocabulary, and adapting a language model. Adapting the speech recognition facility may include adapting recognition models based on usage data. Adapting recognition models may make use of the information from the music system about actions taken by the user. Adapting recognition models may be specific to the music system. Adapting recognition models may be specific to text fields within the music application running on the music system or groups of text fields within the music application.

In embodiments, the music system may provide information relating to the music application running on the music system to the speech recognition facility and the generating results is based at least in part on this information. The information may relate to the music application includes at least one of an identity of the application, an identity of a text box within the application, contextual information within the application, an identity of the music system, and an identity of the user.

In embodiments, the step of generating the results based at least in part on the information relating to the music application involves selecting at least one of a plurality of recognition models based on the information relating to the music application and the recording.

A method and system of entering text into a music system is provided. The method and system may include recording speech presented by a user using a resident capture facility, providing the recording to a speech recognition facility, generating results utilizing the speech recognition facility using an unstructured language model based at least in part on the information relating to the recording, allowing the user to alter the results and using the results in the music system.

In embodiments, the speech recognition facility may be remotely located from the music system. The music system may provide information relating to the music application running on the music system to the speech recognition facility and the generating results is based at least in part on music related information.

In embodiments, the step of allowing the user to alter the results may include the user editing a text result using at least one of a set of button or other controls, and a screen-based text correction mechanism on the music system.

In embodiments, the step of allowing the user to alter the results may include the user selecting from among a plurality of alternate choices of words contained in the results from the speech recognition facility.

In embodiments, the step of allowing the user to alter the results includes the user selecting from among a plurality of alternate actions related to the results from the speech recognition facility.

In embodiments, the step of allowing the user to alter the results may include the user selecting words or phrases to alter by speaking or typing.

In embodiments, the step of allowing the user to alter the results includes the user selecting words or phrases to alter by speaking or typing.

These and other systems, methods, objects, features, and advantages of the present invention will be apparent to those skilled in the art from the following detailed description of the preferred embodiment and the drawings. All documents mentioned herein are hereby incorporated in their entirety by reference.

BRIEF DESCRIPTION OF THE FIGURES

The invention and the following detailed description of certain embodiments thereof may be understood by reference to the following figures:

FIG. 5D depicts the process by which multiple language models may be used by the ASR engine for a content search application embodiment.

FIG. 5F depicts the process by which multiple language models may be used by the ASR engine for a browser application embodiment.

FIG. 19 depicts the format of a status packet.

DETAILED DESCRIPTION

Figure 1:
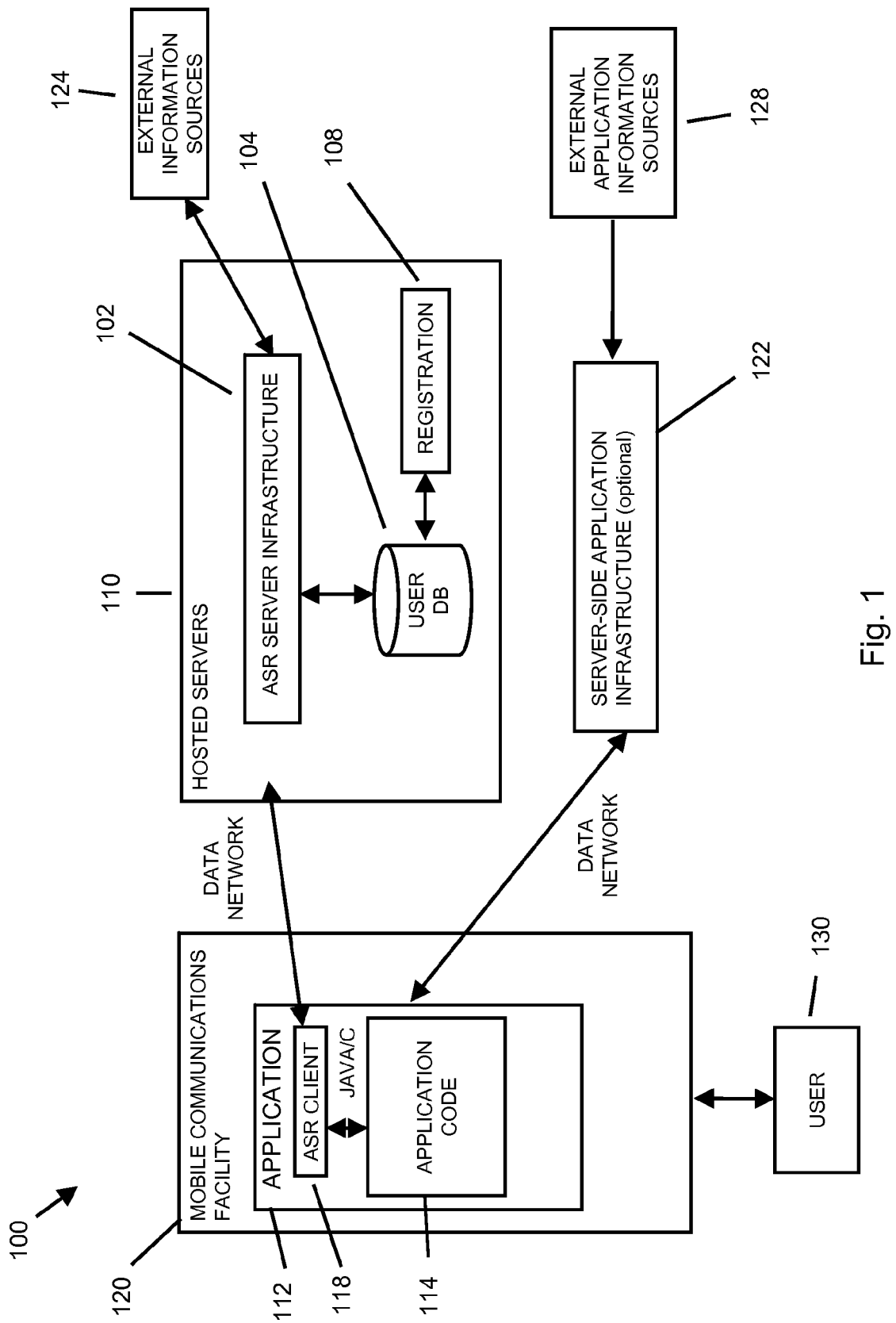
FIG. 1 depicts a block diagram of the mobile environment speech processing facility.

The current invention may provide an unconstrained, real-time, mobile environment speech processing facility 100, as shown in FIG. 1, that allows a user with a mobile communications facility 120 to use speech recognition to enter text into an application 112, such as a communications application, an SMS message, IM message, e-mail, chat, blog, or the like, or any other kind of application, such as a social network application, mapping application, application for obtaining directions, search engine, auction application, application related to music, travel, games, or other digital media, enterprise software applications, word processing, presentation software, and the like. In various embodiments, text obtained through the speech recognition facility described herein may be entered into any application or environment that takes text input.

In an embodiment of the invention, the user's 130 mobile communications facility 120 may be a mobile phone, programmable through a standard programming language, such as Java, C, Brew, C++, and any other current or future programming language suitable for mobile device applications, software, or functionality. The mobile environment speech processing facility 100 may include a mobile communications facility 120 that is preloaded with one or more applications 112. Whether an application 112 is preloaded or not, the user 130 may download an application 112 to the mobile communications facility 120. The application 112 may be a navigation application, a music player, a music download service, a messaging application such as SMS or email, a video player or search application, a local search application, a mobile search application, a general internet browser, or the like. There may also be multiple applications 112 loaded on the mobile communications facility 120 at the same time. The user 130 may activate the mobile environment speech processing facility's 100 user interface software by starting a program included in the mobile environment speech processing facility 120 or activate it by performing a user 130 action, such as pushing a button or a touch screen to collect audio into a domain application. The audio signal may then be recorded and routed over a network to servers 110 of the mobile environment speech processing facility 100. Text, which may represent the user's 130 spoken words, may be output from the servers 110 and routed back to the user's 130 mobile communications facility 120, such as for display. In embodiments, the user 130 may receive feedback from the mobile environment speech processing facility 100 on the quality of the audio signal, for example, whether the audio signal has the right amplitude; whether the audio signal's amplitude is clipped, such as clipped at the beginning or at the end; whether the signal was too noisy; or the like.

The user 130 may correct the returned text with the mobile phone's keypad or touch screen navigation buttons. This process may occur in real-time, creating an environment where a mix of speaking and typing is enabled in combination with other elements on the display. The corrected text may be routed back to the servers 110, where an Automated Speech Recognition (ASR) Server infrastructure 102 may use the corrections to help model how a user 130 typically speaks, what words are used, how the user 130 tends to use words, in what contexts the user 130 speaks, and the like. The user 130 may speak or type into text boxes, with keystrokes routed back to the ASR server infrastructure 102.

In addition, the hosted servers 110 may be run as an application service provider (ASP). This may allow the benefit of running data from multiple applications 112 and users 130, combining them to make more effective recognition models. This may allow usage based adaptation of speech recognition to the user 130, to the scenario, and to the application 112.

One of the applications 112 may be a navigation application which provides the user 130 one or more of maps, directions, business searches, and the like. The navigation application may make use of a GPS unit in the mobile communications facility 120 or other means to determine the current location of the mobile communications facility 120. The location information may be used both by the mobile environment speech processing facility 100 to predict what users may speak, and may be used to provide better location searches, maps, or directions to the user. The navigation application may use the mobile environment speech processing facility 100 to allow users 130 to enter addresses, business names, search queries and the like by speaking.

Another application 112 may be a messaging application which allows the user 130 to send and receive messages as text via Email, SMS, IM, or the like to and from other people. The messaging application may use the mobile environment speech processing facility 100 to allow users 130 to speak messages which are then turned into text to be sent via the existing text channel.

Another application 112 may be a music application which allows the user 130 to play music, search for locally stored content, search for and download and purchase content from network-side resources and the like. The music application may use the mobile environment speech processing facility 100 to allow users 130 to speak song title, artist names, music categories, and the like which may be used to search for music content locally or in the network, or may allow users 130 to speak commands to control the functionality of the music application.

Another application 112 may be a content search application which allows the user 130 to search for music, video, games, and the like. The content search application may use the mobile environment speech processing facility 100 to allow users 130 to speak song or artist names, music categories, video titles, game titles, and the like which may be used to search for content locally or in the network Another application 112 may be a local search application which allows the user 130 to search for business, addresses, and the like. The local search application may make use of a GPS unit in the mobile communications facility 120 or other means to determine the current location of the mobile communications facility 120. The current location information may be used both by the mobile environment speech processing facility 100 to predict what users may speak, and may be used to provide better location searches, maps, or directions to the user. The local search application may use the mobile environment speech processing facility 100 to allow users 130 to enter addresses, business names, search queries and the like by speaking.

Another application 112 may be a general search application which allows the user 130 to search for information and content from sources such as the World Wide Web. The general search application may use the mobile environment speech processing facility 100 to allow users 130 to speak arbitrary search queries.

Another application 112 may be a browser application which allows the user 130 to display and interact with arbitrary content from sources such as the World Wide Web. This browser application may have the full or a subset of the functionality of a web browser found on a desktop or laptop computer or may be optimized for a mobile environment. The browser application may use the mobile environment speech processing facility 100 to allow users 130 to enter web addresses, control the browser, select hyperlinks, or fill in text boxes on web pages by speaking.

In an embodiment, the speech recognition facility 142 may be built into a device such as a music device 140 or a navigation system 150. In this case, the speech recognition facility allows users to enter information such as a song or artist name or a navigation destination into the device.

FIG. 1 depicts an architectural block diagram for the mobile environment speech processing facility 100, including a mobile communications facility 120 and hosted servers 110 The ASR client may provide the functionality of speech-enabled text entry to the application. The ASR server infrastructure 102 may interface with the ASR client 118, in the user's 130 mobile communications facility 120, via a data protocol, such as a transmission control protocol (TCP) connection or the like. The ASR server infrastructure 102 may also interface with the user database 104. The user database 104 may also be connected with the registration 108 facility. The ASR server infrastructure 102 may make use of external information sources 124 to provide information about words, sentences, and phrases that the user 130 is likely to speak. The application 112 in the user's mobile communication facility 120 may also make use of server-side application infrastructure 122, also via a data protocol. The server-side application infrastructure 122 may provide content for the applications, such as navigation information, music or videos to download, search facilities for content, local, or general web search, and the like. The server-side application infrastructure 122 may also provide general capabilities to the application such as translation of HTML or other web-based markup into a form which is suitable for the application 112. Within the user's 130 mobile communications facility 120, application code 114 may interface with the ASR client 118 via a resident software interface, such as Java, C, C++, and the like. The application infrastructure 122 may also interface with the user database 104, and with other external application information sources 128 such as the World Wide Web 330, or with external application-specific content such as navigation services, music, video, search services, and the like.

Figure 1A:
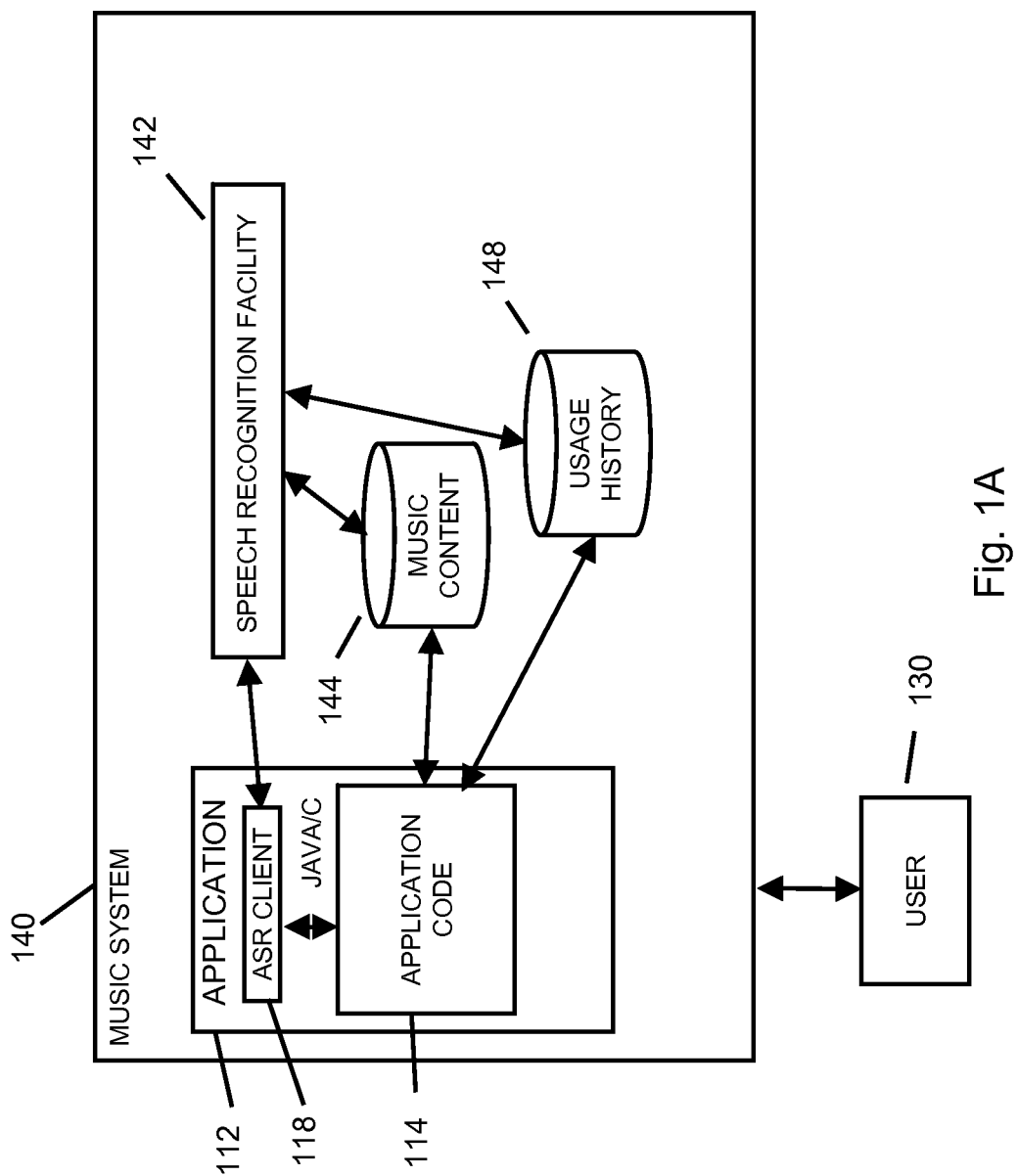
FIG. 1A depicts a block diagram of a music system.

FIG. 1A depicts the architecture in the case where the speech recognition facility 142 as described in various preferred embodiments disclosed herein is associated with or built into a music device 140. The application 112 provides functionality for selecting songs, albums, genres, artists, play lists and the like, and allows the user 130 to control a variety of other aspects of the operation of the music player such as volume, repeat options, and the like. In an embodiment, the application code 114 interacts with the ASR client 118 to allow users to enter information, enter search terms, provide commands by speaking, and the like. The ASR client 118 interacts with the speech recognition facility 142 to recognize the words that the user spoke. There may be a database of music content 144 on or available to the device which may be used both by the application code 114 and by the speech recognition facility 142. The speech recognition facility 142 may use data or metadata from the database of music content 144 to influence the recognition models used by the speech recognition facility 142. There may be a database of usage history 148 which keeps track of the past usage of the music system 140. This usage history 148 may include songs, albums, genres, artists, and play lists the user 130 has selected in the past. In embodiments, the usage history 148 may be used to influence the recognition models used in the speech recognition facility 142. This influence of the recognition models may include altering the language models to increase the probability that previously requested artists, songs, albums, or other music terms may be recognized in future queries. This may include directly altering the probabilities of terms used in the past, and may also include altering the probabilities of terms related to those used in the past. These related terms may be derived based on the structure of the data, for example groupings of artists or other terms based on genre, so that if a user asks for an artist from a particular genre, the terms associated with other artists in that genre may be altered. Alternatively, these related terms may be derived based on correlations of usages of terms observed in the past, including observations of usage across users. Therefore, it may be learned by the system that if a user asks for artist1, they are also likely to ask about artist2 in the future. The influence of the language models based on usage may also be based on error-reduction criteria. So, not only may the probabilities of used terms be increased in the language models, but in addition, terms which are misrecognized may be penalized in the language models to decrease their chances of future misrecognitions.

Figure 1B:
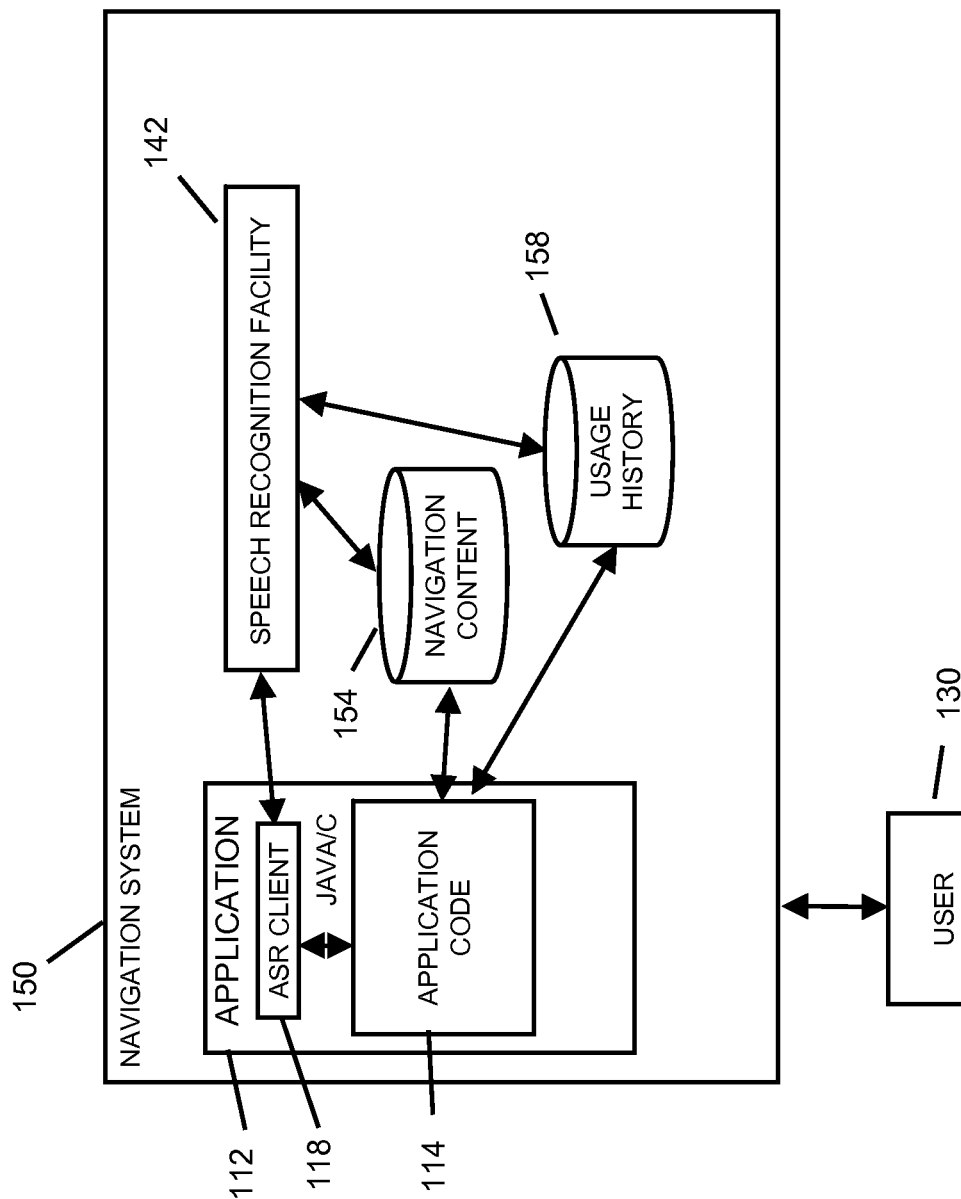
FIG. 1B depicts a block diagram of a navigation system.

FIG. 1B depicts the architecture in the case where the speech recognition facility 142 is built into a navigation system 150. The navigation system 150 might be an in-vehicle navigation system, a personal navigation system, or other type of navigation system. In embodiments the navigation system 150 might, for example, be a personal navigation system integrated with a mobile phone or other mobile facility as described throughout this disclosure. The application 112 of the navigation system 150 can provide functionality for selecting destinations, computing routes, drawing maps, displaying points of interest, managing favorites and the like, and can allow the user 130 to control a variety of other aspects of the operation of the navigation system, such as display modes, playback modes, and the like. The application code 114 interacts with the ASR client 118 to allow users to enter information, destinations, search terms, and the like and to provide commands by speaking. The ASR client 118 interacts with the speech recognition facility 142 to recognize the words that the user spoke. There may be a database of navigation-related content 154 on or available to the device. Data or metadata from the database of navigation-related content 154 may be used both by the application code 114 and by the speech recognition facility 142. The navigation content or metadata may include general information about maps, streets, routes, traffic patterns, points of interest and the like, and may include information specific to the user such as address books, favorites, preferences, default locations, and the like. The speech recognition facility 142 may use this navigation content 154 to influence the recognition models used by the speech recognition facility 142. There may be a database of usage history 158 which keeps track of the past usage of the navigation system 150. This usage history 158 may include locations, search terms, and the like that the user 130 has selected in the past. The usage history 158 may be used to influence the recognition models used in the speech recognition facility 142. This influence of the recognition models may include altering the language models to increase the probability that previously requested locations, commands, local searches, or other navigation terms may be recognized in future queries. This may include directly altering the probabilities of terms used in the past, and may also include altering the probabilities of terms related to those used in the past. These related terms may be derived based on the structure of the data, for example business names, street names, or the like within particular geographic locations, so that if a user asks for a destination within a particular geographic location, the terms associated with other destinations within that geographic location may be altered. Or, these related terms may be derived based on correlations of usages of terms observed in the past, including observations of usage across users. So, it may be learned by the system that if a user asks for a particular business name they may be likely to ask for other related business names in the future. The influence of the language models based on usage may also be based on error-reduction criteria. So, not only may the probabilities of used terms be increased in the language models, but in addition, terms which are misrecognized may be penalized in the language models to decrease their chances of future misrecognitions.

Figure 1C:
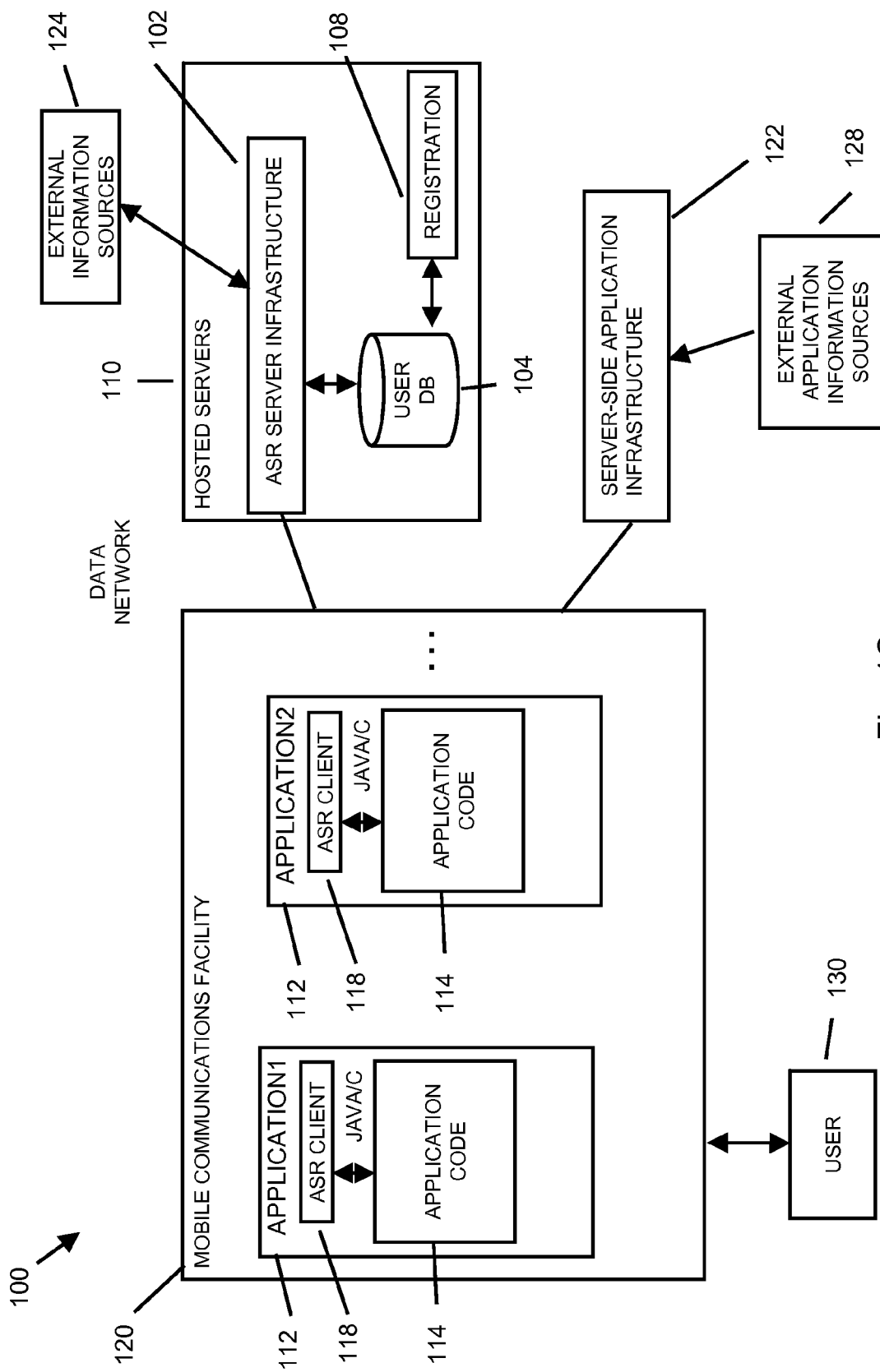
FIG. 1C depicts a block diagram of a mobile communications facility.

FIG. 1C depicts the case wherein multiple applications 112, each interact with one or more ASR clients 118 and use speech recognition facilities 110 to provide speech input to each of the multiple applications 112. The ASR client 118 may facilitate speech-enabled text entry to each of the multiple applications. The ASR server infrastructure 102 may interface with the ASR clients 118 via a data protocol, such as a transmission control protocol (TCP) connection, HTTP, or the like. The ASR server infrastructure 102 may also interface with the user database 104. The user database 104 may also be connected with the registration 108 facility. The ASR server infrastructure 102 may make use of external information sources 124 to provide information about words, sentences, and phrases that the user 130 is likely to speak. The applications 112 in the user's mobile communication facility 120 may also make use of server-side application infrastructure 122, also via a data protocol. The server-side application infrastructure 122 may provide content for the applications, such as navigation information, music or videos to download, search facilities for content, local, or general web search, and the like. The server-side application infrastructure 122 may also provide general capabilities to the application such as translation of HTML or other web-based markup into a form which is suitable for the application 112. Within the user's 130 mobile communications facility 120, application code 114 may interface with the ASR client 118 via a resident software interface, such as Java, C, C++, and the like. The application infrastructure 122 may also interface with the user database 104, and with other external application information sources 128 such as the World Wide Web, or with external application-specific content such as navigation services, music, video, search services, and the like. Each of the applications 112 may contain their own copy of the ASR client 118, or may share one or more ASR clients 118 using standard software practices on the mobile communications facility 118. Each of the applications 112 may maintain state and present their own interfaces to the user or may share information across applications. Applications may include music or content players, search applications for general, local, on-device, or content search, voice dialing applications, calendar applications, navigation applications, email, SMS, instant messaging or other messaging applications, social networking applications, location-based applications, games, and the like. In embodiments speech recognition models may be conditioned based on usage of the applications. In certain preferred embodiments, a speech recognition model may be selected based on which of the multiple applications running on a mobile device is used in connection with the ASR client 118 for the speech that is captured in a particular instance of use.

Figure 2:
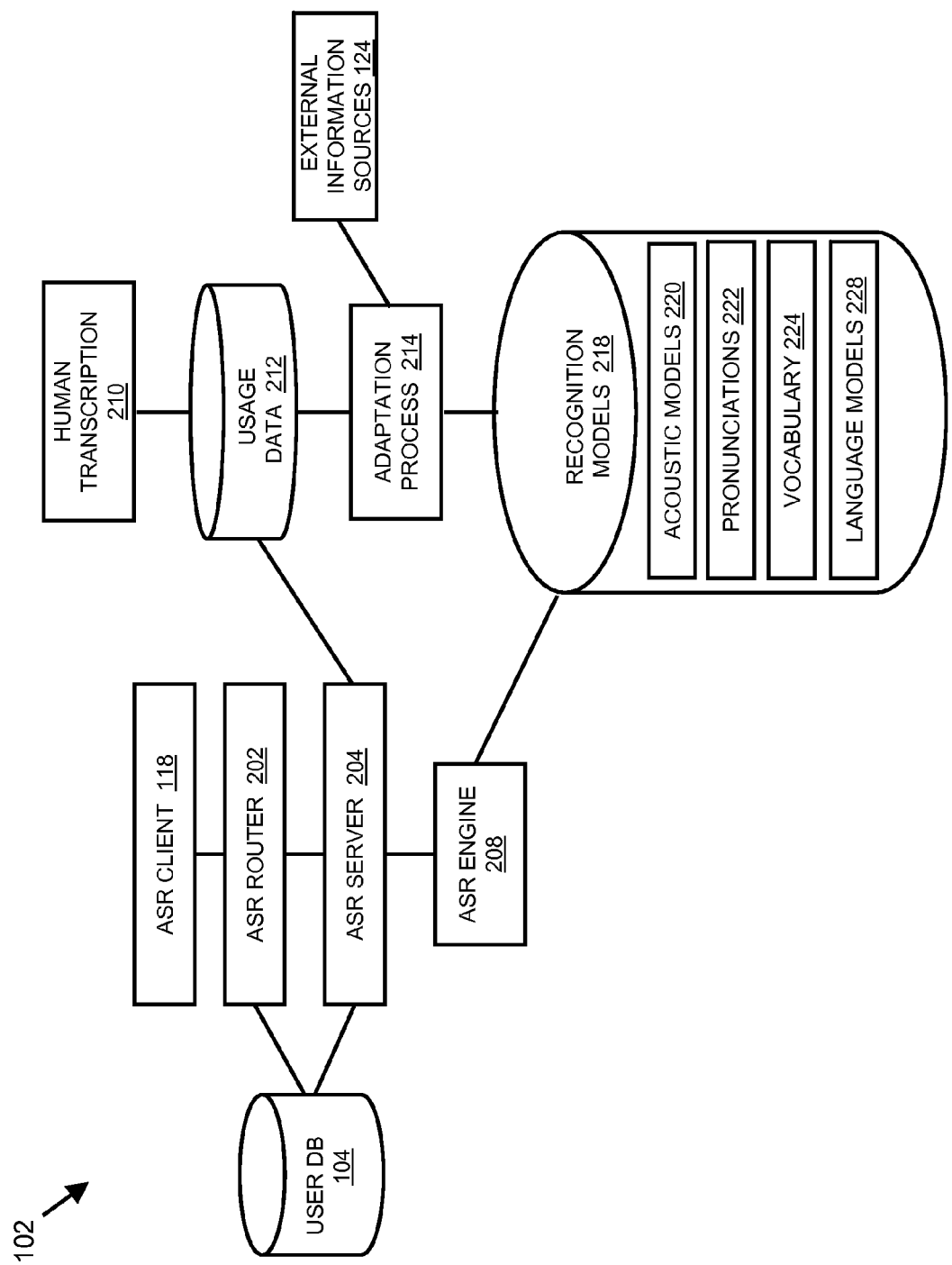
FIG. 2 depicts a block diagram of the automatic speech recognition server infrastructure architecture.

FIG. 2 depicts the architecture for the ASR server infrastructure 102, containing functional blocks for the ASR client 118, ASR router 202, ASR server 204, ASR engine 208, recognition models 218, usage data 212, human transcription 210, adaptation process 214, external information sources 124, and user 130 database 104. In a typical deployment scenario, multiple ASR servers 204 may be connected to an ASR router 202; many ASR clients 118 may be connected to multiple ASR routers 102 and network traffic load balancers may be presented between ASR clients 118 and ASR routers 202. The ASR client 118 may present a graphical user 130 interface to the user 130, and establishes a connection with the ASR router 202. The ASR client 118 may pass information to the ASR router 202, including a unique identifier for the individual phone (client ID) that may be related to a user 130 account created during a subscription process, and the type of phone (phone ID). The ASR client 118 may collect audio from the user 130. Audio may be compressed into a smaller format. Compression may include standard compression scheme used for human-human conversation, or a specific compression scheme optimized for speech recognition. The user 130 may indicate that the user 130 would like to perform recognition. Indication may be made by way of pressing and holding a button for the duration the user 130 is speaking. Indication may be made by way of pressing a button to indicate that speaking will begin, and the ASR client 118 may collect audio until it determines that the user 130 is done speaking, by determining that there has been no speech within some pre-specified time period. In embodiments, voice activity detection may be entirely automated without the need for an initial key press, such as by voice trained command, by voice command specified on the display of the mobile communications facility 120, or the like.

The ASR client 118 may pass audio, or compressed audio, to the ASR router 202. The audio may be sent after all audio is collected or streamed while the audio is still being collected. The audio may include additional information about the state of the ASR client 118 and application 112 in which this client is embedded. This additional information, plus the client ID and phone ID, comprises at least a portion of the client state information. This additional information may include an identifier for the application; an identifier for the particular text field of the application; an identifier for content being viewed in the current application, the URL of the current web page being viewed in a browser for example; or words which are already entered into a current text field. There may be information about what words are before and after the current cursor location, or alternatively, a list of words along with information about the current cursor location. This additional information may also include other information available in the application 112 or mobile communication facility 120 which may be helpful in predicting what users 130 may speak into the application 112 such as the current location of the phone, information about content such as music or videos stored on the phone, history of usage of the application, time of day, and the like.

The ASR client 118 may wait for results to come back from the ASR router 202. Results may be returned as word strings representing the system's hypothesis about the words, which were spoken. The result may include alternate choices of what may have been spoken, such as choices for each word, choices for strings of multiple words, or the like. The ASR client 118 may present words to the user 130, that appear at the current cursor position in the text box, or shown to the user 130 as alternate choices by navigating with the keys on the mobile communications facility 120. The ASR client 118 may allow the user 130 to correct text by using a combination of selecting alternate recognition hypotheses, navigating to words, seeing list of alternatives, navigating to desired choice, selecting desired choice, deleting individual characters, using some delete key on the keypad or touch screen; deleting entire words one at a time; inserting new characters by typing on the keypad; inserting new words by speaking; replacing highlighted words by speaking; or the like. The list of alternatives may be alternate words or strings of word, or may make use of application constraints to provide a list of alternate application-oriented items such as songs, videos, search topics or the like. The ASR client 118 may also give a user 130 a means to indicate that the user 130 would like the application to take some action based on the input text; sending the current state of the input text (accepted text) back to the ASR router 202 when the user 130 selects the application action based on the input text; logging various information about user 130 activity by keeping track of user 130 actions, such as timing and content of keypad or touch screen actions, or corrections, and periodically sending it to the ASR router 202; or the like.

The ASR router 202 may provide a connection between the ASR client 118 and the ASR server 204. The ASR router 202 may wait for connection requests from ASR clients 118. Once a connection request is made, the ASR router 202 may decide which ASR server 204 to use for the session from the ASR client 118. This decision may be based on the current load on each ASR server 204; the best predicted load on each ASR server 204; client state information; information about the state of each ASR server 204, which may include current recognition models 218 loaded on the ASR engine 208 or status of other connections to each ASR server 204; information about the best mapping of client state information to server state information; routing data which comes from the ASR client 118 to the ASR server 204; or the like. The ASR router 202 may also route data, which may come from the ASR server 204, back to the ASR client 118.

The ASR server 204 may wait for connection requests from the ASR router 202. Once a connection request is made, the ASR server 204 may decide which recognition models 218 to use given the client state information coming from the ASR router 202. The ASR server 204 may perform any tasks needed to get the ASR engine 208 ready for recognition requests from the ASR router 202. This may include pre-loading recognition models 218 into memory or doing specific processing needed to get the ASR engine 208 or recognition models 218 ready to perform recognition given the client state information. When a recognition request comes from the ASR router 202, the ASR server 204 may perform recognition on the incoming audio and return the results to the ASR router 202. This may include decompressing the compressed audio information, sending audio to the ASR engine 208, getting results back from the ASR engine 208, optionally applying a process to alter the words based on the text and on the Client State Information (changing "five dollars" to $5 for example), sending resulting recognized text to the ASR router 202, and the like. The process to alter the words based on the text and on the Client State Information may depend on the application 112, for example applying address-specific changes (changing "seventeen dunster street" to "17 dunster st.") in a location-based application 112 such as navigation or local search, applying internet-specific changes (changing "yahoo dot com" to "yahoo.com") in a search application 112, and the like.

The ASR router 202 may be a standard internet protocol or http protocol router, and the decisions about which ASR server to use may be influenced by standard rules for determining best servers based on load balancing rules and on content of headers or other information in the data or metadata passed between the ASR client 118 and ASR server 204.

In the case where the speech recognition facility is built-into a device, each of these components may be simplified or non-existent.

The ASR server 204 may log information to the usage data 212 storage. This logged information may include audio coming from the ASR router 202, client state information, recognized text, accepted text, timing information, user 130 actions, and the like. The ASR server 204 may also include a mechanism to examine the audio data and decide if the current recognition models 218 are not appropriate given the characteristics of the audio data and the client state information. In this case the ASR server 204 may load new or additional recognition models 218, do specific processing needed to get ASR engine 208 or recognition models 218 ready to perform recognition given the client state information and characteristics of the audio data, rerun the recognition based on these new models, send back information to the ASR router 202 based on the acoustic characteristics causing the ASR to send the audio to a different ASR server 204, and the like.

The ASR engine 208 may utilize a set of recognition models 218 to process the input audio stream, where there may be a number of parameters controlling the behavior of the ASR engine 208. These may include parameters controlling internal processing components of the ASR engine 208, parameters controlling the amount of processing that the processing components will use, parameters controlling normalizations of the input audio stream, parameters controlling normalizations of the recognition models 218, and the like. The ASR engine 208 may output words representing a hypothesis of what the user 130 said and additional data representing alternate choices for what the user 130 may have said. This may include alternate choices for the entire section of audio; alternate choices for subsections of this audio, where subsections may be phrases (strings of one or more words) or words; scores related to the likelihood that the choice matches words spoken by the user 130; or the like. Additional information supplied by the ASR engine 208 may relate to the performance of the ASR engine 208. The core speech recognition engine 208 may include automated speech recognition (ASR), and may utilize a plurality of models 218, such as acoustic models 220, pronunciations 222, vocabularies 224, language models 228, and the like, in the analysis and translation of user 130 inputs. Personal language models 228 may be biased for first, last name in an address book, user's 130 location, phone number, past usage data, or the like. As a result of this dynamic development of user 130 speech profiles, the user 130 may be free from constraints on how to speak; there may be no grammatical constraints placed on the mobile user 130, such as having to say something in a fixed domain. The user 130 may be able to say anything into the user's 130 mobile communications facility 120, allowing the user 130 to utilize text messaging, searching, entering an address, or the like, and 'speaking into' the text field, rather than having to type everything.

The recognition models 218 may control the behavior of the ASR engine 208. These models may contain acoustic models 220, which may control how the ASR engine 208 maps the subsections of the audio signal to the likelihood that the audio signal corresponds to each possible sound making up words in the target language. These acoustic models 220 may be statistical models, Hidden Markov models, may be trained on transcribed speech coming from previous use of the system (training data), multiple acoustic models with each trained on portions of the training data, models specific to specific users 130 or groups of users 130, or the like. These acoustic models may also have parameters controlling the detailed behavior of the models. The recognition models 218 may include acoustic mappings, which represent possible acoustic transformation effects, may include multiple acoustic mappings representing different possible acoustic transformations, and these mappings may apply to the feature space of the ASR engine 208. The recognition models 218 may include representations of the pronunciations 222 of words in the target language. These pronunciations 222 may be manually created by humans, derived through a mechanism which converts spelling of words to likely pronunciations, derived based on spoken samples of the word, and may include multiple possible pronunciations for each word in the vocabulary 224, multiple sets of pronunciations for the collection of words in the vocabulary 224, and the like. The recognition models 218 may include language models 228, which represent the likelihood of various word sequences that may be spoken by the user 130. These language models 228 may be statistical language models, n-gram statistical language models, conditional statistical language models which take into account the client state information, may be created by combining the effects of multiple individual language models, and the like. The recognition models 218 may include multiple language models 228 which may be used in a variety of combinations by the ASR engine 208. The multiple language models 228 may include language models 228 meant to represent the likely utterances of a particular user 130 or group of users 130. The language models 228 may be specific to the application 112 or type of application 112.

In embodiments, methods and systems disclosed herein may function independent of the structured grammar required in most conventional speech recognition systems. As used herein, references to "unstructured grammar" and "unstructured language models" should be understood to encompass language models and speech recognition systems that allow speech recognition systems to recognize a wide variety of input from users by avoiding rigid constraints or rules on what words can follow other words. One implementation of an unstructured language model is to use statistical language models, as described throughout this disclosure, which allow a speech recognition system to recognize any possible sequence of a known list of vocabulary items with the ability to assign a probability to any possible word sequence. One implementation of statistical language models is to use n-gram models, which model probabilities of sequences of n words. These n-gram probabilities are estimated based on observations of the word sequences in a set of training or adaptation data. Such a statistical language model typically has estimation strategies for approximating the probabilities of unseen n-gram word sequences, typically based on probabilities of shorter sequences of words (so, a 3-gram model would make use of 2-gram and 1-gram models to estimate probabilities of 3-gram word sequences which were not well represented in the training data). References throughout to unstructured grammars, unstructured language models, and operation independent of a structured grammar or language model encompass all such language models, including such statistical language models.

The multiple language models 228 may include language models 228 designed to model words, phrases, and sentences used by people speaking destinations for a navigation or local search application 112 or the like. These multiple language models 228 may include language models 228 about locations, language models 228 about business names, language models 228 about business categories, language models 228 about points of interest, language models 228 about addresses, and the like. Each of these types of language models 228 may be general models which provide broad coverage for each of the particular type of ways of entering a destination or may be specific models which are meant to model the particular businesses, business categories, points of interest, or addresses which appear only within a particular geographic region.

The multiple language models 228 may include language models 228 designed to model words, phrases, and sentences used by people speaking into messaging applications 112. These language models 228 may include language models 228 specific to addresses, headers, and content fields of a messaging application 112. These multiple language models 228 may be specific to particular types of messages or messaging application 112 types.

The multiple language models 228 may include language models 228 designed to model words, phrases, and sentences used by people speaking search terms for content such as music, videos, games, and the like. These multiple language models 228 may include language models 228 representing artist names, song names, movie titles, TV show, popular artists, and the like. These multiple language models 228 may be specific to various types of content such as music or video category or may cover multiple categories.

The multiple language models 228 may include language models 228 designed to model words, phrases, and sentences used by people speaking general search terms into a search application. The multiple language models 228 may include language models 228 for particular types of search including content search, local search, business search, people search, and the like.

The multiple language models 228 may include language models 228 designed to model words, phrases, and sentences used by people speaking text into a general internet browser. These multiple language models 228 may include language models 228 for particular types of web pages or text entry fields such as search, form filling, dates, times, and the like.

Usage data 212 may be a stored set of usage data 212 from the users 130 of the service that includes stored digitized audio that may be compressed audio; client state information from each audio segment; accepted text from the ASR client 118; logs of user 130 behavior, such as key-presses; and the like. Usage data 212 may also be the result of human transcription 210 of stored audio, such as words that were spoken by user 130, additional information such as noise markers, and information about the speaker such as gender or degree of accent, or the like.

Human transcription 210 may be software and processes for a human to listen to audio stored in usage data 212, and annotate data with words which were spoken, additional information such as noise markers, truncated words, information about the speaker such as gender or degree of accent, or the like. A transcriber may be presented with hypothesized text from the system or presented with accepted text from the system. The human transcription 210 may also include a mechanism to target transcriptions to a particular subset of usage data 212. This mechanism may be based on confidence scores of the hypothesized transcriptions from the ASR server 204.

The adaptation process 214 may adapt recognition models 218 based on usage data 212. Another criterion for adaptation 214 may be to reduce the number of errors that the ASR engine 208 would have made on the usage data 212, such as by rerunning the audio through the ASR engine 208 to see if there is a better match of the recognized words to what the user 130 actually said. The adaptation 214 techniques may attempt to estimate what the user 130 actually said from the annotations of the human transcription 210, from the accepted text, from other information derived from the usage data 212, or the like. The adaptation 214 techniques may also make use of client state information 514 to produce recognition models 218 that are personalized to an individual user 130 or group of users 130. For a given user 130 or group of users 130, these personalized recognition models 218 may be created from usage data 212 for that user 130 or group, as well as data from users 130 outside of the group such as through collaborative-filtering techniques to determine usage patterns from a large group of users 130. The adaptation process 214 may also make use of application information to adapt recognition models 218 for specific domain applications 112 or text fields within domain applications 112. The adaptation process 214 may make use of information in the usage data 212 to adapt multiple language models 228 based on information in the annotations of the human transcription 210, from the accepted text, from other information derived from the usage data 212, or the like. The adaptation process 214 may make use of external information sources 124 to adapt the recognition models 218. These external information sources 124 may contain recordings of speech, may contain information about the pronunciations of words, may contain examples of words that users 130 may speak into particular applications, may contain examples of phrases and sentences which users 130 may speak into particular applications, and may contain structured information about underlying entities or concepts that users 130 may speak about. The external information sources 124 may include databases of location entities including city and state names, geographic area names, zip codes, business names, business categories, points of interest, street names, street number ranges on streets, and other information related to locations and destinations. These databases of location entities may include links between the various entities such as which businesses and streets appear in which geographic locations and the like. The external information 124 may include sources of popular entertainment content such as music, videos, games, and the like. The external information 124 may include information about popular search terms, recent news headlines, or other sources of information which may help predict what users may speak into a particular application 112. The external information sources 124 may be specific to a particular application 112, group of applications 112, user 130, or group of users 130. The external information sources 124 may include pronunciations of words that users may use. The external information 124 may include recordings of people speaking a variety of possible words, phrases, or sentences. The adaptation process 214 may include the ability to convert structured information about underlying entities or concepts into words, phrases, or sentences which users 130 may speak in order to refer to those entities or concepts. The adaptation process 214 may include the ability to adapt each of the multiple language models 228 based on relevant subsets of the external information sources 124 and usage data 212. This adaptation 214 of language models 228 on subsets of external information source 124 and usage data 212 may include adapting geographic location-specific language models 228 based on location entities and usage data 212 from only that geographic location, adapting application-specific language models based on the particular application 112 type, adaptation 124 based on related data or usages, or may include adapting 124 language models 228 specific to particular users 130 or groups of users 130 on usage data 212 from just that user 130 or group of users 130.

The user database 104 may be updated by a web registration 108 process, by new information coming from the ASR router 202, by new information coming from the ASR server 204, by tracking application usage statistics, or the like. Within the user database 104 there may be two separate databases, the ASR database and the user database 104. The ASR database may contain a plurality of tables, such as asr_servers; asr_routers; asr_am (AM, profile name & min server count); asr_monitor (debugging), and the like. The user 130 database 104 may also contain a plurality of tables, such as a clients table including client ID, user 130 ID, primary user 130 ID, phone number, carrier, phone make, phone model, and the like; a users 130 table including user 130 ID, developer permissions, registration time, last activity time, activity count recent AM ID, recent LM ID, session count, last session timestamp, AM ID (default AM for user 130 used from priming), and the like; a user 130 preferences table including user 130 ID, sort, results, radius, saved searches, recent searches, home address, city, state (for geocoding), last address, city, state (for geocoding), recent locations, city to state map (used to automatically disambiguate one-to-many city/state relationship) and the like; user 130 private table including user 130 ID, first and last name, email, password, gender, type of user 130 (e.g. data collection, developer, VIP, etc), age and the like; user 130 parameters table including user 130 ID, recognition server URL, proxy server URL, start page URL, logging server URL, logging level, isLogging, isDeveloper, or the like; clients updates table used to send update notices to clients, including client ID, last known version, available version, minimum available version, time last updated, time last reminded, count since update available, count since last reminded, reminders sent, reminder count threshold, reminder time threshold, update URL, update version, update message, and the like; or other similar tables, such as application usage data 212 not related to ASR.

Figure 2A:
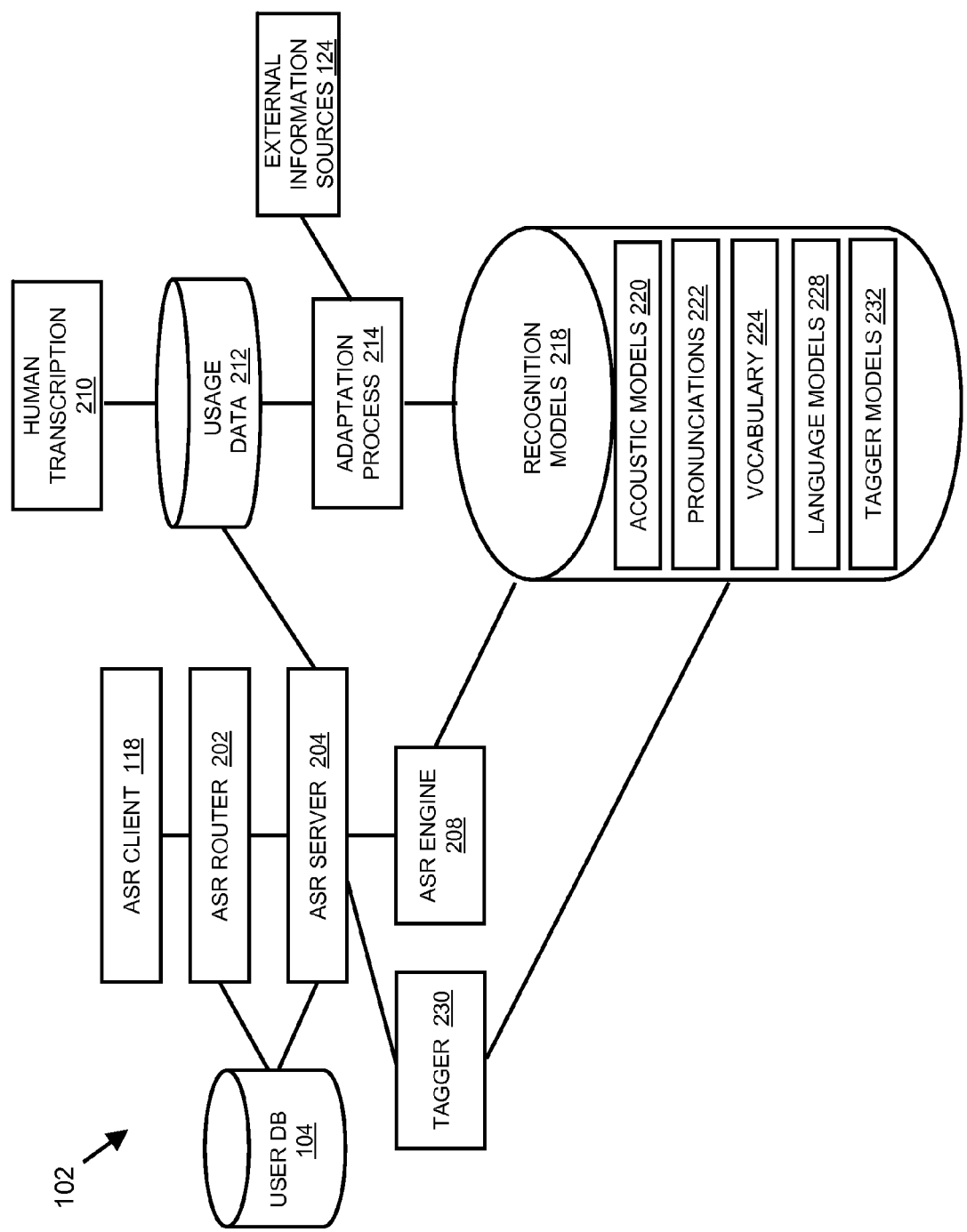
FIG. 2A depicts a block diagram of the automatic speech recognition server infrastructure architecture including a component for tagging words.

FIG. 2A depicts the case where a tagger 230 is used by the ASR server 204 to tag the recognized words according to a set of types of queries, words, or information. For example, in a navigation system 150, the tagging may be used to indicate whether a given utterance by a user is a destination entry or a business search. In addition, the tagging may be used to indicate which words in the utterance are indicative of each of a number of different information types in the utterance such as street number, street name, city name, state name, zip code, and the like. For example in a navigation application, if the user said "navigate to 17 dunster street Cambridge Mass.", the tagging may be [type=navigate] [state=MA] [city=Cambridge] [street=dunster] [street_number=17]. The set of tags and the mapping between word strings and tag sets may depend on the application. The tagger 230 may get words and other information from the ASR server 204, or alternatively directly from the ASR engine 208, and may make use of recognition models 218, including tagger models 232 specifically designed for this task. In one embodiment, the tagger models 232 may include statistical models indicating the likely type and meaning of words (for example "Cambridge" has the highest probability of being a city name, but can also be a street name or part of a business name), may include a set of transition or parse probabilities (for example, street names tend to come before city names in a navigation query), and may include a set of rules and algorithms to determine the best set of tags for a given input. The tagger 230 may produce a single set of tags for a given word string, or may produce multiple possible tags sets for the given word string and provide these to the application. Each of the tag results may include probabilities or other scores indicating the likelihood or certainty of the tagging of the input word string.

Figure 2B:
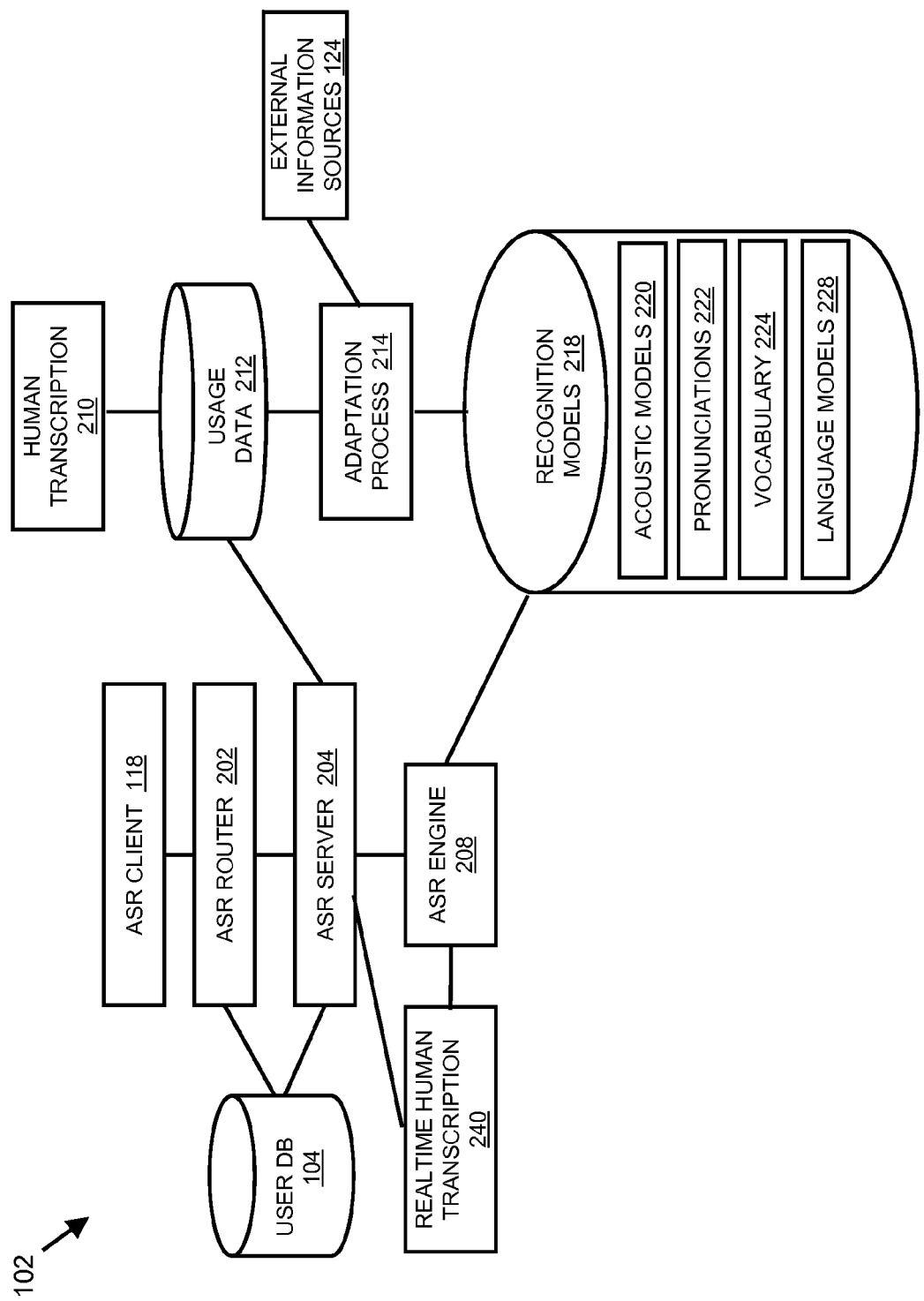
FIG. 2B depicts a block diagram of the automatic speech recognition server infrastructure architecture including a component for real time human transcription.

FIG. 2B depicts the case where real time human transcription 240 is used to augment the ASR engine 208. The real time human transcription 240 may be used to verify or correct the output of the ASR engine before it is transmitted to the ASR client 118. The may be done on all or a subset of the user 130 input. If on a subset, this subset may be based on confidence scores or other measures of certainty from the ASR engine 208 or may be based on tasks where it is already known that the ASR engine 208 may not perform well enough. The output of the real time human transcription 240 may be fed back into the usage data 212. The embodiments of FIGS. 2, 2A and 2B may be combined in various ways so that, for example, real-time human transcription and tagging may interact with the ASR server and other aspects of the ASR server infrastructure.

Figure 3:
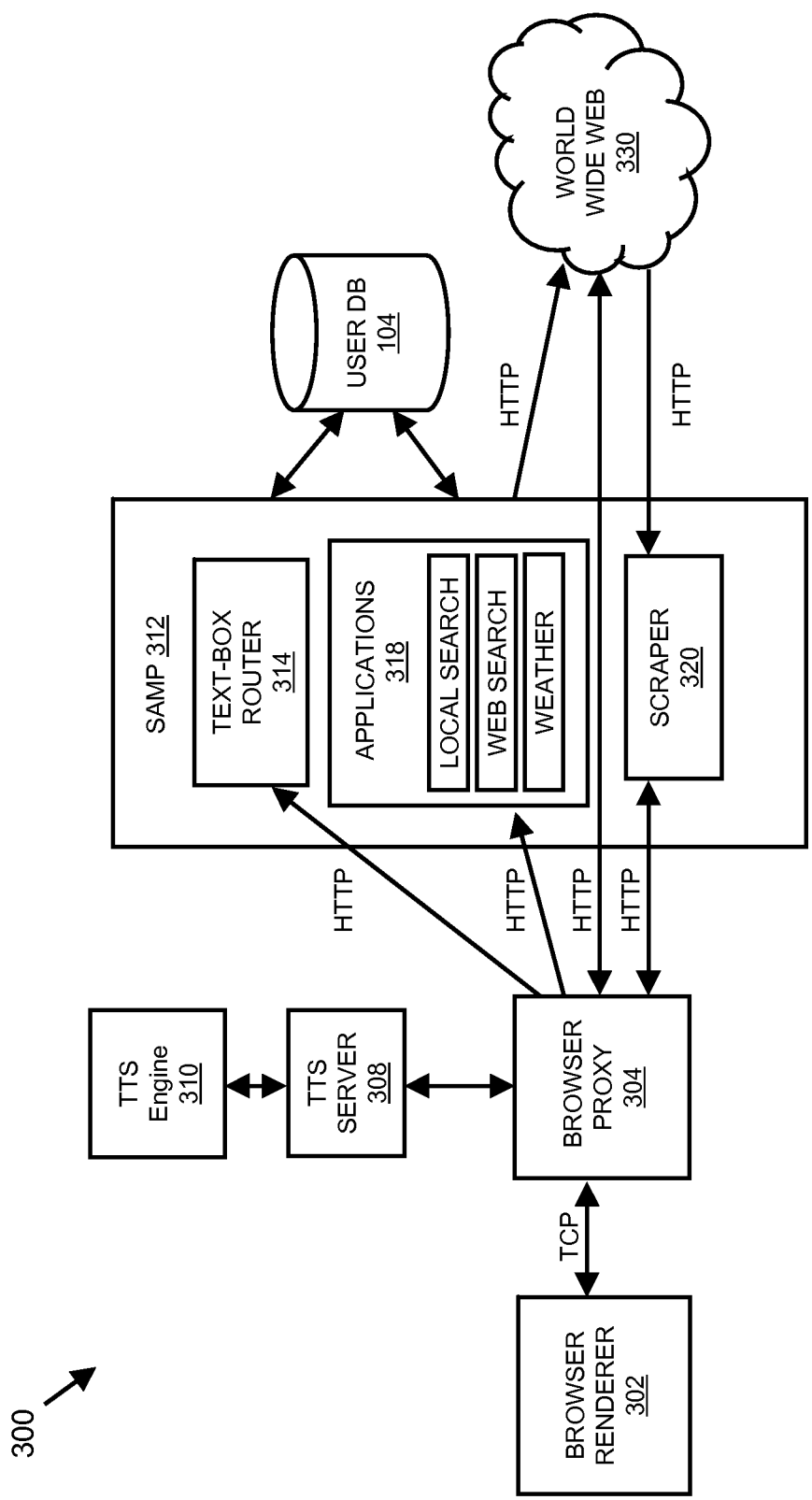
FIG. 3 depicts a block diagram of the application infrastructure architecture.

FIG. 3 depicts an example browser-based application infrastructure architecture 300 including the browser rendering facility 302, the browser proxy 604, text-to-speech (TTS) server 308, TTS engine 310, speech aware mobile portal (SAMP) 312, text-box router 314, domain applications 312, scrapper 320, user 130 database 104, and the World Wide Web 330. The browser rendering facility 302 may be a part of the application code 114 in the user's mobile communication facility 120 and may provide a graphical and speech user interface for the user 130 and display elements on screen-based information coming from browser proxy 304. Elements may include text elements, image elements, link elements, input elements, format elements, and the like. The browser rendering facility 302 may receive input from the user 130 and send it to the browser proxy 304. Inputs may include text in a text-box, clicks on a link, clicks on an input element, or the like. The browser rendering facility 302 also may maintain the stack required for "Back" key presses, pages associated with each tab, and cache recently-viewed pages so that no reads from proxy are required to display recent pages (such as "Back").

The browser proxy 304 may act as an enhanced HTML browser that issues http requests for pages, http requests for links, interprets HTML pages, or the like. The browser proxy 304 may convert user 130 interface elements into a form required for the browser rendering facility 302. The browser proxy 304 may also handle TTS requests from the browser rendering facility 302; such as sending text to the TTS server 308; receiving audio from the TTS server 308 that may be in compressed format; sending audio to the browser rendering facility 302 that may also be in compressed format; and the like.

Other blocks of the browser-based application infrastructure 300 may include a TTS server 308, TTS engine 310, SAMP 312, user 130 database 104 (previously described), the World Wide Web 330, and the like. The TTS server 308 may accept TTS requests, send requests to the TTS engine 310, receive audio from the TTS engine 310, send audio to the browser proxy 304, and the like. The TTS engine 310 may accept TTS requests, generate audio corresponding to words in the text of the request, send audio to the TTS server 308, and the like. The SAMP 312 may handle application requests from the browser proxy 304, behave similar to a web application 330, include a text-box router 314, include domain applications 318, include a scrapper 320, and the like. The text-box router 314 may accept text as input, similar to a search engine's search box, semantically parsing input text using geocoding, key word and phrase detection, pattern matching, and the like. The text-box router 314 may also route parse requests accordingly to appropriate domain applications 318 or the World Wide Web 330. Domain applications 318 may refer to a number of different domain applications 318 that may interact with content on the World Wide Web 330 to provide application-specific functionality to the browser proxy. And finally, the scrapper 320 may act as a generic interface to obtain information from the World Wide Web 330 (e.g., web services, SOAP, RSS, HTML, scrapping, and the like) and formatting it for the small mobile screen.

Figure 4:
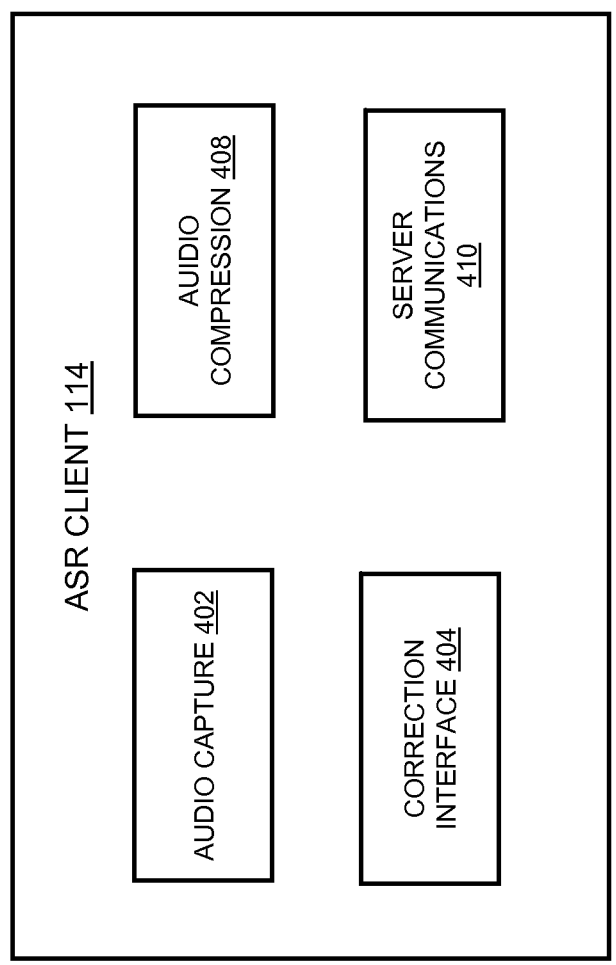
FIG. 4 depicts some of the components of the ASR Client.

FIG. 4 depicts some of the components of the ASR Client 118. The ASR client 118 may include an audio capture 402 component which may wait for signals to begin and end recording, interacts with the built-in audio functionality on the mobile communication facility 120, interact with the audio compression 408 component to compress the audio signal into a smaller format, and the like. The audio capture 402 component may establish a data connection over the data network using the server communications component 410 to the ASR server infrastructure 102 using a protocol such as TCP or HTTP. The server communications 410 component may then wait for responses from the ASR server infrastructure 102 indicated words which the user may have spoken. The correction interface 404 may display words, phrases, sentences, or the like, to the user, 130 indicating what the user 130 may have spoken and may allow the user 130 to correct or change the words using a combination of selecting alternate recognition hypotheses, navigating to words, seeing list of alternatives, navigating to desired choice, selecting desired choice; deleting individual characters, using some delete key on the keypad or touch screen; deleting entire words one at a time; inserting new characters by typing on the keypad; inserting new words by speaking; replacing highlighted words by speaking; or the like. Audio compression 408 may compress the audio into a smaller format using audio compression technology built into the mobile communication facility 120, or by using its own algorithms for audio compression. These audio compression 408 algorithms may compress the audio into a format which can be turned back into a speech waveform, or may compress the audio into a format which can be provided to the ASR engine 208 directly or uncompressed into a format which may be provided to the ASR engine 208. Server communications 410 may use existing data communication functionality built into the mobile communication facility 120 and may use existing protocols such as TCP, HTTP, and the like.

Figure 5A:
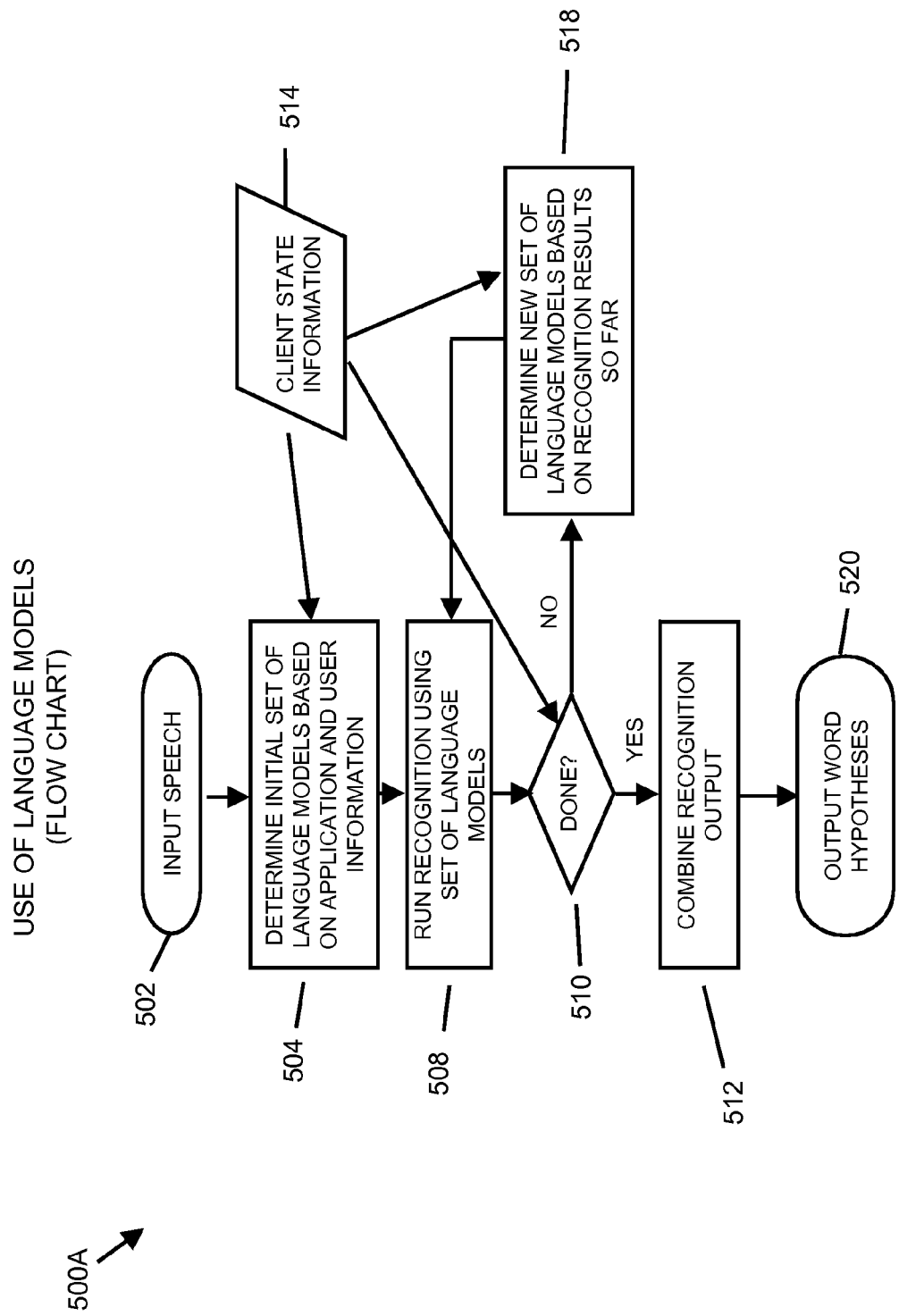
FIG. 5A depicts the process by which multiple language models may be used by the ASR engine.

FIG. 5A depicts the process 500A by which multiple language models may be used by the ASR engine. For the recognition of a given utterance, a first process 504 may decide on an initial set of language models 228 for the recognition. This decision may be made based on the set of information in the client state information 514, including application ID, user ID, text field ID, current state of application 112, or information such as the current location of the mobile communication facility 120. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 514, the words in the current set of recognition hypotheses, confidence scores from the most recent recognition pass, and the like. If needed, a new set of language models 228 may be determined 518 based on the client state information 514 and the contents of the most recent recognition hypotheses and another pass of recognition 508 made by the ASR engine 208. Once complete, the recognition results may be combined to form a single set of words and alternates to pass back to the ASR client 118.

Figure 5B:
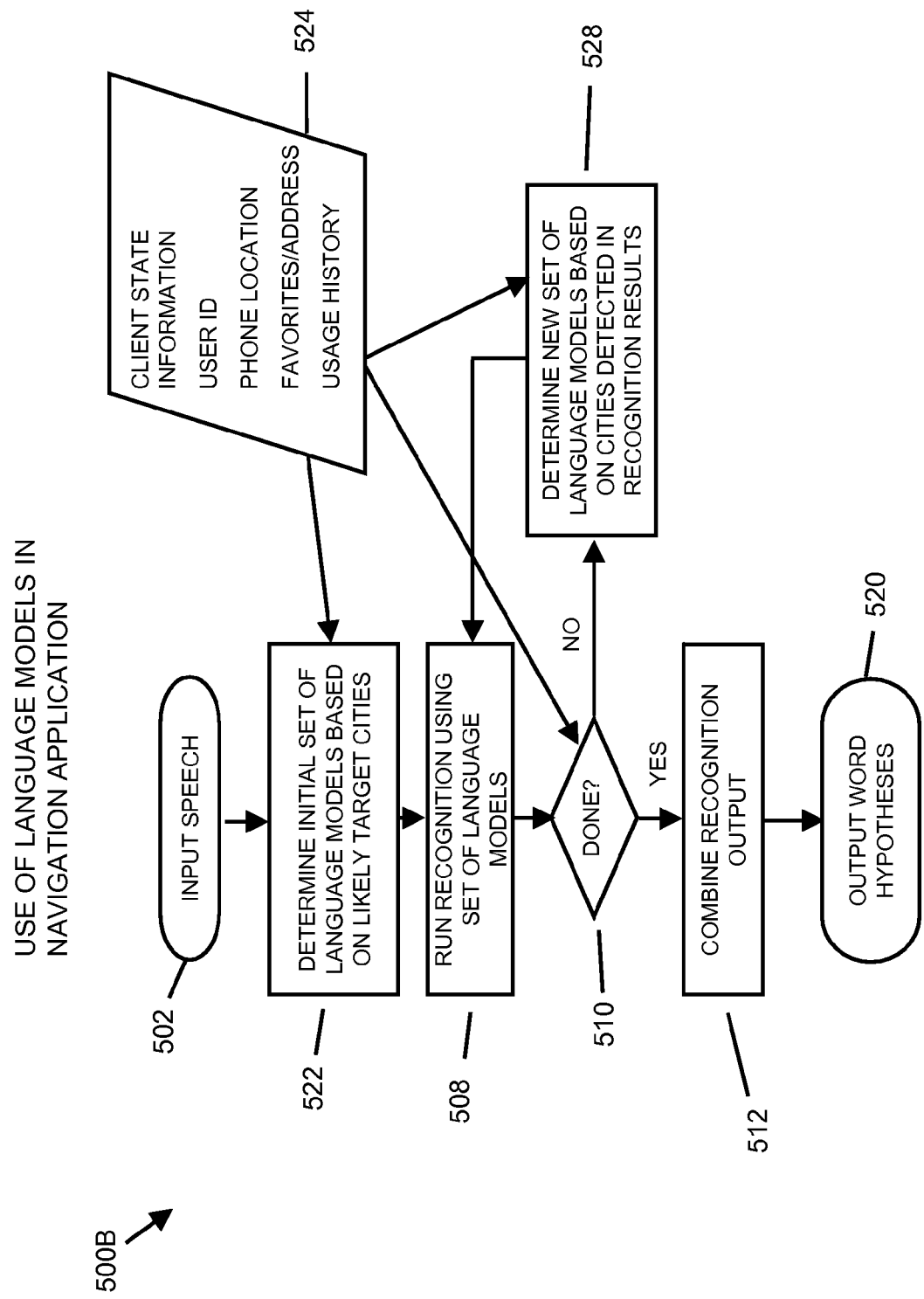
FIG. 5B depicts the process by which multiple language models may be used by the ASR engine for a navigation application embodiment.

FIG. 5B depicts the process 500B by which multiple language models 228 may be used by the ASR engine 208 for an application 112 that allows speech input 502 about locations, such as a navigation, local search, or directory assistance application 112. For the recognition of a given utterance, a first process 522 may decide on an initial set of language models 228 for the recognition. This decision may be made based on the set of information in the client state information 524, including application ID, user ID, text field ID, current state of application 112, or information such as the current location of the mobile communication facility 120. This client state information may also include favorites or an address book from the user 130 and may also include usage history for the application 112. The decision about the initial set of language models 228 may be based on likely target cities for the query 522. The initial set of language models 228 may include general language models 228 about business names, business categories, city and state names, points of interest, street addresses, and other location entities or combinations of these types of location entities. The initial set of language models 228 may also include models 228 for each of the types of location entities specific to one or more geographic regions, where the geographic regions may be based on the phone's current geographic location, usage history for the particular user 130, or other information in the navigation application 112 which may be useful in predicting the likely geographic area the user 130 may want to enter into the application 112. The initial set of language models 228 may also include language models 228 specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 524, the words in the current set of recognition hypotheses, confidence scores from the most recent recognition pass, and the like. This decision may include determining the likely geographic area of the utterance and comparing that to the assumed geographic area or set of areas in the initial language models 228. This determining the likely geographic area of the utterance may include looking for words in the hypothesis or set of hypotheses, which may correspond to a geographic region. These words may include names for cities, states, areas and the like or may include a string of words corresponding to a spoken zip code. If needed, a new set of language models 228 may be determined 528 based on the client state information 524 and the contents of the most recent recognition hypotheses and another pass of recognition 508 made by the ASR engine 208. This new set of language models 228 may include language models 228 specific to a geographic region determined from a hypothesis or set of hypotheses from the previous recognition pass Once complete, the recognition results may be combined 512 to form a single set of words and alternates to pass back 520 to the ASR client 118.

Figure 5C:
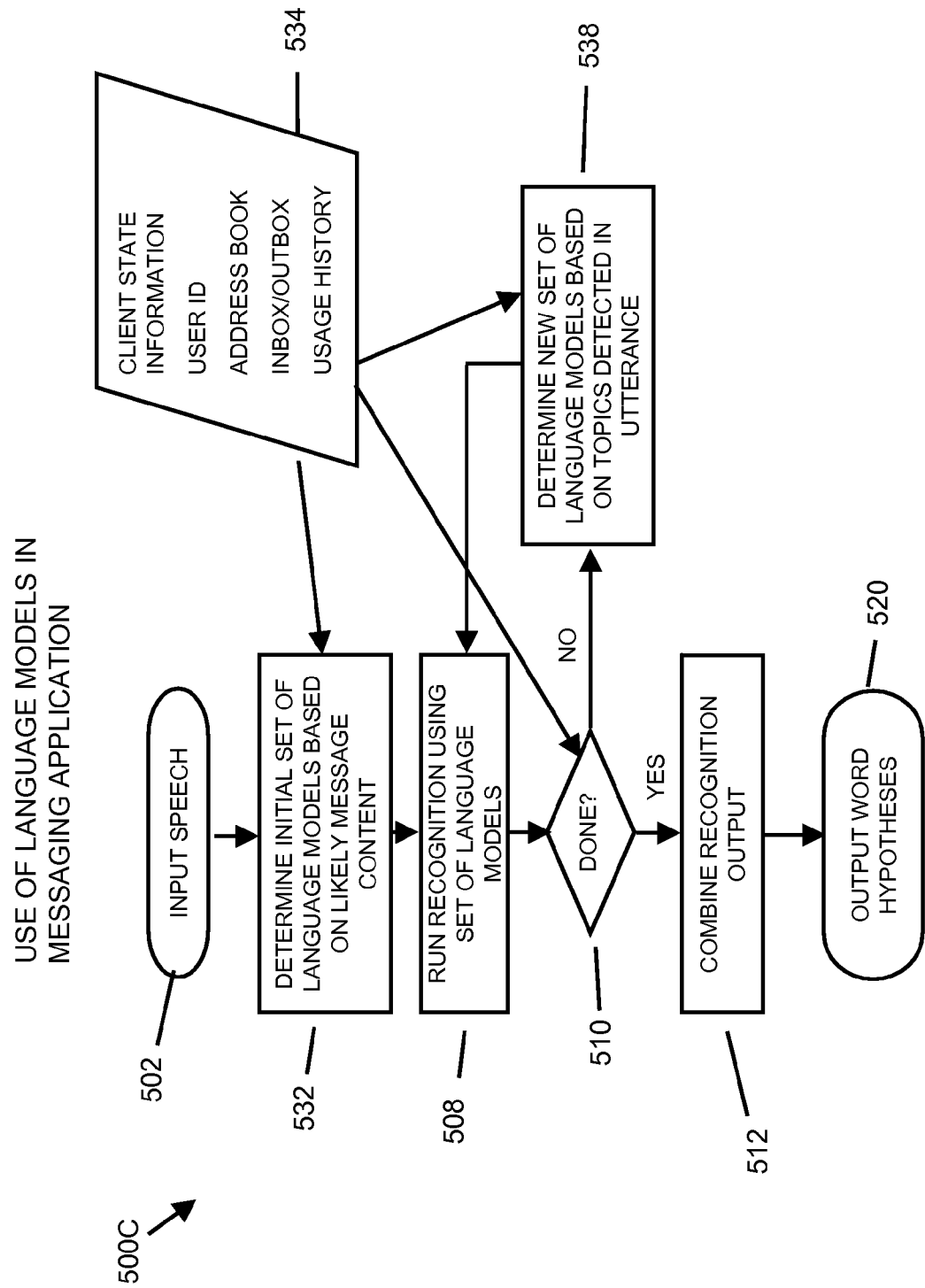
FIG. 5C depicts the process by which multiple language models may be used by the ASR engine for a messaging application embodiment.

FIG. 5C depicts the process 500C by which multiple language models 228 may be used by the ASR engine 208 for a messaging application 112 such as SMS, email, instant messaging, and the like, for speech input 502. For the recognition of a given utterance, a first process 532 may decide on an initial set of language models 228 for the recognition. This decision may be made based on the set of information in the client state information 534, including application ID, user ID, text field ID, or current state of application 112. This client state information may include an address book or contact list for the user, contents of the user's messaging inbox and outbox, current state of any text entered so far, and may also include usage history for the application 112. The decision about the initial set of language models 228 may be based on the user 130, the application 112, the type of message, and the like. The initial set of language models 228 may include general language models 228 for messaging applications 112, language models 228 for contact lists and the like. The initial set of language models 228 may also include language models 228 that are specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 534, the words in the current set of recognition hypotheses, confidence scores from the most recent recognition pass, and the like. This decision may include determining the type of message entered and comparing that to the assumed type of message or types of messages in the initial language models 228. If needed, a new set of language models 228 may be determined 538 based on the client state information 534 and the contents of the most recent recognition hypotheses and another pass of recognition 508 made by the ASR engine 208. This new set of language models 228 may include language models specific to the type of messages determined from a hypothesis or set of hypotheses from the previous recognition pass Once complete, the recognition results may be combined 512 to form a single set of words and alternates to pass back 520 to the ASR client 118.

FIG. 5D depicts the process 500D by which multiple language models 228 may be used by the ASR engine 208 for a content search application 112 such as music download, music player, video download, video player, game search and download, and the like, for speech input 502. For the recognition of a given utterance, a first process 542 may decide on an initial set of language models 228 for the recognition. This decision may be made based on the set of information in the client state information 544, including application ID, user ID, text field ID, or current state of application 112. This client state information may include information about the user's content and play lists, either on the client itself or stored in some network-based storage, and may also include usage history for the application 112. The decision about the initial set of language models 228 may be based on the user 130, the application 112, the type of content, and the like. The initial set of language models 228 may include general language models 228 for search, language models 228 for artists, composers, or performers, language models 228 for specific content such as song and album names, movie and TV show names, and the like. The initial set of language models 228 may also include language models 228 specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 544, the words in the current set of recognition hypotheses, confidence scores from the most recent recognition pass, and the like. This decision may include determining the type of content search and comparing that to the assumed type of content search in the initial language models 228. If needed, a new set of language models 228 may be determined 548 based on the client state information 544 and the contents of the most recent recognition hypotheses and another pass of recognition 508 made by the ASR engine 208. This new set of language models 228 may include language models 228 specific to the type of content search determined from a hypothesis or set of hypotheses from the previous recognition pass Once complete, the recognition results may be combined 512 to form a single set of words and alternates to pass back 520 to the ASR client 118.

Figure 5E:
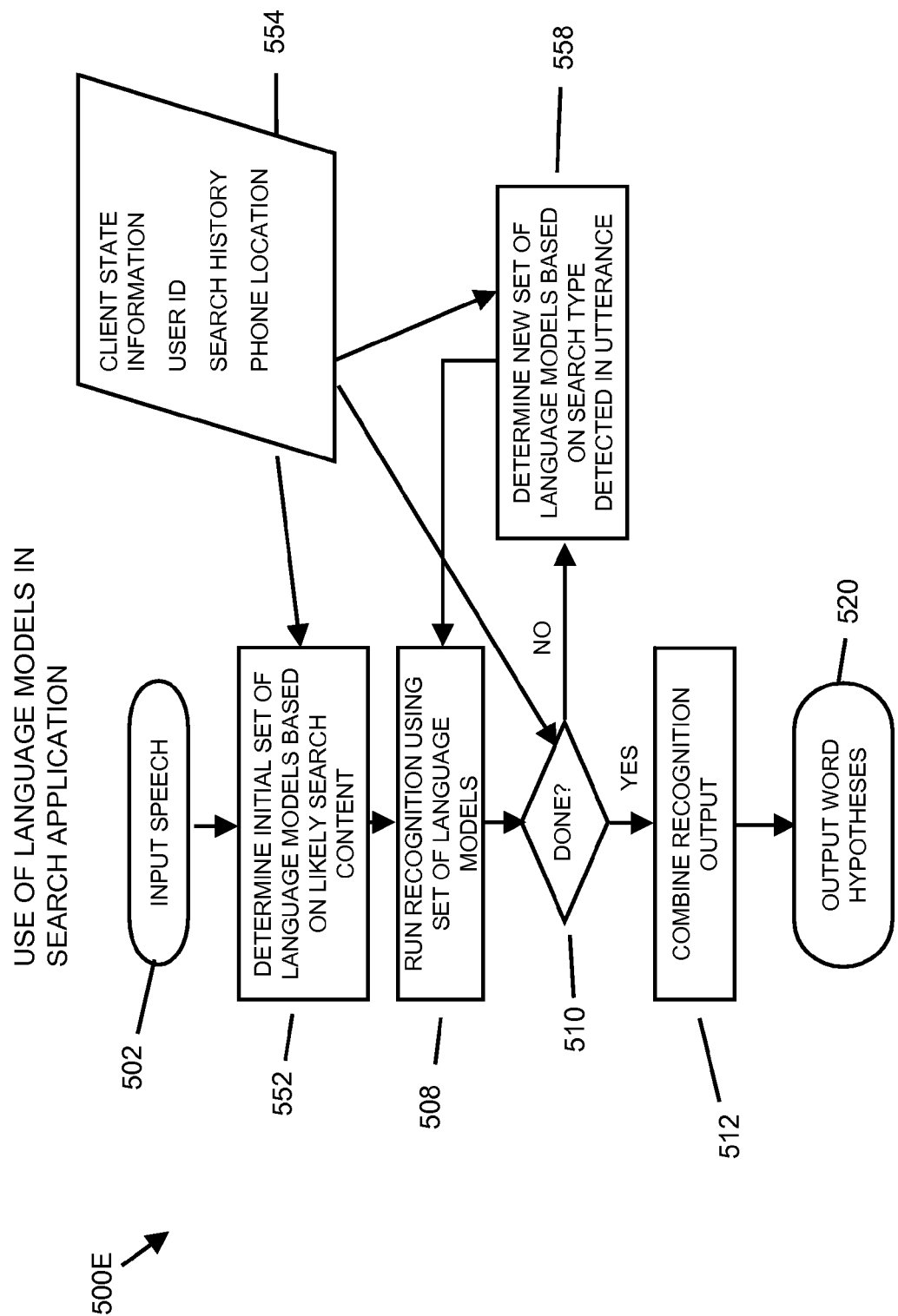
FIG. 5E depicts the process by which multiple language models may be used by the ASR engine for a search application embodiment.

FIG. 5E depicts the process 500E by which multiple language models 228 may be used by the ASR engine 208 for a search application 112 such as general web search, local search, business search, and the like, for speech input 502. For the recognition of a given utterance, a first process 552 may decide on an initial set of language models 228 for the recognition. This decision may be made based on the set of information in the client state information 554, including application ID, user ID, text field ID, or current state of application 112. This client state information may include information about the phone's location, and may also include usage history for the application 112. The decision about the initial set of language models 228 may be based on the user 130, the application 112, the type of search, and the like. The initial set of language models 228 may include general language models 228 for search, language models 228 for different types of search such as local search, business search, people search, and the like. The initial set of language models 228 may also include language models 228 specific to the user or group to which the user belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 554, the words in the current set of recognition hypotheses, confidence scores from the most recent recognition pass, and the like. This decision may include determining the type of search and comparing that to the assumed type of search in the initial language models. If needed, a new set of language models 228 may be determined 558 based on the client state information 554 and the contents of the most recent recognition hypotheses and another pass of recognition 508 made by the ASR engine 208. This new set of language models 228 may include language models 228 specific to the type of search determined from a hypothesis or set of hypotheses from the previous recognition pass. Once complete, the recognition results may be combined 512 to form a single set of words and alternates to pass back 520 to the ASR client 118.

FIG. 5F depicts the process 500F by which multiple language models 228 may be used by the ASR engine 208 for a general browser as a mobile-specific browser or general internet browser for speech input 502. For the recognition of a given utterance, a first process 562 may decide on an initial set of language models 228 for the recognition. This decision may be made based on the set of information in the client state information 564, including application ID, user ID, text field ID, or current state of application 112. This client state information may include information about the phone's location, the current web page, the current text field within the web page, and may also include usage history for the application 112. The decision about the initial set of language models 228 may be based on the user 130, the application 112, the type web page, type of text field, and the like. The initial set of language models 228 may include general language models 228 for search, language models 228 for date and time entry, language models 228 for digit string entry, and the like. The initial set of language models 228 may also include language models 228 specific to the user 130 or group to which the user 130 belongs. The ASR engine 208 may then run 508 using this initial set of language models 228 and a set of recognition hypotheses created based on this set of language models 228. There may then be a decision process 510 to decide if additional recognition passes 508 are needed with additional language models 228. This decision 510 may be based on the client state information 564, the words in the current set of recognition hypotheses, confidence scores from the most recent recognition pass, and the like. This decision may include determining the type of entry and comparing that to the assumed type of entry in the initial language models 228. If needed, a new set of language models 228 may be determined 568 based on the client state information 564 and the contents of the most recent recognition hypotheses and another pass of recognition 508 made by the ASR engine 208. This new set of language models 228 may include language models 228 specific to the type of entry determined from a hypothesis or set of hypotheses from the previous recognition pass Once complete, the recognition results may be combined 512 to form a single set of words and alternates to pass back 520 to the ASR client 118.

The process to combine recognition output may make use of multiple recognition hypotheses from multiple recognition passes. These multiple hypotheses may be represented as multiple complete sentences or phrases, or may be represented as a directed graph allowing multiple choices for each word. The recognition hypotheses may include scores representing likelihood or confidence of words, phrases, or sentences. The recognition hypotheses may also include timing information about when words and phrases start and stop. The process to combine recognition output may choose entire sentences or phrases from the sets of hypotheses or may construct new sentences or phrases by combining words or fragments of sentences or phrases from multiple hypotheses. The choice of output may depend on the likelihood or confidence scores and may take into account the time boundaries of the words and phrases.

Figure 6:
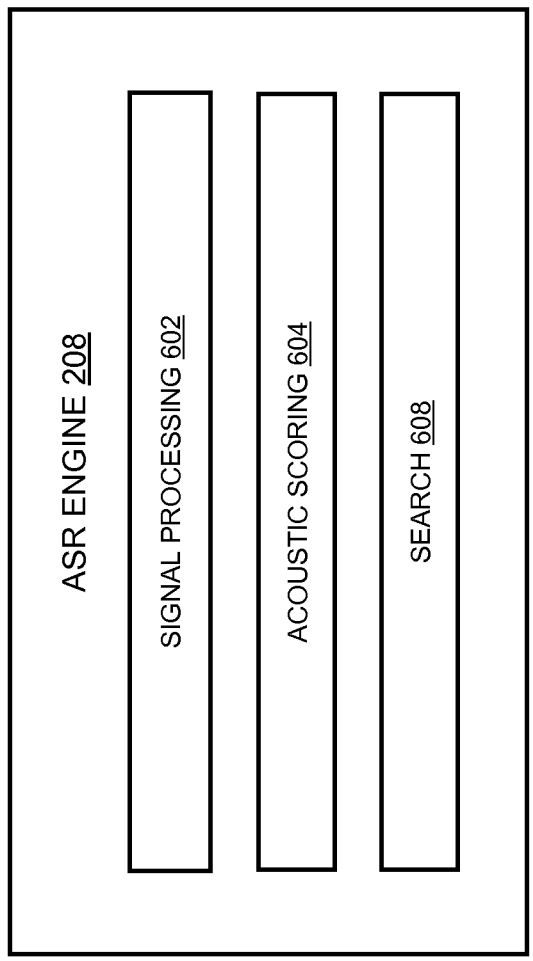
FIG. 6 depicts the components of the ASR engine.

FIG. 6 shows the components of the ASR engine 208. The components may include signal processing 602 which may process the input speech either as a speech waveform or as parameters from a speech compression algorithm and create representations which may be used by subsequent processing in the ASR engine 208. Acoustic scoring 604 may use acoustic models 220 to determine scores for a variety of speech sounds for portions of the speech input. The acoustic models 220 may be statistical models and the scores may be probabilities. The search 608 component may make use of the score of speech sounds from the acoustic scoring 602 and using pronunciations 222, vocabulary 224, and language models 228, find the highest scoring words, phrases, or sentences and may also produce alternate choices of words, phrases, or sentences.

Figure 7:
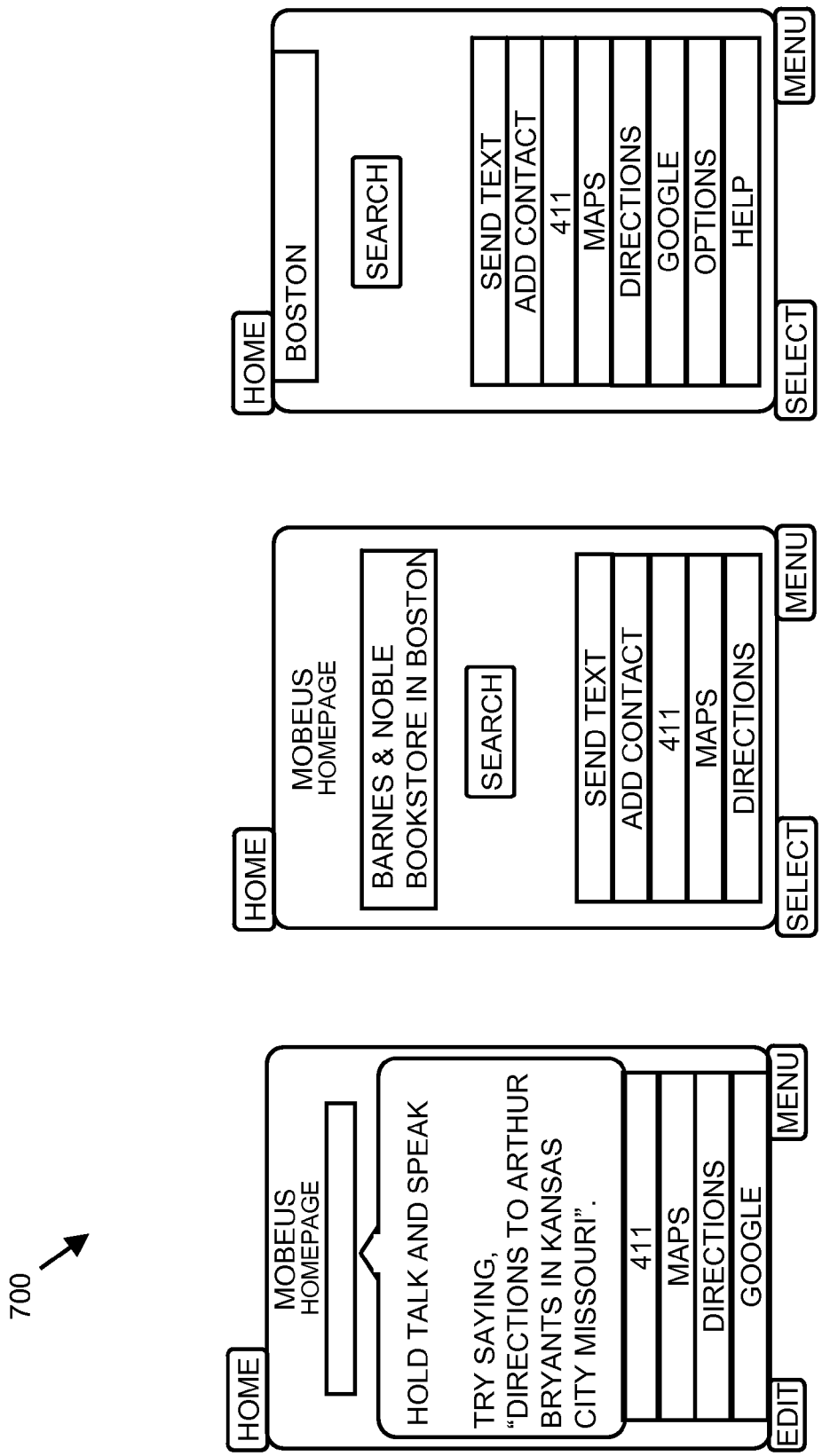
FIG. 7 depicts the layout and initial screen for the user interface.

FIG. 7 shows an example of how the user 130 interface layout and initial screen 700 may look on a user's 130 mobile communications facility 120. The layout, from top to bottom, may include a plurality of components, such as a row of navigable tabs, the current page, soft-key labels at the bottom that can be accessed by pressing the left or right soft-keys on the phone, a scroll-bar on the right that shows vertical positioning of the screen on the current page, and the like. The initial screen may contain a text-box with a "Search" button, choices of which domain applications 318 to launch, a pop-up hint for first-time users 130, and the like. The text box may be a shortcut that users 130 can enter into, or speak into, to jump to a domain application 318, such as "Restaurants in Cambridge" or "Send a text message to Joe". When the user 130 selects the "Search" button, the text content is sent. Application choices may send the user 130 to the appropriate application when selected. The popup hint 1) tells the user 130 to hold the green TALK button to speak, and 2) gives the user 130 a suggestion of what to say to try the system out. Both types of hints may go away after several uses.

Figure 7A:
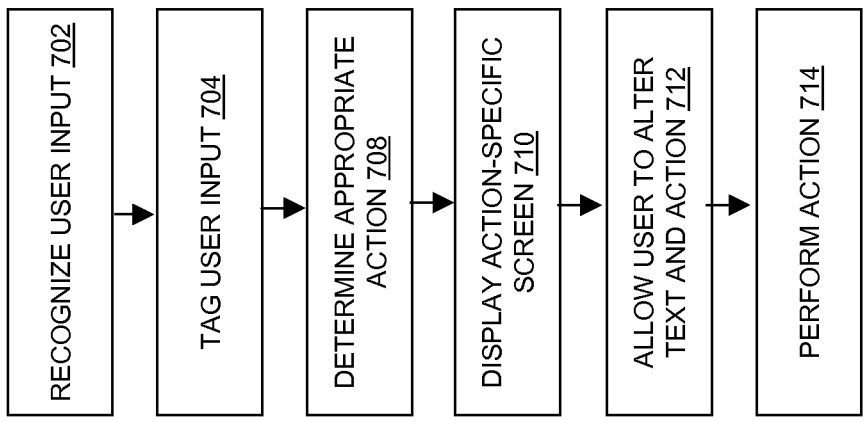
FIG. 7A depicts the flow chart for determining application level actions.

FIG. 7A depicts using the speech recognition results to provide top-level control or basic functions of a mobile communication device, music device, navigation device, and the like. In this case, the outputs from the speech recognition facility may be used to determine and perform an appropriate action of the phone. The process depicted in FIG. 7A may start at step 702 to recognize user input, resulting in the words, numbers, text, phrases, commands, and the like that the user spoke. Optionally at a step 704 user input may be tagged with tags which help determine appropriate actions. The tags may include information about the input, such as that the input was a messaging input, an input indicating the user would like to place a call, an input for a search engine, and the like. The next step 708 is to determine an appropriate action, such as by using a combination of words and tags. The system may then optionally display an action-specific screen at a step 710, which may allow a user to alter text and actions at a step 712. Finally, the system performs the selected action at a step 714. The actions may include things such as: placing a phone call, answering a phone call, entering text, sending a text message, sending an email message, starting an application 112 resident on the mobile communication facility 120, providing an input to an application resident on the mobile communication facility 120, changing an option on the mobile communication facility 120, setting an option on the mobile communication facility 120, adjusting a setting on the mobile communication facility 120, interacting with content on the mobile communication facility 120, and searching for content on the mobile communication facility 120. The perform action step 714 may involve performing the action directly using built-in functionality on the mobile communications facility 120 or may involve starting an application 112 resident on the mobile communication facility 120 and having the application 112 perform the desired action for the user. This may involve passing information to the application 112 which will allow the application 112 to perform the action such as words spoken by the user 130 or tagged results indicating aspects of action to be performed. This top level phone control is used to provide the user 130 with an overall interface to a variety of functionality on the mobile communication facility 120. For example, this functionality may be attached to a particular button on the mobile communication facility 120. The user 130 may press this button and say something like "call Joe Cerra" which would be tagged as [type=call] [name=Joe Cerra], which would map to action DIAL, invoking a dialing-specific GUI screen, allowing the user to correct the action or name, or to place the call. Other examples may include the case where the user can say something like "navigate to 17 dunster street Cambridge Mass.", which would be tagged as [type=navigate] [state=MA] [city=Cambridge] [street=dunster] [street_number=17], which would be mapped to action NAVIGATE, invoking a navigation-specific GUI screen allowing the user to correct the action or any of the tags, and then invoking a build-in navigation system on the mobile communications facility 120. The application which gets invoked by the top-level phone control may also allow speech entry into one or more text boxes within the application. So, once the user 130 speaks into the top level phone control and an application is invoked, the application may allow further speech input by including the ASR client 118 in the application. This ASR client 118 may get detailed results from the top level phone control such that the GUI of the application may allow the user 130 to correct the resulting words from the speech recognition system including seeing alternate results for word choices.

Figure 7B:
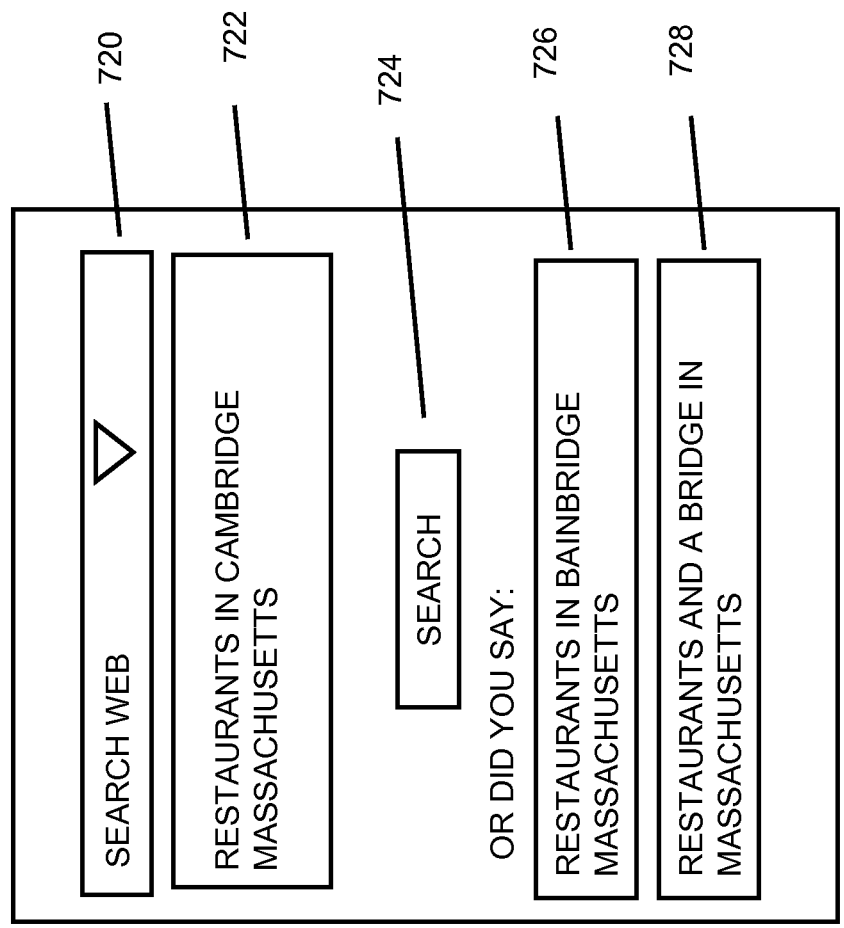
FIG. 7B depicts a searching landing page.

FIG. 7B shows as an example, a search-specific GUI screen that may result if the user says something like "restaurants in Cambridge Mass.". The determined action 720 is shown in a box which allows the user to click on the down arrow or other icon to see other action choices (if the user wants to send email about "restaurants in Cambridge Mass." for example). There is also a text box 722 which shows the words recognized by the system. This text box 722 may allow the user to alter the text by speaking, or by using the keypad, or by selecting among alternate choices from the speech recognizer. The search button 724 allows the user to carry out the search based on a portion of the text in the text box 722. Boxes 726 and 728 show alternate choices from the speech recognizer. The user may click on one of these items to facilitate carrying out the search based on a portion of the text in one of these boxes. Selecting box 726 or 728 may cause the text in the selected box to be exchanged with the text in text box 722.

Figure 7C:
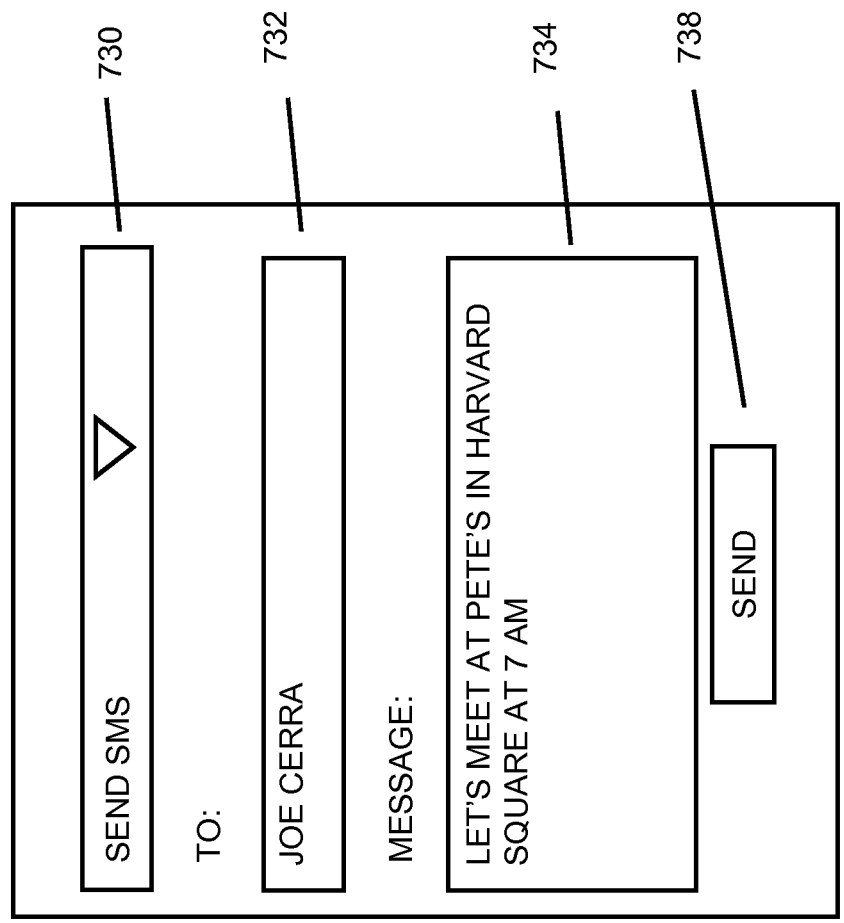
FIG. 7C depicts a SMS text landing page

FIG. 7C shows an embodiment of an SMS-specific GUI screen that may result if the user says something like "send SMS to joe cerra let's meet at pete's in harvard square at 7 am". The determined action 730 is shown in a box which allows the user to click on the down arrow or other icon to see other action choices. There is also a text box 732 which shows the words recognized as the "to" field. This text box 732 may allow the user to alter the text by speaking, or by using the keypad, or by selecting among alternate choices from the speech recognizer. Message text box 734 shows the words recognized as the message component of the input. This text box 734 may allow the user to alter the text by speaking, or by using the keypad, or by selecting among alternate choices from the speech recognizer. The send button 738 allows the user to send the text message based on the contents of the "to" field and the message component.

This top-level control may also be applied to other types of devices such as music players, navigation systems, or other special or general-purpose devices. In this case, the top-level control allows users to invoke functionality or applications across the device using speech input.

This top-level control may make use of adaptation to improve the speech recognition results. This adaptation may make use of history of usage by the particular user to improve the performance of the recognition models. The adaptation of the recognition models may include adapting acoustic models, adapting pronunciations, adapting vocabularies, and adapting language models. The adaptation may also make use of history of usage across many users. The adaptation may make use of any correction or changes made by the user. The adaptation may also make use of human transcriptions created after the usage of the system.

This top level control may make use of adaptation to improve the performance of the word and phrase-level tagging. This adaptation may make use of history of usage by the particular user to improve the performance of the models used by the tagging. The adaptation may also make use of history of usage by other users to improve the performance of the models used by the tagging. The adaptation may make use of change or corrections made by the user. The adaptation may also make use of human transcription of appropriate tags created after the usage of the system, This top level control may make use of adaptation to improve the performance selection of the action. This adaptation may make use of history of usage by the particular user to improve the performance of the models and rules used by this action selection. The adaptation may also make use of history of usage by other users to improve the performance of the models and rules used by the action selection. The adaptation may make use of change or corrections made by the user. The adaptation may also make use of human transcription of appropriate actions after the usage of the system. It should be understood that these and other forms of adaptation may be used in the various embodiments disclosed throughout this disclosure where the potential for adaptation is noted.

Figure 8:
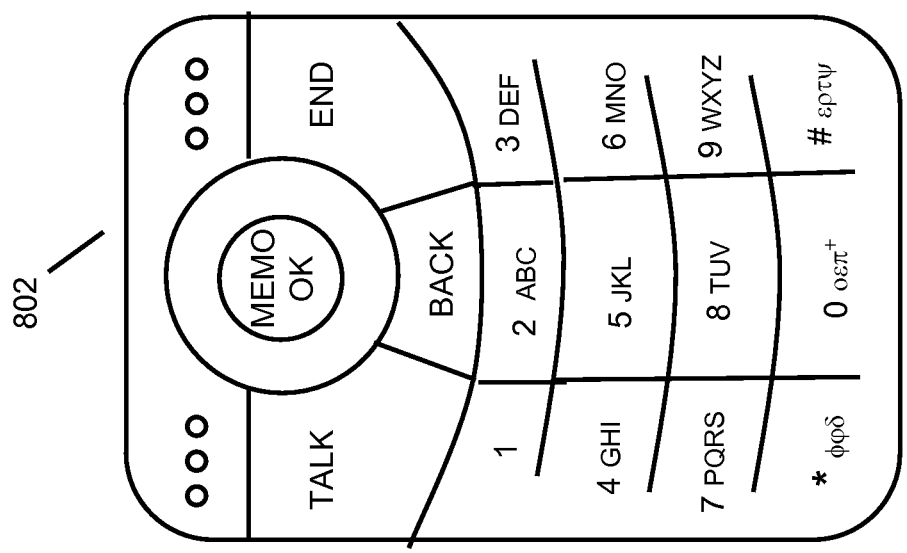
FIG. 8 depicts a keypad layout for the user interface.

Although there are mobile phones with full alphanumeric keyboards, most mass-market devices are restricted to the standard telephone keypad 802, such as shown in FIG. 8. Command keys may include a "TALK", or green-labeled button, which may be used to make a regular voice-based phone call; an "END" button which is used to terminate a voice-based call or end an application and go back to the phone's main screen; a five-way control navigation pad that users may employ to move up, down, left, and right, or select by pressing on the center button (labeled "MENU/OK" in FIG. 8); two soft-key buttons that may be used to select the labels at the bottom of the screen; a back button which is used to go back to the previous screen in any application; a delete button used to delete entered text that on some phones, such as the one pictured in FIG. 8, the delete and back buttons are collapsed into one; and the like.

Figure 9:
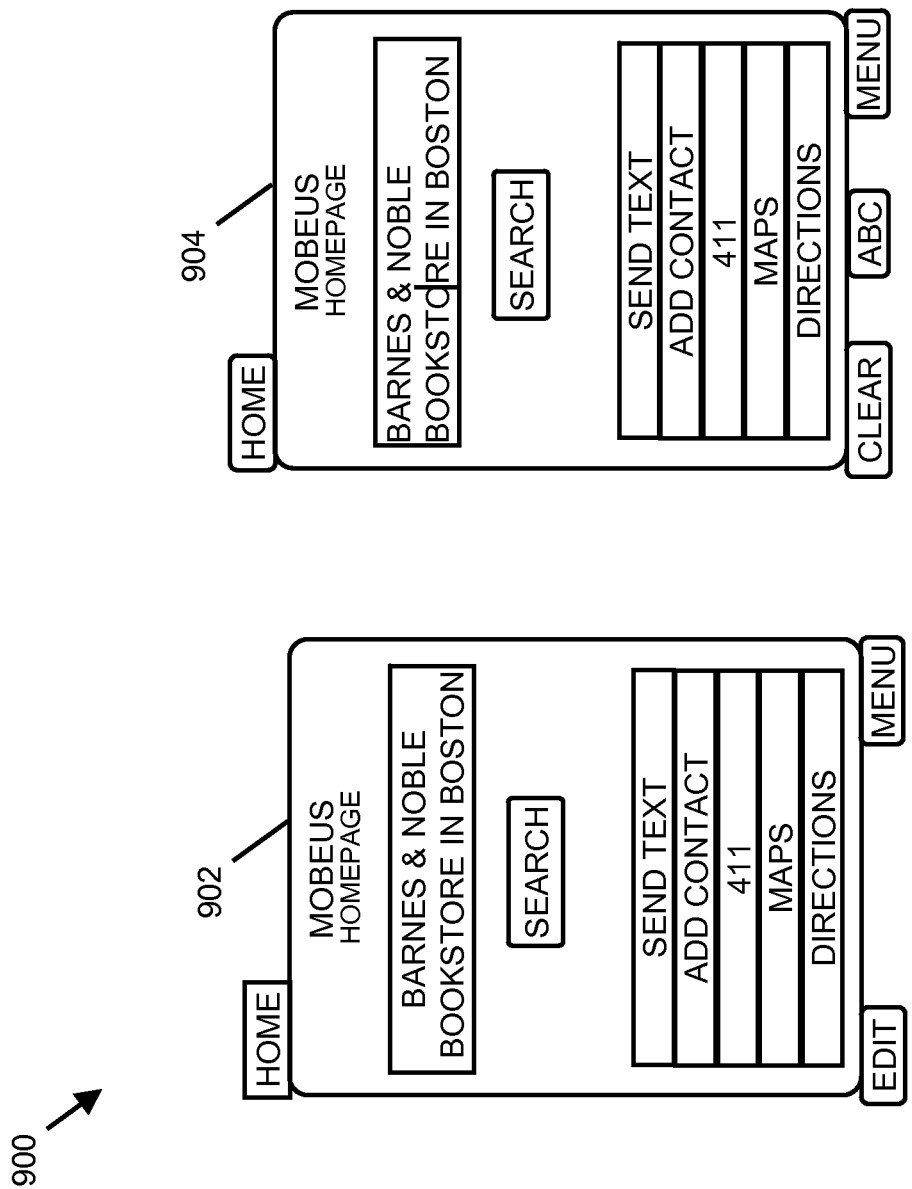
FIG. 9 depicts text boxes for the user interface.

FIG. 9 shows text boxes in a navigate-and-edit mode. A text box is either in navigate mode or edit mode 900. When in navigate mode 902, no cursor or a dim cursor is shown and 'up/down', when the text box is highlighted, moves to the next element on the browser screen. For example, moving down would highlight the "search" box. The user 130 may enter edit mode from navigate mode 902 on any of a plurality of actions; including pressing on center joystick; moving left/right in navigate mode; selecting "Edit" soft-key; pressing any of the keys 0-9, which also adds the appropriate letter to the text box at the current cursor position; and the like. When in edit mode 904, a cursor may be shown and the left soft-key may be "Clear" rather than "Edit." The current shift mode may be also shown in the center of the bottom row. In edit mode 904, up and down may navigate within the text box, although users 130 may also navigate out of the text box by navigating past the first and last rows. In this example, pressing up would move the cursor to the first row, while pressing down instead would move the cursor out of the text box and highlight the "search" box instead. The user 130 may hold the navigate buttons down to perform multiple repeated navigations. When the same key is held down for an extended time, four seconds for example, navigation may be sped up by moving more quickly, for instance, times four in speed. As an alternative, navigate mode 902 may be removed so that when the text box is highlighted, a cursor may be shown. This may remove the modality, but then requires users 130 to move up and down through each line of the text box when trying to navigate past the text box.

Figure 10:
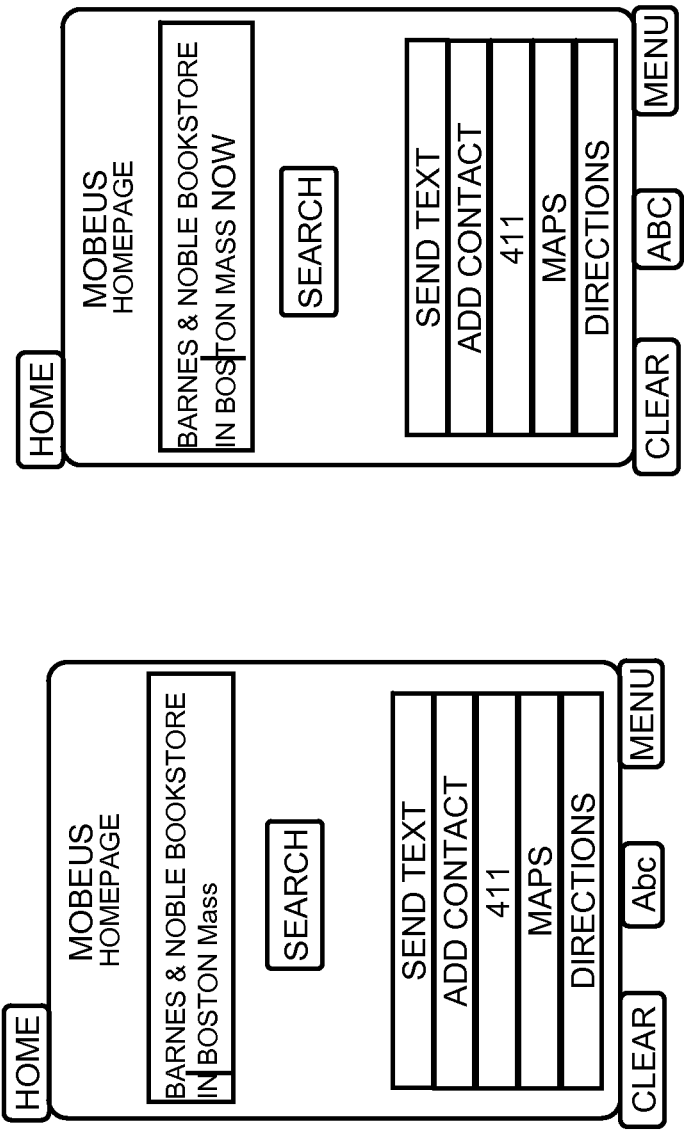
FIG. 10 depicts a first example of text entry for the user interface.
Figure 11:
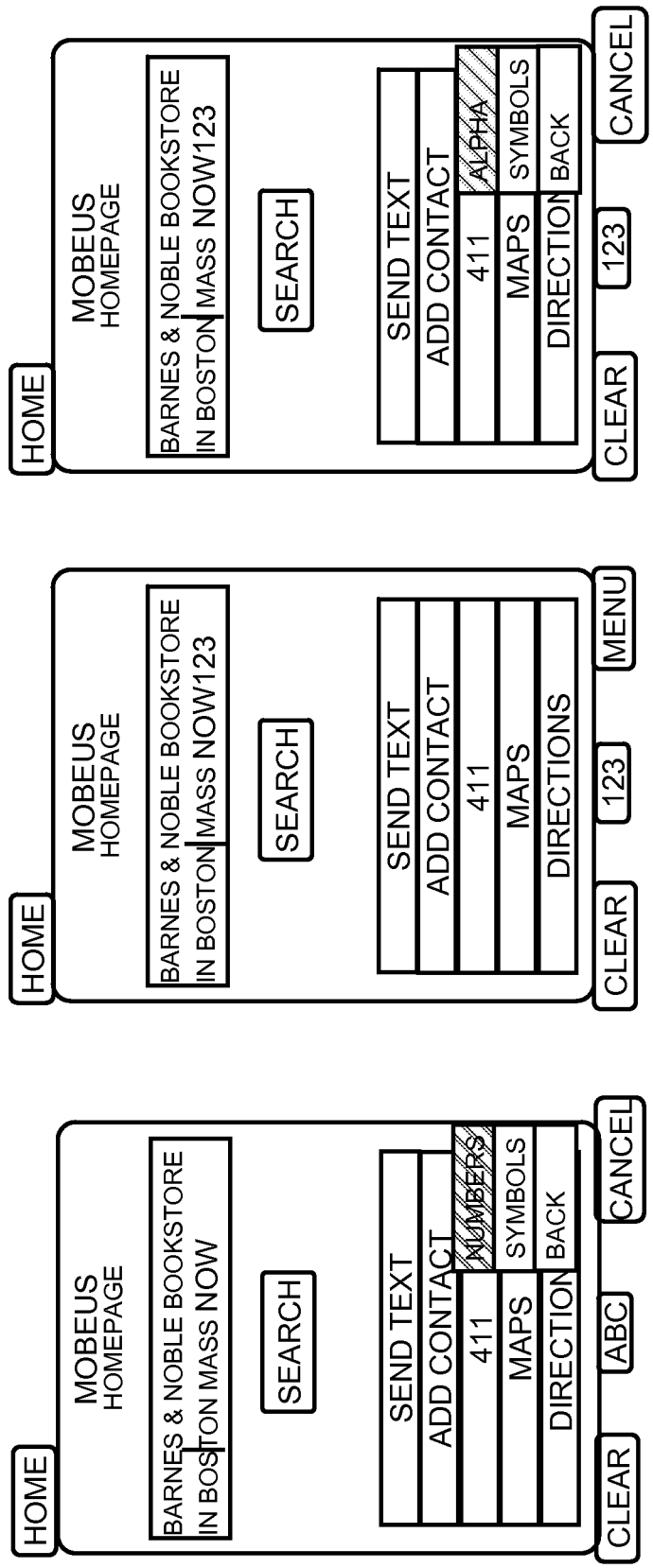
FIG. 11 depicts a second example of text entry for the user interface.
Figure 12:
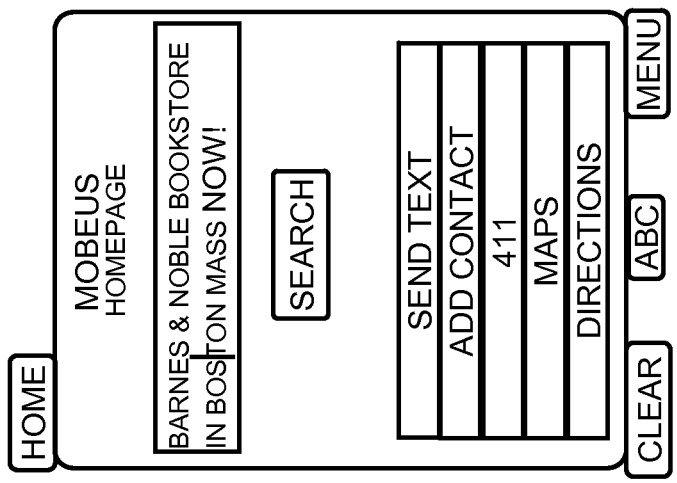
FIG. 12 depicts a third example of text entry for the user interface.
Figure 12:
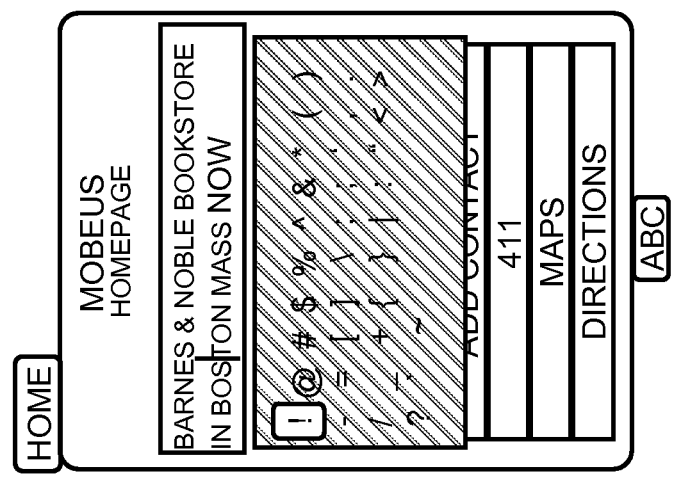
Figure 12:
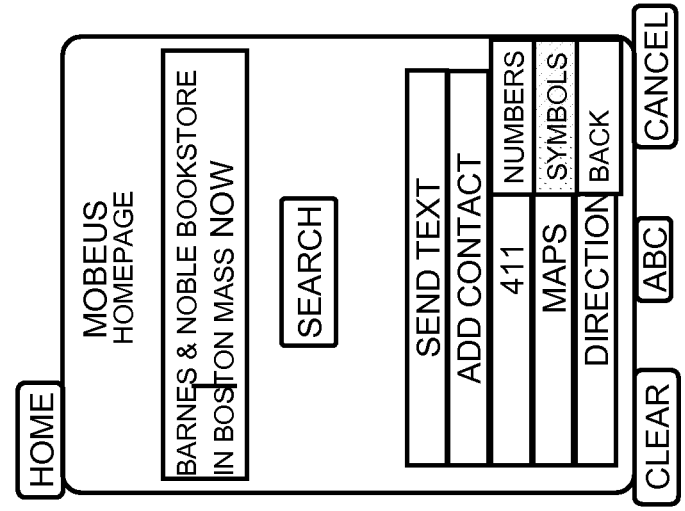

Text may be entered in the current cursor position in multi-tap mode, as shown in FIGS. 10, 11, and 12. As an example, pressing "2" once may be the same as entering "a", pressing "2" twice may be the same as entering "b", pressing "2" three times may be the same as entering "c", and pressing "2" 4 times may be the same as entering "2". The direction keys may be used to reposition the cursor. Back, or delete on some phones, may be used to delete individual characters. When Back is held down, text may be deleted to the beginning of the previous recognition result, then to the beginning of the text. Capitalized letters may be entered by pressing the "*" key which may put the text into capitalization mode, with the first letter of each new word capitalized. Pressing "*" again puts the text into all-caps mode, with all new entered letters capitalized. Pressing "*" yet again goes back to lower case mode where no new letters may be capitalized. Numbers may be entered either by pressing a key repeatedly to cycle through the letters to the number, or by going into numeric mode. The menu soft-key may contain a "Numbers" option which may put the cursor into numeric mode. Alternatively, numeric mode may be accessible by pressing "*" when cycling capitalization modes. To switch back to alphanumeric mode, the user 130 may again select the Menu soft-key which now contains an "Alpha" option, or by pressing "*". Symbols may be entered by cycling through the "1" key, which may map to a subset of symbols, or by bringing up the symbol table through the Menu soft-key. The navigation keys may be used to traverse the symbol table and the center OK button used to select a symbol and insert it at the current cursor position.

Figure 13:
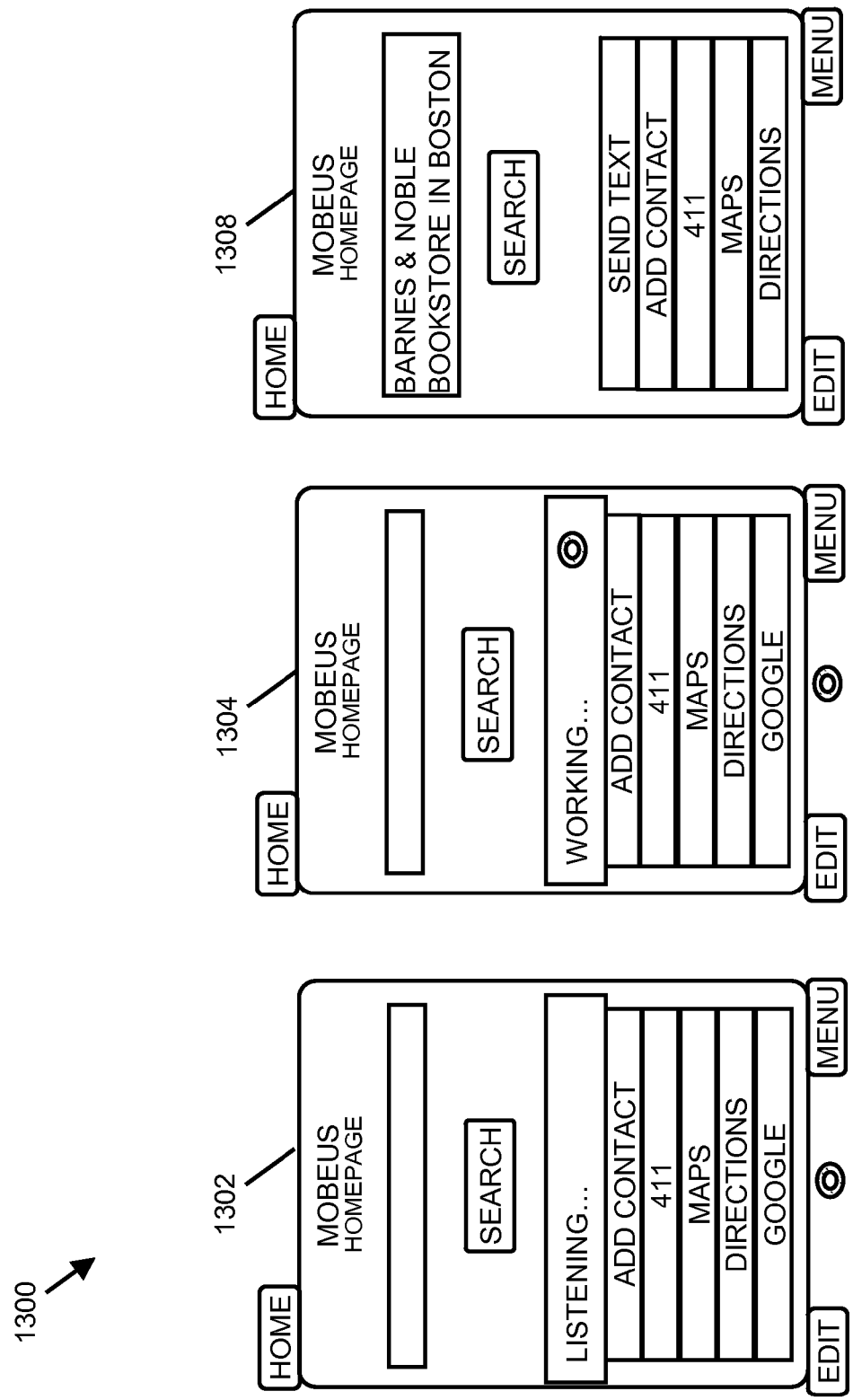
FIG. 13 depicts speech entry for the user interface.

FIG. 13 provides examples of speech entry 1300, and how it is depicted on the user 130 interface. When the user 130 holds the TALK button to begin speaking, a popup may appear informing the user 130 that the recognizer is listening 1302. In addition, the phone may either vibrate or play a short beep to cue the user 130 to begin speaking. When the user 130 is finished speaking and releases the TALK button, the popup status may show "Working" with a spinning indicator. The user 130 may cancel a processing recognition by pressing a button on the keypad or touch screen, such as "Back" or a directional arrow. Finally, when the result is received from the ASR server 204, the text box may be populated.

Figure 14:
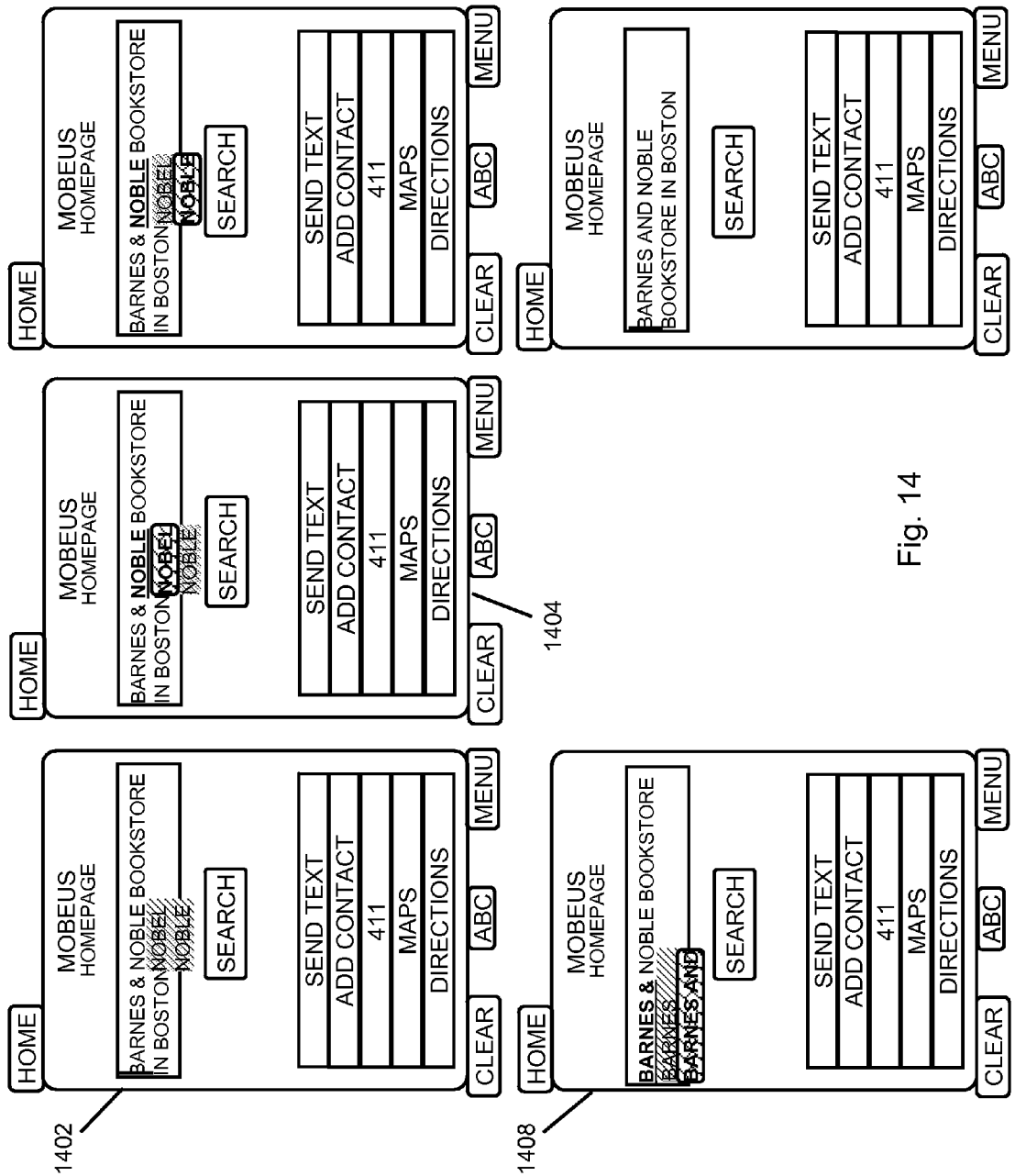
FIG. 14 depicts speech-result correction for the user interface.

Referring to FIG. 14, when the user 130 presses left or right to navigate through the text box, alternate results 1402 for each word may be shown in gray below the cursor for a short time, such as 1.7 seconds. After that period, the gray alternates disappear, and the user 130 may have to move left or right again to get the box. If the user 130 presses down to navigate to the alternates while it is visible, then the current selection in the alternates may be highlighted, and the words that will be replaced in the original sentence may be highlighted in red 1404. The image on the bottom left of FIG. 14 shows a case where two words in the original sentence will be replaced 1408. To replace the text with the highlighted alternate, the user 130 may press the center OK key. When the alternate list is shown in red 1408 after the user 130 presses down to choose it, the list may become hidden and go back to normal cursor mode if there is no activity after some time, such as 5 seconds. When the alternate list is shown in red, the user 130 may also move out of it by moving up or down past the top or bottom of the list, in which case the normal cursor is shown with no gray alternates box. When the alternate list is shown in red, the user 130 may navigate the text by words by moving left and right. For example, when "Nobel" is highlighted 1404, moving right would highlight "bookstore" and show its alternate list instead.

Figure 15:
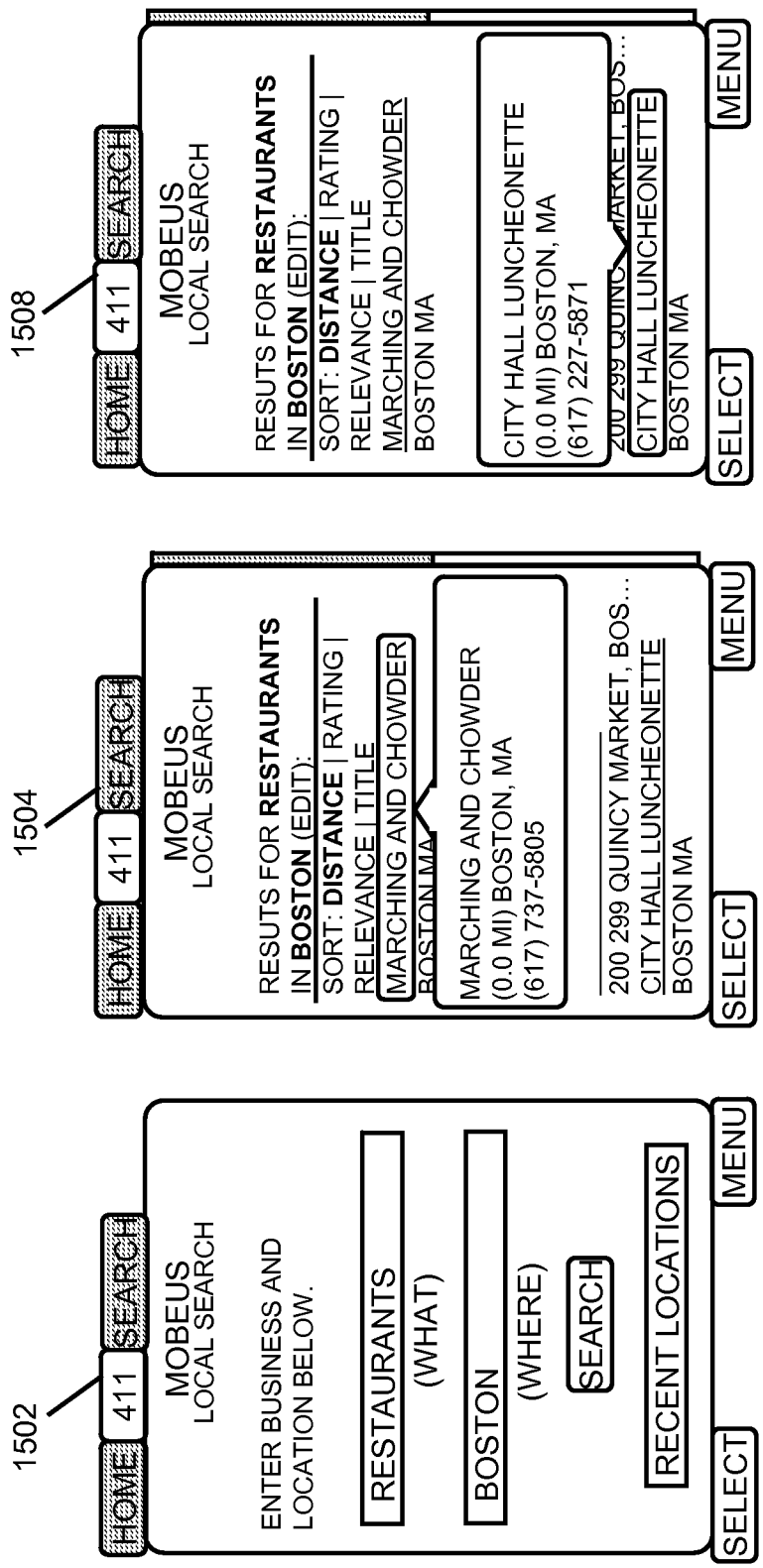
FIG. 15 depicts a first example of navigating browser screen for the user interface.

FIG. 15 depicts screens that show navigation and various views of information related to search features of the methods and systems herein described. When the user 130 navigates to a new screen, a "Back" key may be used to go back to a previous screen. As shown in FIG. 15, if the user 130 selects "search" on screen 1502 and navigates to screen 1504 or 1508, pressing "Back" after looking through the search results of screens 1504 or 1508 the screen 1502 may be shown again.

Figure 16:
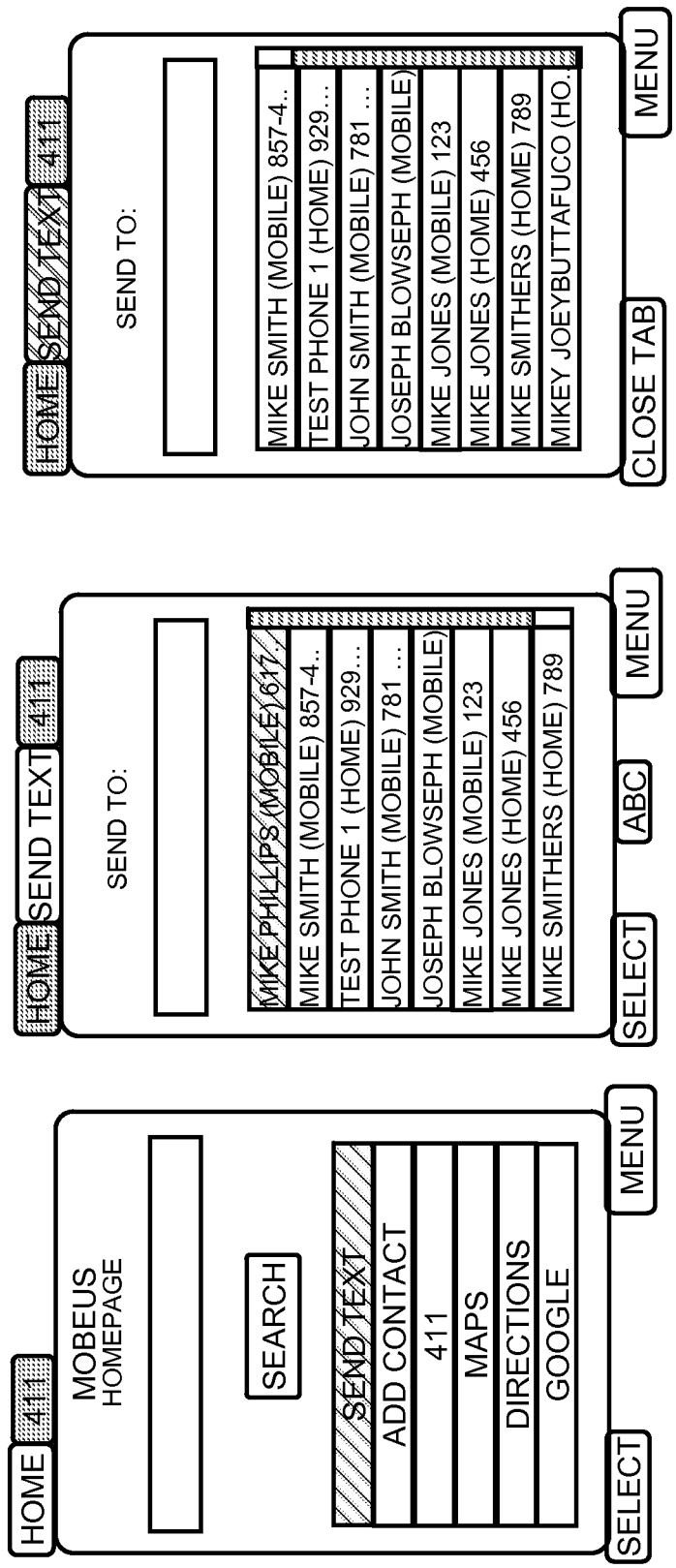
FIG. 16 depicts a second example of navigating browser screen for the user interface.

Referring to FIG. 16, when the user 130 navigates to a new page from the home page, a new tab may be automatically inserted, such as to the right of the "home" tab, as shown in FIG. 16. Unless the user 130 has selected to enter or alter entries in a text box, tabs can be navigated by pressing left or right keys on the user interface keypad. The user 130 may also move the selection indicator to the top of the screen and select the tab itself before moving left or right. When the tab is highlighted, the user 130 may also select a soft-key to remove the current tab and screen. As an alternative, tabs may show icons instead of names as pictured, tabs may be shown at the bottom of the screen, the initial screen may be pre-populated with tabs, selection of an item from the home page may take the user 130 to an existing tab instead of a new one, and tabs may not be selectable by moving to the top of the screen and tabs may not be removable by the user 130, and the like.

Referring again briefly to FIG. 2, communication may occur among at least the ASR client 118, ASR router 202, and ASR server 204. These communications may be subject to specific protocols. In an embodiment of these protocols, the ASR client 118, when prompted by user 130, may record audio and may send it to the ASR router 202. Received results from the ASR router 202 are displayed for the user 130. The user 130 may send user 130 entries to ASR router 202 for any text entry. The ASR router 202 sends audio to the appropriate ASR server 204, based at least on the user 130 profile represented by the client ID and CPU load on ASR servers 204. The results may then be sent from the ASR server 204 back to the ASR client 118. The ASR router 202 re-routes the data if the ASR server 204 indicates a mismatched user 130 profile. The ASR router 202 sends to the ASR server 204 any user 130 text inputs for editing. The ASR server 204 receives audio from ASR router 202 and performs recognition. Results are returned to the ASR router 202. The ASR server 204 alerts the ASR router 202 if the user's 130 speech no longer matches the user's 130 predicted user 130 profile, and the ASR router 202 handles the appropriate re-route. The ASR server 204 also receives user-edit accepted text results from the ASR router 202.

Figure 17:
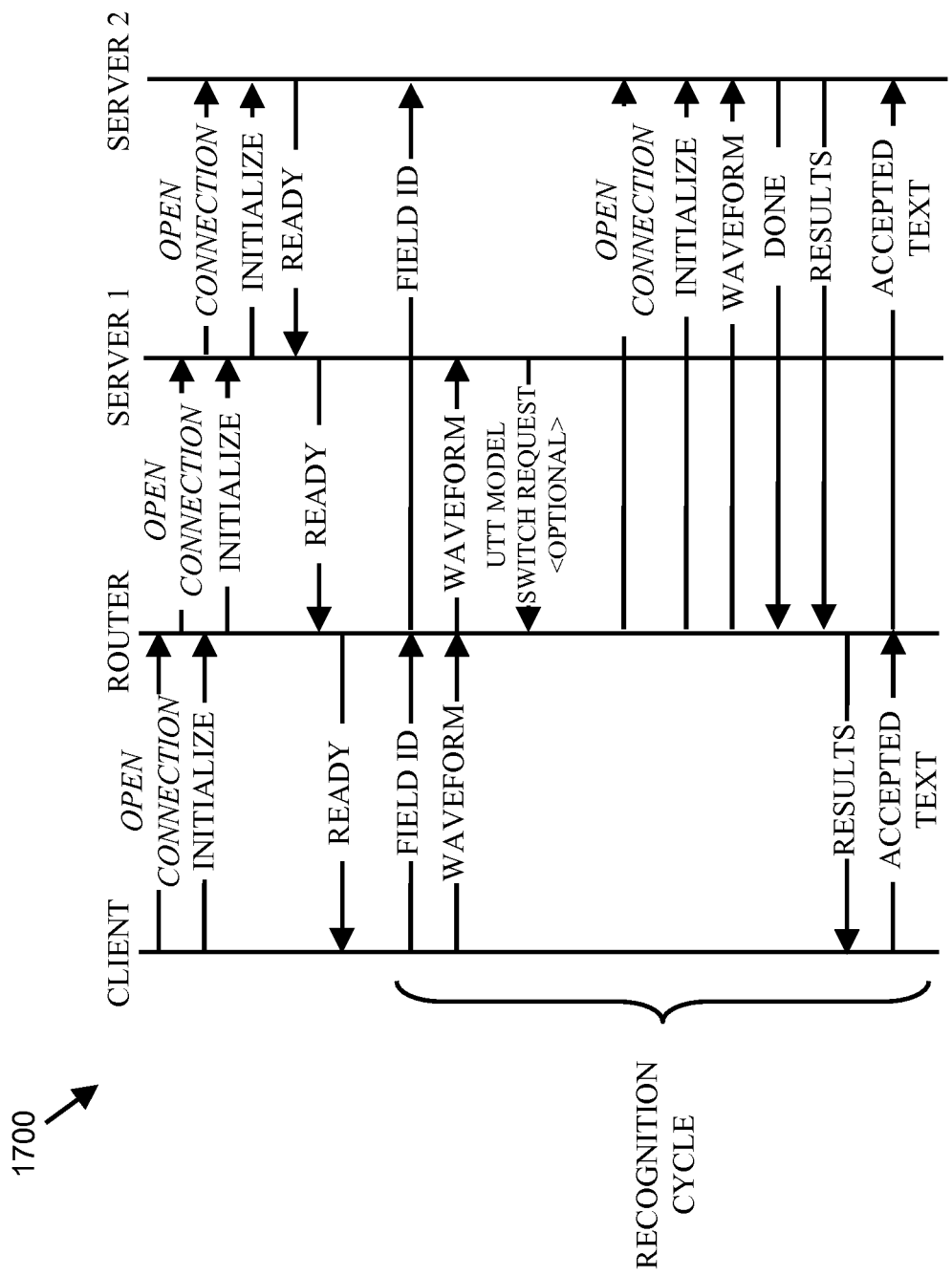
FIG. 17 depicts packet types communicated between the client, router, and server at initialization and during a recognition cycle.

FIG. 17 shows an illustration of the packet types that are communicated between the ASR client 118, ASR router 202, and server 204 at initialization and during a recognition cycle. During initialization, a connection is requested, with the connection request going from ASR client 118 to the ASR router 202 and finally to the ASR server 204. A ready signal is sent back from the ASR servers 204 to the ASR router 202 and finally to the ASR client 118. During the recognition cycle, a waveform is input at the ASR client 118 and routed to the ASR servers 204. Results are then sent back out to the ASR client 118, where the user 130 accepts the returned text, sent back to the ASR servers 104. A plurality of packet types may be utilized during these exchanges, such as PACKET_WAVEFORM=1, packet is waveform; PACKET_TEXT=2, packet is text; PACKET_END_OF_STREAM=3, end of waveform stream; PACKET_IMAGE=4, packet is image; PACKET_SYNCLIST=5, syncing lists, such as email lists; PACKET_CLIENT_PARAMETERS=6, packet contains parameter updates for client; PACKET_ROUTER_CONTROL=7, packet contains router control information; PACKET_MESSAGE=8, packet contains status, warning or error message; PACKET_IMAGE_REQUEST=9, packet contains request for an image or icon; or the like.

Figure 18:
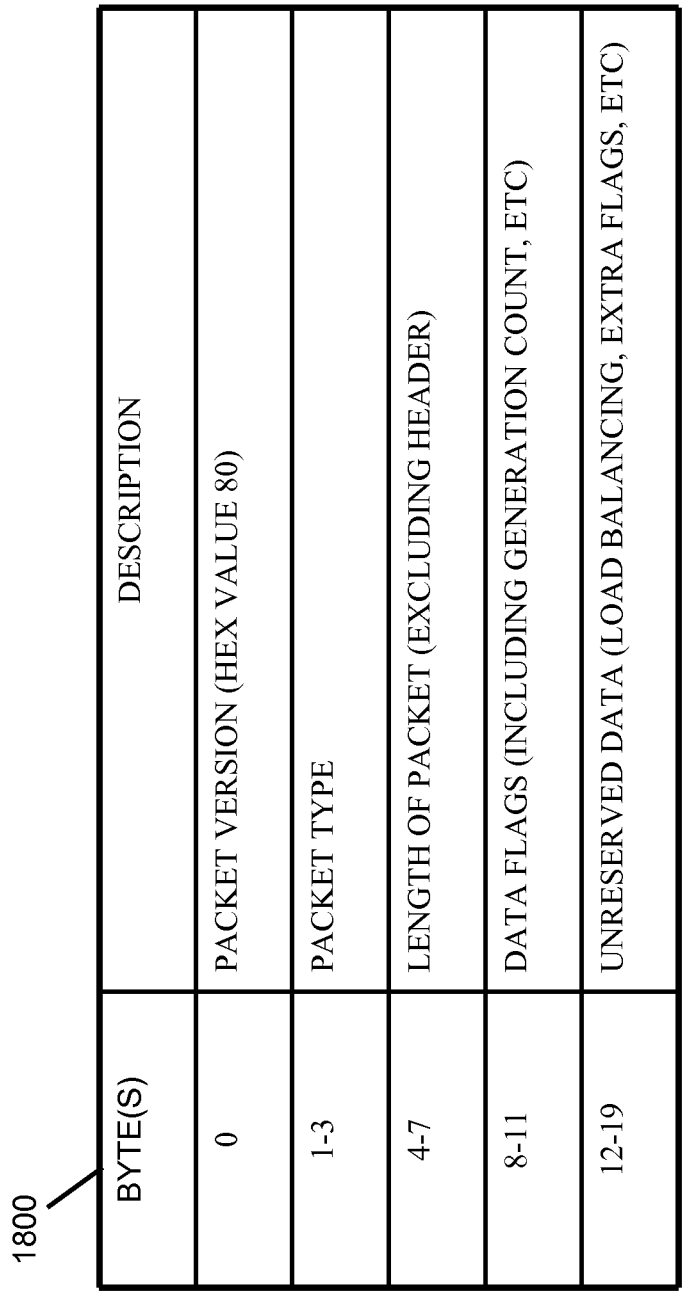
FIG. 18 depicts an example of the contents of a header.

Referring to FIG. 18, each message may have a header, that may include various fields, such as packet version, packet type, length of packet, data flags, unreserved data, and any other dat, fields or content that is applicable to the message. All multi-byte words may be encoded in big-endian format.

Referring again to FIG. 17, initialization may be sent from the ASR client 118, through the ASR router 202, to the ASR server 204. The ASR client 118 may open a connection with the ASR router 202 by sending its Client ID. The ASR router 202 in turn looks up the ASR client's 118 most recent acoustic model 220 (AM) and language model 228 (LM) and connects to an appropriate ASR server 204. The ASR router 202 stores that connection until the ASR client 118 disconnects or the Model ID changes. The packet format for initialization may have a specific format, such as Packet type=TEXT, Data=ID:<client id string> ClientVersion: <client version string>, Protocol:<protocol id string> NumReconnects: <# attempts client has tried reconnecting to socket>, or the like. The communications path for initialization may be (1) Client sends Client ID to ASR router 202, (2) ASR router 202 forwards to ASR a modified packet: Modified Data=<client's original packet data> SessionCount: <session count string> SpeakerID: <user id sting>\0, and (3) resulting state: ASR is now ready to accept utterance(s) from the ASR client 118, ASR router 202 maintains client's ASR connection.

As shown in FIG. 17, a ready packet may be sent back to the ASR client 118 from the ASR servers 204. The packet format for packet ready may have a specific format, such as Packet type=TEXT, Data=Ready\0, and the communications path may be (1) ASR sends Ready router and (2) ASR router 202 forwards Ready packet to ASR client 118.

As shown in FIG. 17, a field ID packet containing the name of the application and text field within the application may be sent from the ASR client 118 to the ASR servers 204. This packet is sent as soon as the user 130 pushes the TALK button to begin dictating one utterance. The ASR servers 204 may use the field ID information to select appropriate recognition models 142 for the next speech recognition invocation. The ASR router 202 may also use the field ID information to route the current session to a different ASR server 204. The packet format for the field ID packet may have a specific format, such as Packet type=TEXT; Data=FieldID; <type> <url> <form element name>, for browsing mobile web pages; Data=FieldID: message, for SMS text box; or the like. The connection path may be (1) ASR client 118 sends Field ID to ASR router 202 and (2) ASR router 202 forwards to ASR for logging.

As shown in FIG. 17, a waveform packet may be sent from the ASR client 118 to the ASR servers 204. The ASR router 202 sequentially streams these waveform packets to the ASR server 204. If the ASR server 204 senses a change in the Model ID, it may send the ASR router 202 a ROUTER_CONTROL packet containing the new Model ID. In response, the ASR router 202 may reroute the waveform by selecting an appropriate ASR and flagging the waveform such that the new ASR server 204 will not perform additional computation to generate another Model ID. The ASR router 202 may also re-route the packet if the ASR server's 204 connection drops or times out. The ASR router 202 may keep a cache of the most recent utterance, session information such as the client ID and the phone ID, and corresponding FieldID, in case this happens. The packet format for the waveform packet may have a specific format, such as Packet type=WAVEFORM; Data=audio; with the lower 16 bits of flags set to current Utterance ID of the client. The very first part of WAVEFORM packet may determine the waveform type, currently only supporting AMR or QCELP, where "#!AMR\n" corresponds to AMR and "RIFF" corresponds to QCELP. The connection path may be (1) ASR client 118 sends initial audio packet (referred to as the BOS, or beginning of stream) to the ASR router 202, (2) ASR router 202 continues streaming packets (regardless of their type) to the current ASR until one of the following events occur: (a) ASR router 202 receives packet type END_OF_STREAM, signaling that this is the last packet for the waveform, (b) ASR disconnects or times out, in which case ASR router 202 finds new ASR, repeats above handshake, sends waveform cache, and continues streaming waveform from client to ASR until receives END_OF_STREAM, (c) ASR sends ROUTER_CONTROL to ASR router 202 instructing the ASR router 202 that the Model ID for that utterance has changed, in which case the ASR router 202 behaves as in 'b', (d) ASR client 118 disconnects or times out, in which case the session is closed, or the like. If the recognizer times out or disconnects after the waveform is sent then the ASR router 202 may connect to a new ASR.

As shown in FIG. 17, a request model switch for utterance packet may be sent from the ASR server 204 to the ASR router 202. This packet may be sent when the ASR server 204 needs to flag that its user 130 profile does not match that of the utterance, i.e. Model ID for the utterances has changed. The packet format for the request model switch for utterance packet may have a specific format, such as Packet type=ROUTER_CONTROL; Data=SwitchModelID: AM=<integer> LM=<integer> SessionID=<integer> UttID=<integer>. The communication may be (1) ASR server 204 sends control packet to ASR router 202 after receiving the first waveform packet, and before sending the results packet, and (2) ASR router 202 then finds an ASR which best matches the new Model ID, flags the waveform data such that the new ASR server 204 will not send another SwitchModelID packet, and resends the waveform. In addition, several assumptions may be made for this packet, such as the ASR server 204 may continue to read the waveform packet on the connection, send a Alternate String or Switch-ModelID for every utterance with BOS, and the ASR router 202 may receive a switch model id packet, it sets the flags value of the waveform packets to <flag value> & 0x8000 to notify ASR that this utterance's Model ID does not need to be checked.

As shown in FIG. 17, a done packet may be sent from the ASR server 204 to the ASR router 202. This packet may be sent when the ASR server 204 has received the last audio packet, such as type END_OF_STREAM. The packet format for the done packet may have a specific format, such as Packet type=TEXT; with the lower 16 bits of flags set to Utterance ID and Data=Done\0. The communications path may be (1) ASR sends done to ASR router 202 and (2) ASR router 202 forwards to ASR client 118, assuming the ASR client 118 only receives one done packet per utterance.

As shown in FIG. 17, an utterance results packet may be sent from the ASR server 204 to the ASR client 118. This packet may be sent when the ASR server 204 gets a result from the ASR engine 208. The packet format for the utterance results packet may have a specific format, such as Packet type=TEXT, with the lower 16 bits of flags set to Utterance ID and Data=ALTERNATES: <utterance result string>. The communications path may be (1) ASR sends results to ASR router 202 and (2) ASR router 202 forwards to ASR client 118. The ASR client 118 may ignore the results if the Utterance ID does not match that of the current recognition As shown in FIG. 17, an accepted text packet may be sent from the ASR client 118 to the ASR server 204. This packet may be sent when the user 130 submits the results of a text box, or when the text box looses focus, as in the API, so that the recognizer can adapt to corrected input as well as full-text input. The packet format for the accepted text packet may have a specific format, such as Packet type=TEXT, with the lower 16 bits of flags set to most recent Utterance ID, with Data=Accepted Text: <accepted utterance string>. The communications path may be (1) ASR client 118 sends the text submitted by the user 130 to ASR router 202 and (2) ASR router 202 forwards to ASR server 204 which recognized results, where <accepted utterance string> contains the text string entered into the text box. In embodiments, other logging information, such as timing information and user 130 editing keystroke information may also be transferred.

Router control packets may be sent between the ASR client 118, ASR router 202, and ASR servers 204, to help control the ASR router 202 during runtime. One of a plurality of router control packets may be a get router status packet. The packet format for the get router status packet may have a specific format, such as Packet type=ROUTER_CONTROL, with Data=GetRouterStatus\0. The communication path may be one or more of the following: (1) entity sends this packet to the ASR router 202 and (2) ASR router 202 may respond with a status packet.

FIG. 19 depicts an embodiment of a specific status packet format 1900, that may facilitate determining status of the ASR Router 202, ASR Server 204, ASR client 118 and any other element, facility, function, data state, or information related to the methods and systems herein disclosed.

Another of a plurality of router control packets may be a busy out ASR server packet. The packet format for the busy out ASR server packet may have a specific format, such as Packet type=ROUTER_CONTROL, with Data=BusyOutASRServer: <ASR Server ID>\0. Upon receiving the busy out ASR server packet, the ASR router 202 may continue to finish up the existing sessions between the ASR router 202 and the ASR server 204 identified by the <ASR Server ID>, and the ASR router 202 may not start a new session with the said ASR server 204. Once all existing sessions are finished, the ASR router 202 may remove the said ASR server 204 from its ActiveServer array. The communication path may be (1) entity sends this packet to the ASR router 202 and (2) ASR router 202 responds with ACK packet with the following format: Packet type=TEXT, and Data=ACK\0.

Another of a plurality of router control packets may be an immediately remove ASR server packet. The packet format for the immediately remove ASR server packet may have a specific format, such as Packet type=ROUTER_CONTROL, with Data=RemoveASRServer: <ASR Server ID>\0. Upon receiving the immediately remove ASR server packet, the ASR router 202 may immediately disconnect all current sessions between the ASR router 202 and the ASR server 204 identified by the <ASR Server ID>, and the ASR router 202 may also immediately remove the said ASR server 204 from its Active Server array. The communication path may be (1) entity sends this packet to the ASR router 202 and (2) ASR router 202 responds with ACK packet with the following format: Packet type=TEXT, and Data=ACK\0.

Another of a plurality of router control packets may be an add of an ASR server 204 to the router packet. When an ASR server 204 is initially started, it may send the router(s) this packet. The ASR router 202 in turn may add this ASR server 204 to its Active Server array after establishing this ASR server 204 is indeed functional. The packet format for the add an ASR server 204 to the ASR router 202 may have a specific format, such as Packet type=ROUTER_CONTROL, with Data=AddASRServer: ID=<server id> IP=<server ip address> PORT=<server port> AM=<server AM integer> LM=<server LM integer> NAME=<server name string> PROTOCOL=<server protocol float>. The communication path may be (1) entity sends this packet to the ASR router 202 and (2) ASR router 202 responds with ACK packet with the following format: Packet type=TEXT, and Data=ACK\0.

Another of a plurality of router control packets may be an alter router logging format packet. This function may cause the ASR router 202 to read a logging.properties file, and update its logging format during runtime. This may be useful for debugging purposes. The location of the logging.properties file may be specified when the ASR router 202 is started. The packet format for the alter router logging format may have a specific format, such as Packet type=ROUTER_CONTROL, with Data=ReadLogConfigurationFile. The communications path may be (1) entity sends this packet to the ASR router 202 and (2) ASR router 202 responds with ACK packet with the following format: Packet type=TEXT, and Data=ACK\0.

Another of a plurality of router control packets may be a get ASR server status packet. The ASR server 204 may self report the status of the current ASR server 204 with this packet. The packet format for the get ASR server 204 status may have a specific format, such as Packet type=ROUTER_CONTROL, with data=RequestStatus\0. The communications path may be (1) entity sends this packet to the ASRServer 204 and (2) ASR Server 204 responds with a status packet with the following format: Packet type=TEXT; Data=ASRServerStatus: Status=<1 for ok or 0 for error> AM=<AM id> LM=<LM id> NumSessions=<number of active sessions> NumUtts=<number of queued utterances> TimeSinceLastRec=<seconds since last recognizer activity>\n Session: client=<client id> speaker=<speaker id> sessioncount=<sessioncount>\n<other Session: line if other sessions exist>\n \0. This router control packet may be used by the ASR router 202 when establishing whether or not an ASR server 204 is indeed functional.

There may be a plurality of message packets associated with communications between the ASR client 118, ASR router 202, and ASR servers 204, such as error, warning, and status. The error message packet may be associated with an irrecoverable error, the warning message packet may be associated with a recoverable error, and a status message packet may be informational. All three types of messages may contain strings of the format: "<messageType><message>message</message> <cause>cause</cause><code>code</code> </messageType>".

Wherein "messageType" is one of either "status," "warning," or "error"; "message" is intended to be displayed to the user; "cause" is intended for debugging; and "code" is intended to trigger additional actions by the receiver of the message.

The error packet may be sent when a non-recoverable error occurs and is detected. After an error packet has been sent, the connection may be terminated in 5 seconds by the originator if not already closed by the receiver. The packet format for error may have a specific format, such as Packet type=MESSAGE; and Data="<error><message>error message</message><cause>error cause</cause><code>error code</code></error>". The communication path from ASR client 118 (the originator) to ASR server 204 (the receiver) may be (1) ASR client 118 sends error packet to ASR server 204, (2) ASR server 204 should close connection immediately and handle error, and (3) ASR client 118 will close connection in 5 seconds if connection is still live. There are a number of potential causes for the transmission of an error packet, such as the ASR has received beginning of stream (BOS), but has not received end of stream (EOS) or any waveform packets for 20 seconds; a client has received corrupted data; the ASR server 204 has received corrupted data; and the like. Examples of corrupted data may be invalid packet type, checksum mismatch, packet length greater than maximum packet size, and the like.

The warning packet may be sent when a recoverable error occurs and is detected. After a warning packet has been sent, the current request being handled may be halted. The packet format for warning may have a specific format, such as Packet type=MESSAGE; Data="<warning><message>warning message</message> <cause>warning cause</cause><code>warning code</code></warning>". The communications path from ASR client 118 to ASR server 204 may be (1) ASR client 118 sends warning packet to ASR server 204 and (2) ASR server 204 should immediately handle the warning. The communications path from ASR server 204 to ASR client 118 may be (1) ASR server 204 sends error packet to ASR client 118 and (2) ASR client 118 should immediately handle warning. There are a number of potential causes for the transmission of a warning packet; such as there are no available ASR servers 204 to handle the request ModelID because the ASR servers 204 are busy.

The status packets may be informational. They may be sent asynchronously and do not disturb any processing requests. The packet format for status may have a specific format, such as Packet type=MESSAGE; Data="<status><message>status message</message><cause>status cause</cause><code>status code</code></status>". The communications path from ASR client 118 to ASR server 204 may be (1) ASR client 118 sends status packet to ASR server 204 and (2) ASR server 204 should handle status. The communication path from ASR server 204 to ASR client 118 may be (1) ASR server 204 sends status packet to ASR client 118 and (2) ASR client 118 should handle status. There are a number of potential causes for the transmission of a status packet, such as an ASR server 204 detects a model ID change for a waveform, server timeout, server error, and the like.

The elements depicted in flow charts and block diagrams throughout the figures imply logical boundaries between the elements. However, according to software or hardware engineering practices, the depicted elements and the functions thereof may be implemented as parts of a monolithic software structure, as standalone software modules, or as modules that employ external routines, code, services, and so forth, or any combination of these, and all such implementations are within the scope of the present disclosure. Thus, while the foregoing drawings and description set forth functional aspects of the disclosed systems, no particular arrangement of software for implementing these functional aspects should be inferred from these descriptions unless explicitly stated or otherwise clear from the context.

Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods or processes described above, and steps thereof, may be realized in hardware, software, or any combination of these suitable for a particular application. The hardware may include a general-purpose computer and/or dedicated computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as computer executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A method of entering text into a music system using a processor, comprising:
   recording speech presented by a user using a resident capture facility;
   providing the speech as a recording to a speech recognition facility;
   selecting at least one statistical language model, including a large vocabulary statistical language model, from a set of language models based at least in part on contextual information relating to the recording, wherein the at least one statistical language model selected includes a general language model for artists, a general language model for song titles, and a general language model for music types;
   determining that the at least one statistical language model selected provides insufficient recognition output and requires an additional recognition pass of the recording;
   conducting the additional recognition pass of the recording;
   selecting at least one other statistical language model based at least in part on the additional recognition pass of the recording and client state information of the recording;
   generating results utilizing the speech of the recording recognized by the speech recognition facility; and
   using the results in the music system, wherein the music system provides information relating to a music application to the speech recognition facility, wherein generating the results is based at least in part on the information, wherein the information relating to the music application includes contextual information within the music application, and wherein the contextual information includes at least one of a usage history of the music application and information from at least one of a favorites list and playlists of the user.

2. The method of claim 1, further comprising using user feedback to adapt the at least one statistical language model selected.

3. The method of claim 1, wherein the speech recognition facility is remotely located from the music system.

4. The method of claim 1, wherein the information relating to the music application further includes at least one of an identity of the music application, an identity of a text box within the music application, an identity of the music system, and an identity of the user.

5. The method of claim 4, wherein the contextual information further includes at least one of information about music currently stored on the music system, and information currently displayed in the music application.

6. The method of claim 1, wherein generating the results based at least in part on the information relating to the music application includes selecting at least one of a plurality of recognition models as the at least one statistical language model based on the information relating to the music application and the recording.

7. The method of claim 1, wherein the at least one statistical language model is selected based at least in part on the information relating to music application.

8. The method of claim 1, further comprising selecting a different statistical language model based on the results generated.

9. The method of claim 1, wherein the speech of the recording recognized comprises at least one of a song title, an artist name and a music category.

10. The method of claim 1, wherein the client state information includes one or more of application ID of the music application, user ID of the user, text field ID of the music application and current state of the music application.

11. A method for entering text into a music system using a processor, comprising:
    recording speech presented by a user using a resident capture facility;
    providing the speech as a recording to a speech recognition facility;
    selecting at least one statistical language model from a set of language models based at least in part on contextual information relating to the recording, wherein the at least one statistical language model selected includes a general language model for artists, a general language model for song titles, and a general language model for music types;
    determining that the at least one statistical language model selected provides insufficient recognition output and requires an additional recognition pass of the recording;
    conducting the additional recognition pass of the recording;
    selecting at least one other statistical language model based at least in part on the additional recognition pass of the recording and client state information of the recording;
    generating results utilizing the speech recognition facility;
    allowing the user to alter the results; and
    using the results in the music system, wherein the music system provides information relating to a music application to the speech recognition facility, wherein generating the results is based at least in part on the information, wherein allowing the user to alter the results includes the user editing a text result using at least one of a set of buttons, other controls, and a screen-based text correction mechanism on the music system, wherein the information includes usage history of the music application and information from at least one of a favorites list and playlists of the user.

12. The method of claim 11 wherein the speech recognition facility is remotely located from the music system.

13. The method of claim 11 wherein the information relating to the music application running on the music system is provided to the speech recognition facility.

14. The method of claim 11 wherein allowing the user to alter the results includes selecting from among a plurality of alternate choices of words contained in the results from the speech recognition facility.

15. The method of claim 11 wherein allowing the user to alter the results includes selecting from among a plurality of alternate actions related to the results from the speech recognition facility.

16. The method of claim 11, further comprising combining words recognized from more than one set of language models to generate the results.

17. The method of claim 11, wherein allowing the user to alter the results includes adapting the statistical language model selected using user feedback.

18. The method of claim 11, wherein the speech recognized comprises at least one of a city, a state and a region.

19. A system for entering text into a music system comprising:
 a resident capture facility for recording speech presented by a user;
 a speech recognition facility for receiving the speech as a recording, for determining that the at least one statistical language model selected provides insufficient recognition output and requires an additional recognition pass of the recording, for conducting the additional recognition pass of the recording, for selecting at least one other statistical language model based at least in part on the additional recognition pass of the recording and client state information of the recording, and for generating results by selecting at least one statistical language model from a set of language models based at least in part on contextual information relating to the recording, wherein the at least one selected statistical language model includes a general language model for artists, a general language model for song titles, and a general language model for music types; and
 the music system for using the results, wherein the music system provides information relating to a music application to the speech recognition facility and wherein the results are generated based at least in part on the information, and wherein the contextual information includes usage history of the music application and information from at least one of a favorites list and playlists of the user.

20. The system of claim 19 wherein the speech recognition facility is remotely located from the music system.

21. The system of claim 19 wherein the speech recognition facility generates the results based at least in part on the information relating to the music application that is received from the music system.

22. The system of claim 21 wherein the information relating to the music application includes at least one of an identity of the music application, an identity of a text box within the music application, the contextual information within the music application, an identity of the music system, and an identity of the user.

23. The system of claim 19, wherein the speech recognition facility allows the user an opportunity to alter the speech from the recording recognized by the speech recognition facility.

24. The system of claim 19, wherein the system generates the results selected from at least one of selecting an output of the music system, adjusting a volume output of the music system and generating a playlist of the playlists for the music system.

25. The system of claim 19, further comprising a database of music content accessible to the speech recognition facility.

* * * * *